US010067324B2

(12) United States Patent
Takano

(10) Patent No.: US 10,067,324 B2
(45) Date of Patent: Sep. 4, 2018

(54) PROJECTION DEVICE AND PROJECTION SYSTEM

(71) Applicant: Yohei Takano, Kanagawa (JP)

(72) Inventor: Yohei Takano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/633,421

(22) Filed: Jun. 26, 2017

(65) Prior Publication Data

US 2017/0293125 A1 Oct. 12, 2017

Related U.S. Application Data

(63) Continuation of application No. 15/348,700, filed on Nov. 10, 2016, now Pat. No. 9,690,084, which is a continuation of application No. 14/742,967, filed on Jun. 18, 2015, now Pat. No. 9,523,842.

(30) Foreign Application Priority Data

Jun. 23, 2014 (JP) .................................. 2014-128676
Jan. 30, 2015 (JP) .................................. 2015-018000

(51) Int. Cl.
G02B 17/08 (2006.01)
G03B 21/28 (2006.01)
G03B 21/14 (2006.01)
G02B 13/16 (2006.01)

(52) U.S. Cl.
CPC ............. *G02B 17/08* (2013.01); *G02B 13/16* (2013.01); *G03B 21/142* (2013.01); *G03B 21/147* (2013.01); *G03B 21/28* (2013.01)

(58) Field of Classification Search
CPC .. G02B 13/16; G02B 13/006; G02B 17/0852; G02B 27/0025; G02B 17/08; G03B 21/56; G03B 21/145; G03B 21/008; G03B 21/28; H04N 5/7408
See application file for complete search history.

(56) References Cited

U.S. PATENT DOCUMENTS 5,991,102 A     11/1999  Oono et al.
9,690,084 B2 *   6/2017  Takano ............... G02B 13/006
2002/0167738 A1 11/2002  Mori
2003/0137746 A1  7/2003  Kitaoka et al.
2007/0217030 A1  9/2007  Muramatsu et al.
(Continued)

FOREIGN PATENT DOCUMENTS

CN        1954248 A    4/2007
CN      101187727 A    5/2008
(Continued)

OTHER PUBLICATIONS

Extended European Search Report dated Nov. 18, 2015 in Patent Application No. 15173153.6.
(Continued)

*Primary Examiner* — Joseph P Martinez
(74) *Attorney, Agent, or Firm* — Oblon, McClelland, Maier & Neustadt, L.L.P.

(57) ABSTRACT

A projection device to magnify and project, on a screen, an image displayed at an image display element, includes: a dioptric system including at least one positive lens and at least one negative lens; and a reflection optical system having at least one reflection optical element.

11 Claims, 31 Drawing Sheets

(56) References Cited

U.S. PATENT DOCUMENTS

| | | |
|---|---|---|
| 2008/0158439 A1* | 7/2008 | Nishikawa ............ G02B 17/08 348/744 |
| 2010/0238565 A1 | 9/2010 | Takano et al. |
| 2011/0002047 A1 | 1/2011 | Takano et al. |
| 2011/0002048 A1 | 1/2011 | Takano et al. |
| 2012/0008216 A1 | 1/2012 | Takano et al. |
| 2012/0236419 A1 | 9/2012 | Atsuumi et al. |
| 2012/0307375 A1 | 12/2012 | Takano et al. |
| 2013/0033759 A1 | 2/2013 | Takano et al. |
| 2013/0094096 A1 | 4/2013 | Minefuji |
| 2013/0135751 A1 | 5/2013 | Atsuumi et al. |
| 2013/0222922 A1 | 8/2013 | Atsuumi et al. |
| 2013/0235356 A1 | 9/2013 | Takahashi et al. |
| 2014/0185145 A1 | 7/2014 | Takano et al. |
| 2014/0268073 A1 | 9/2014 | Takano |
| 2014/0340658 A1 | 11/2014 | Takano et al. |

FOREIGN PATENT DOCUMENTS

| | | |
|---|---|---|
| CN | 101571622 A | 11/2009 |
| JP | 2001-124986 A | 5/2001 |
| JP | 2006-195433 A | 7/2006 |
| JP | 2006-330241 A | 12/2006 |
| JP | 2007-079524 | 3/2007 |
| JP | 2008-275783 A | 11/2008 |
| JP | 2009-216883 | 9/2009 |
| JP | 2009-251458 | 10/2009 |
| JP | 2010-131672 A | 8/2010 |
| JP | 2010-204328 A | 9/2010 |
| JP | 2011-242606 | 12/2011 |
| JP | 2011-253130 A | 12/2011 |
| JP | 2013-33242 A | 2/2013 |
| JP | 2013-174886 A | 9/2013 |

OTHER PUBLICATIONS

N et al., "S-FSL 5" http://www.oharacorp.com/pdf/esfs105.pdf, XP055227298, Oct. 22, 2006, 1 Page.

Office Action dated Apr. 6, 2017 in European Patent Application No. 15 173 153.6.

Hoya: "BACD16", Jan. 1, 2008 (Jan. 1, 2008), XP055360814, Retrieved from the Internet: URL:http://www.hoya-opticalworld.com/common/pdf201407/BACD16.pdf [retrieved on Mar. 31, 2017].

Office Action dated May 2, 2017 in Chinese Patent Application No. 201510353844.9.

Office Action issued in corresponding Japanese Application No. 2014-128676 dated Mar. 16, 2018 (citing above references AO-AT).

* cited by examiner

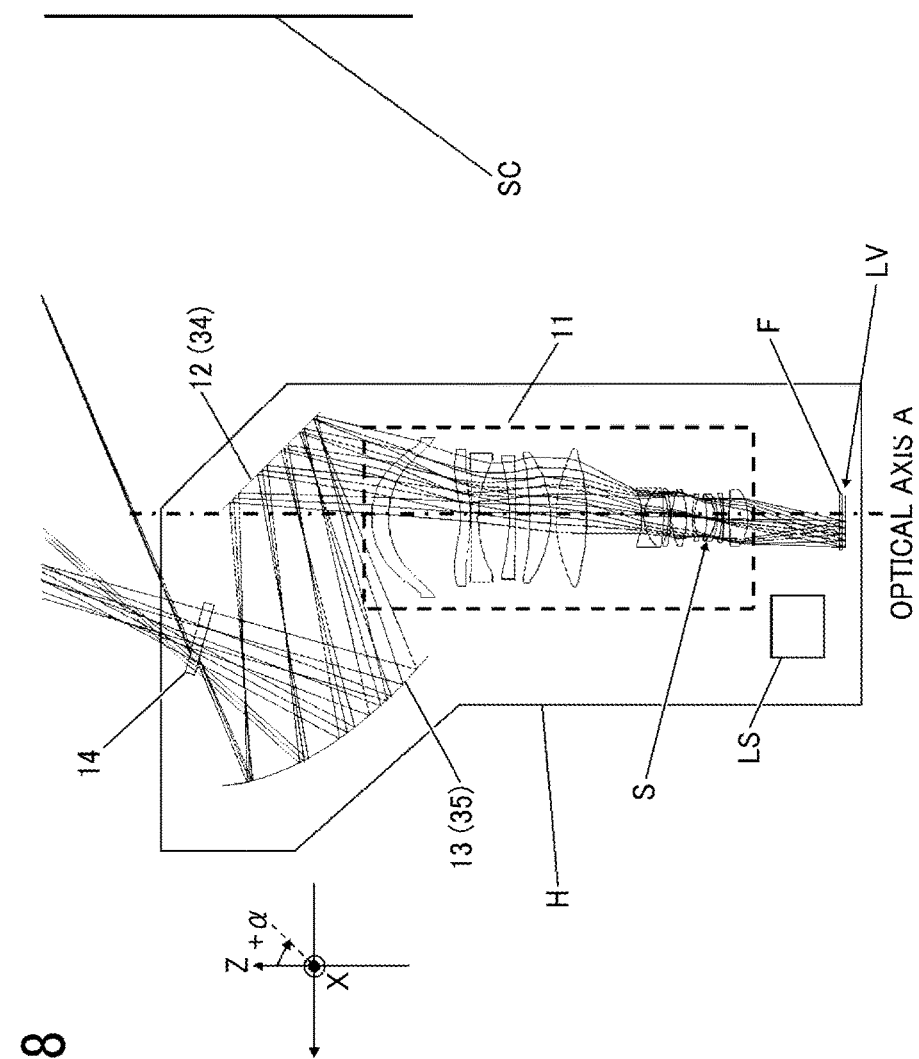

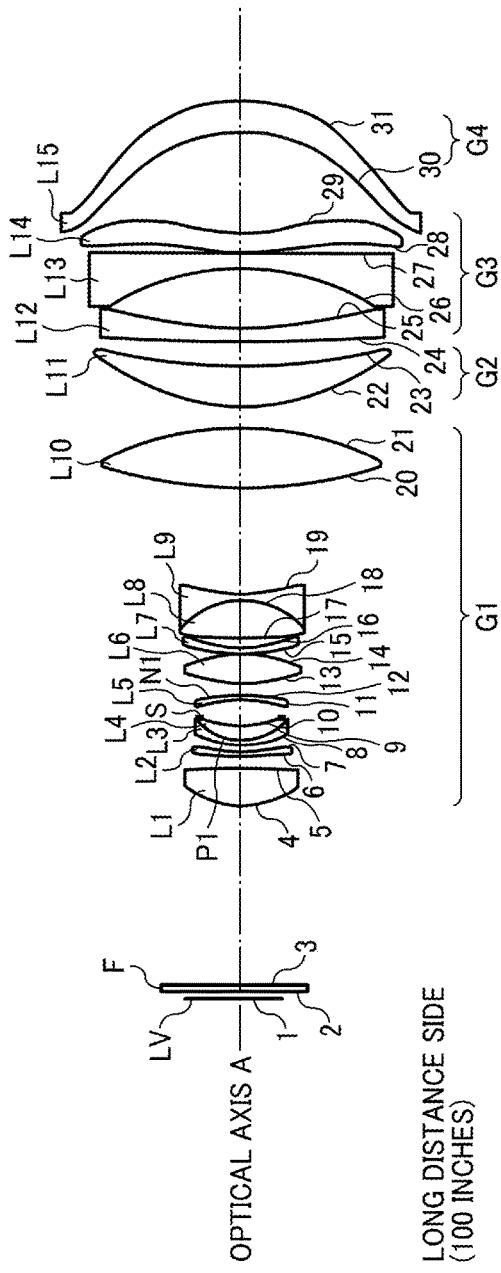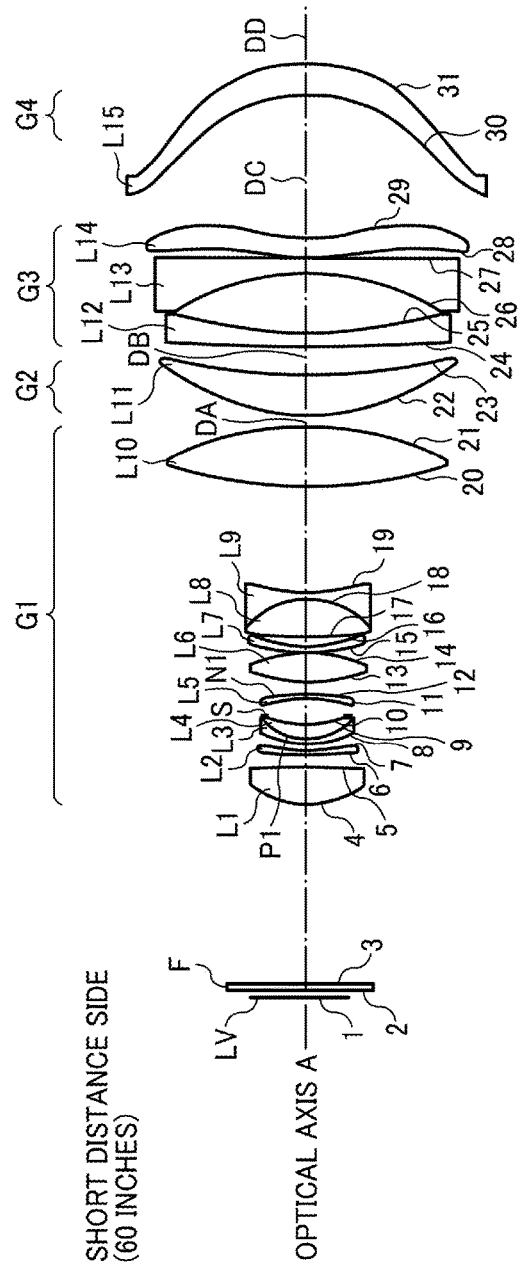

PROJECTION DEVICE AND PROJECTION SYSTEM

CROSS-REFERENCE TO RELATED APPLICATIONS

This application is a continuation of U.S. application Ser. No. 15/348,700, filed Nov. 10, 2016, which is a continuation of U.S. application Ser. No. 14/742,967 (now U.S. Pat. No. 9,523,842), filed Jun. 18, 2015, which is based on and claims priority pursuant to 35 U.S.C. § 119 to Japanese Patent Application Nos. 2014-128676, filed on Jun. 23, 2014, and 2015-018000, filed on Jan. 30, 2015, in the Japan Patent Office, the disclosure of each of which is hereby incorporated by reference in their entirety.

BACKGROUND

Technical Field

The present invention relates to a projection device to magnify and project an image displayed at an image display element on a projection surface such as a screen, and a projection system including the projection device.

Background Art

A projection device illuminates a display screen of an image display element referred to as a light valve such as a Digital Micromirror Device (abbreviated as DMD) and a Liquid Chrystal Panel, and projects a magnified image displayed at the image display element on a screen forming the projection surface by a projection optical system.

Especially in recent years, there is a growing demand for a front projection projector having an ultra-short projection distance by which a large-size image can be displayed with a short projection distance. As a unit having a compact size and achieving such an ultra-short projection distance, there are technologies proposed in, for example, JP-2007-079524-A, JP-2009-251458-A, JP-2011-242606-A, and JP-2009-216883-A, in which a dioptric system and a curved mirror are combined.

Recently, higher luminance is strongly demanded even in such an ultra-short throw projector. It is thus also desired to sufficiently consider temperature characteristics of the optical system, due to heat from a lamp or a light source, and heat generated through absorbing beams.

Particularly, since a projection angle is large in the ultra-short throw projector, a focus depth has only a few centimeters or so in a periphery, particularly at a point most distant from an optical axis which is the axis shared by the dioptric system. That is, the focus depth is extremely narrowed in the ultra-short throw projector, compared to the front projection projectors not having an ultra-short projection distance. Accordingly, the ultra-short projector tends to suffer from degradation in resolution as a focus position is largely deviated in the periphery of a screen, due to an imaging surface curvature caused by the above-mentioned temperature increase.

However, nothing is disclosed about correcting the imaging surface curvature caused by temperature increase in the above-listed JP-2007-079524-A, JP-2009-251458-A, JP-2011-242606-A, and JP-2009-216883-A, and the technologies are insufficient in the case of considering the specifications of the recent projectors.

SUMMARY

Example embodiments of the present invention include: a projection device to magnify and project, on a screen, an image displayed at an image display element, the projection device including: a dioptric system including at least one positive lens P1 and at least one negative lens N1; and a reflection optical system having at least one reflection optical element. The at least one positive lens P1 and the at least one negative lens N1 satisfy the conditional expressions (1) and (2):

$$-6 < dnT \qquad (1)$$

$$70 < vd \qquad (2)$$

where dnT denotes a temperature coefficient of a relative refractive index at a D line in a range of 40 to 60 degrees, and νd denotes an Abbe number.

Example embodiments of the present invention include: a projection device to magnify and project, on a screen, an image displayed at an image display element, the projection device including:

a dioptric system including at least one cemented lens; and a reflection optical system having a reflection optical element including at least one magnification, wherein the cemented lens includes at least one positive lens P1 and at least one negative lens N1 satisfying the conditional expressions (7), (8), (9), and (10):

$$4 < dnTP \qquad (7)$$

$$0.61 < \theta gFP \qquad (8)$$

$$3 < dnTN \qquad (9)$$

$$0.59 < \theta gFN \qquad (10)$$

where dnTP denotes a temperature coefficient of a relative refractive index in an e line in a range of 40 to 60 degrees of the positive lens P1, θgFP denotes a partial dispersion ratio in a g line and an F line of the positive lens P1, dnTN denotes a temperature coefficient of a relative refractive index in the e line in a range of 40 to 60 degrees of the negative lens N1, θgFN denotes a partial dispersion ratio of the negative lens N1, and θgf denotes a partial dispersion ratio, expressed by an expression: θgf=(Ng−NF)/(NF−NC), where Ng denotes a refractive index relative to the g line, NF denotes a refractive index relative to the F line, and NC denotes a refractive index relative to a C line.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 3A illustrates a case where the projection size is a long distance side (80 inches) and FIG. 3B illustrates a case where the projection size is a short distance side (48 inches);

FIG. 8 is a cross-sectional view illustrating a configuration of a projection device together with an optical path according to a second example of the first embodiment of the present invention;

FIGS. 9A and 9B are cross-sectional views illustrating moving positions of a focusing lens for respective projection sizes of a projection optical system used in the projection device according to the second example of the first embodiment of the present invention, and FIG. 9A illustrates a case where the projection size is a long distance side (100 inches) and FIG. 9B illustrates a case where the projection size is a short distance side (60 inches);

FIG. 15A illustrates a case where the projection size is a long distance side (100 inches), and FIG. 15B illustrates a case where the projection size is a short distance side (80 inches);

FIG. 25A illustrates a case of a long distance side (100 inches), and FIG. 25B illustrates a case of a short distance side (80 inches);

Figure 1:
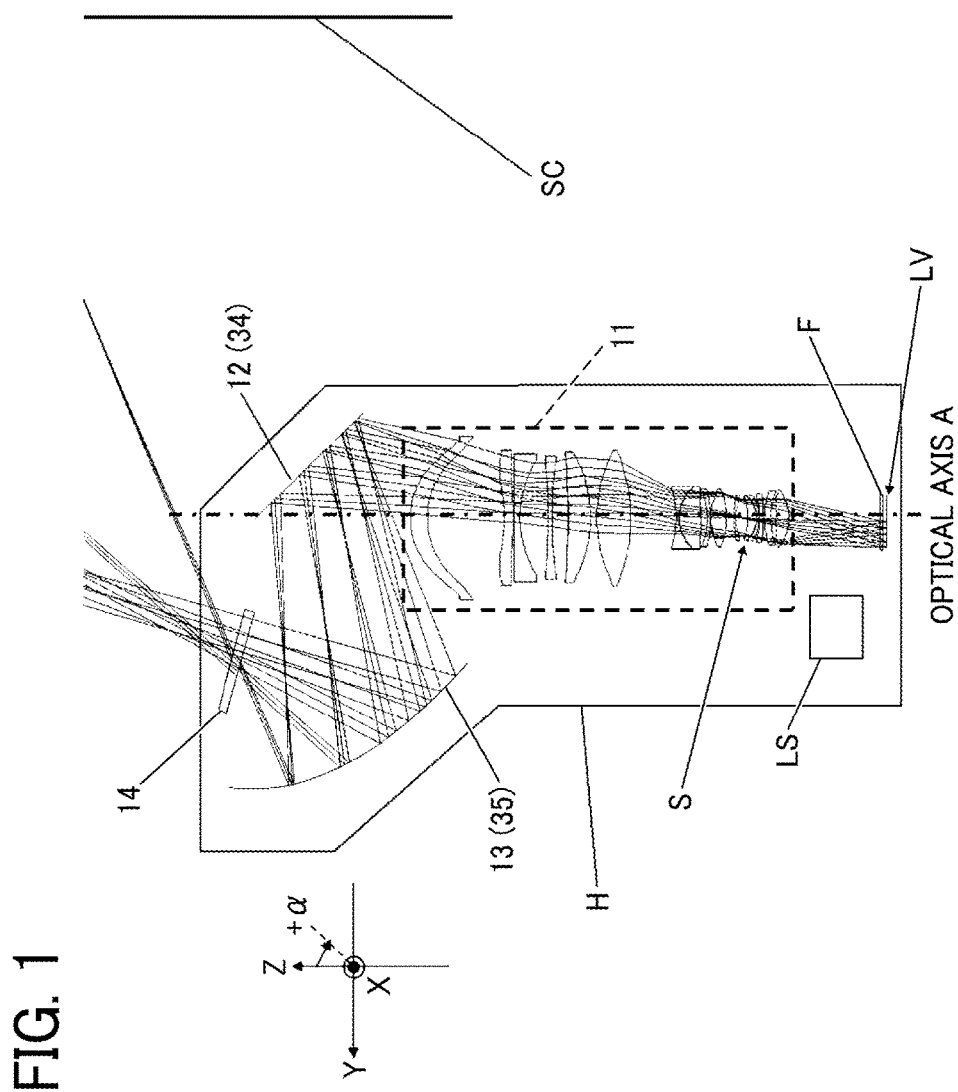
FIG. 1 is a cross-sectional view illustrating a configuration of a projection device together with an optical path according to a first example of a first embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF THE INVENTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring now to FIGS. 1 to 12, a projection device and a projection system including the projection device will be described according to a first embodiment of the present invention.

Before describing specific examples, concept of the first embodiment of the present invention will be described.

The present invention is a projection device that magnifies and projects, on a screen, an image displayed at an image display element. The projection device includes a dioptric system, and a reflection optical system having at least one reflection optical element. The dioptric system includes at least one positive lens P1 and one negative lens N1, and the positive lens P1 and the negative lens N1 satisfy following conditional expressions (1) and (2):

$$-6 < dnT \tag{1}$$

$$70 < vd \tag{2}$$

dnT denotes a temperature coefficient of a relative refractive index at a D line in a range of 40 to 60 degrees and vd is an Abbe number.

When glass material of the positive lens P1 and the negative lens N1 satisfy the conditional expression (1), not only change of a focal length caused by temperature increase but also particularly change of imaging surface curvature can be highly corrected. As a result, good resolution can be obtained in every detail in the ultra-short throw projector despite occurrence of temperature increase. Further, temperature compensation can be performed by satisfying the conditional expression (1), but this is not sufficient for aberration correction, especially, chromatic aberration correction. Both optical performance and temperature characteristics can be achieved only after the conditional expression (2) is satisfied at the same time. More preferably, following conditional expressions (1') and (2') are satisfied as well:

$$-5 < dnT \tag{1'}$$

$$72 < vd \tag{2'}$$

More preferably, the positive lens P1 is disposed closer to an image display element side than an aperture stop is, and the negative lens N1 is disposed closer to a magnification side than an aperture stop is. By disposing the lenses as described above, aberration correction can be effectively performed. Further, the "aperture stop" herein indicates a place where the thickness of a luminous flux (entire luminous flux) passing the dioptric system from an entire area of the image display element becomes thinnest.

More favorably, the positive lens P1 and the negative lens N1 are included in a lens group including a lens having highest temperature at a time of displaying a white image. By disposing the lenses in that lens group, a projection optical system having favorable temperature characteristics can be obtained.

More favorably, the positive lens P1 and the negative lens N1 are included in a lens group closest to the image display element side, for example, in a first lens group. By disposing the lenses in that lens group, a projection optical system having favorable temperature characteristics can be obtained.

More favorably, the positive lens P1 and the negative lens N1 are included in a lens group not moved at the time of focusing. This results in favorable temperature characteristics in each image size.

More favorably, the dioptric system may include a resin lens, and the resin lens is included in a lens group having lowest temperature at the time of displaying a white image. By disposing the lens in that lens group as described above, the image surface curvature associated with temperature change can be effectively suppressed.

More favorably, the reflection optical element is a concave mirror, and includes a free-form surface. By use of the free-form surface, correction of the image surface curvature can be effectively performed.

More favorably, the following conditional expression (3):

$$TR < 0.30 \tag{3}$$

is satisfied where a ratio of a distance to the screen from an intersection between the concave mirror and an optical axis of the dioptric system, to a lateral width of the screen is TR. By satisfying the conditional expression, a projection device having an extremely short projection distance can be obtained. More preferably, the following conditional expression (3'):

$$TR < 0.25 \tag{3'}$$

is satisfied.

More favorably, the following conditional expression (4) is satisfied:

$$BF/Y < 4.0 \tag{4}$$

where BF denotes a distance from an intersection between a surface including the image display element and the optical axis to a vertex of an image display element side surface of a lens closest to the image display element side, Y denotes a maximum value of a distance between the optical axis and an end portion of an image forming unit, and the optical axis is an axis shared by a plurality of axisymmetric lenses of the dioptric system.

By satisfying the conditional expression (4), the projection optical system can be further downsized. More preferably, the following conditional expression (4'):

$$BY/Y<3.5 \quad (4')$$

is satisfied.

More favorably, a projection optical system is implemented as a non-telecentric optical system. By employing the non-telecentric optical system, there is an advantage in downsizing.

With the above described configurations, the projection optical system can provide a projection device having an extremely short projection distance, achieving higher luminance, formed in a compact size, having high performance and favorable temperature characteristics.

Next, a configuration of a projection optical system of a projection device of the present invention will be described in detail.

Figure 2:
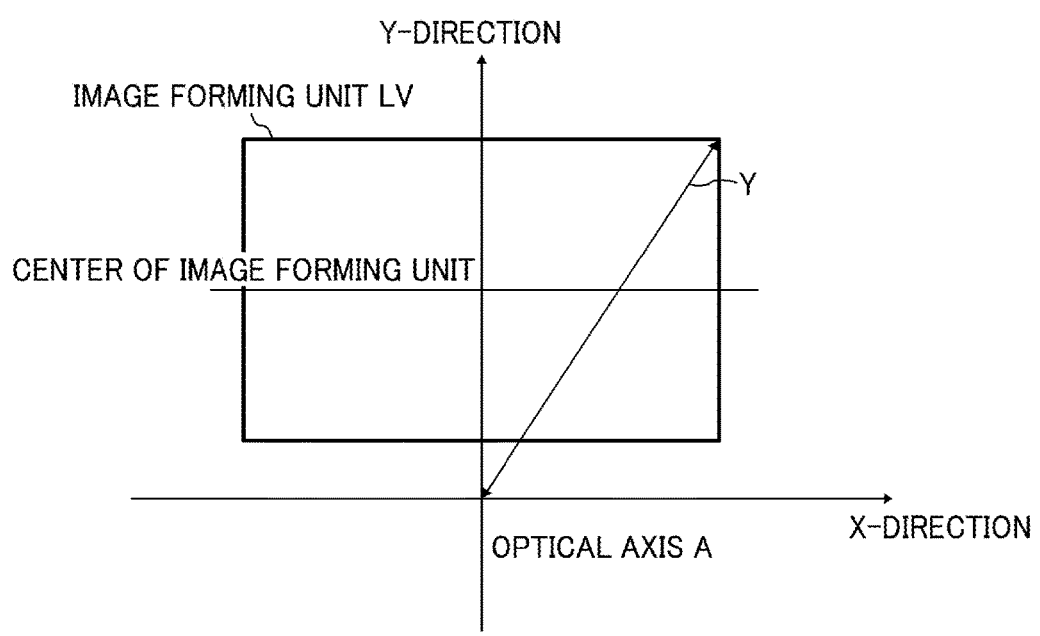
FIG. 2 is an explanatory diagram illustrating a positional relation between an optical axis and a center of an image forming unit in which an image is formed, when the image forming unit is shifted in a Y-direction by a predetermined amount relative to the optical axis.

FIG. 1 is a cross-sectional view illustrating a configuration of a projection device together with an optical path according to a first example of a first embodiment of the present invention, and FIG. 2 is an explanatory diagram illustrating a positional relation between an optical axis and a center of an image forming unit in which an image is formed, when the image forming unit is shifted in a Y-direction by a predetermined amount relative to the optical axis.

Figure 3A:
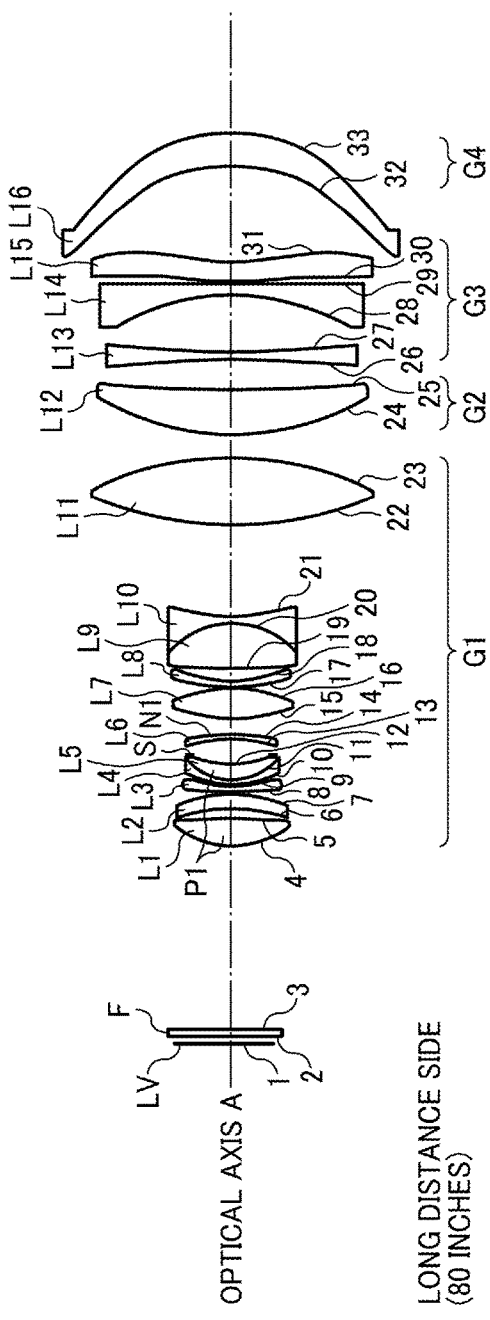
FIGS. 3A and 3B are cross-sectional views illustrating moving positions of a focusing lens for respective projection sizes of a projection optical system used in the projection device according to the first example of the first embodiment of the present invention.
Figure 3B:
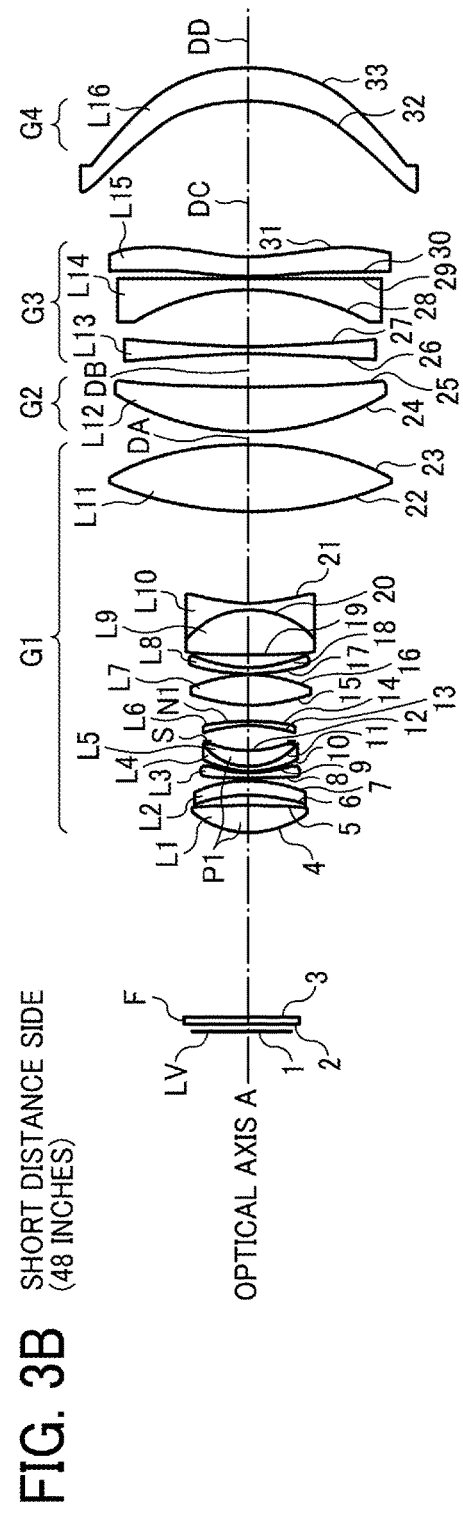

FIGS. 3A and 3B are cross-sectional views illustrating moving positions of a focusing lens in respective projection sizes of a projection optical system used in the projection device according to the first example of the first embodiment of the present invention, and FIG. 3A illustrates a case where the projection size is a long distance side (80 inches) and FIG. 3B illustrates a case where the projection size is a short distance side (48 inches).

In FIG. 1, a reference sign LV indicates an image forming unit. The image forming unit LV is, more specifically, a light valve such as a "digital micro-mirror device (abbreviated as DMD)", a "transmissive liquid crystal panel", and a "reflective liquid crystal panel", and a portion indicated by the reference sign LV is a "portion where an image to be projected is formed". In the case where the image forming unit LV does not have a function to emit light by itself like the DMD, image information formed at the image forming unit LV is illuminated by illumination light from an illumination optical system LS. For the illumination optical system LS, a system having a function to effectively illuminate the image forming unit LV is preferable. Further, for example, a rod integrator and a fly-eye integrator can be used in order to have uniform illumination. Further, for a light source of the illumination, a white light source such as a super-high pressure mercury lamp, a xenon lamp, a halogen lamp, or a light-emitting diode (LED) can be used. Further, a monochromatic light source such as a monochromatic LED and a laser diode (LD) can be also used. A known technology is adopted as the illumination optical system. Therefore, description of a specific example is omitted here.

In the present embodiment, the DMD is assumed as the image forming unit LV. Further, the present embodiment has a precondition that "the image forming unit does not have a function to emit light" by itself, but an image forming unit including "a self-light emitting system having a function to cause a generated image to emit light" can also be used.

A parallel plate F disposed in the vicinity of the image forming unit LV is assumed to be a cover glass (seal glass) of the image forming unit LV. A reference sign H represents an outer surface of the projection device, and a reference sign S represents a stop position (aperture stop). Further, a reference sign SC in FIG. 1 represents a screen.

FIG. 1 illustrates an optical path diagram in the case of 48 inches in which a front lens element is most protruded. As illustrated in FIG. 1, an axis shared by a plurality of axisymmetric lenses is defined as an axis A, a direction parallel to the axis A is defined as Z-axis direction, an axis vertical to the axis A within a surface including a beam emitted from a center of the image display element and passing a center of the stop S is defined as a Y-axis, and an axis vertical to the axis A and the Y-axis is defined as an X-axis. In FIG. 1, a clockwise rotary direction is defined as +α direction.

A luminous flux having intensity two-dimensionally modulated with the image information at the DMD is to be a projected luminous flux as object light. The projected luminous flux from the image forming unit LV passes a dioptric system 11, a folding mirror 12, and a free-form surface concave mirror 13, and becomes an imaging luminous flux. In other words, an image formed on the DMD (image forming unit LV) is magnified and projected on the screen SC by the projection optical system, and becomes a projection image. Here, a surface on which the image is formed is defined as an image forming surface. Respective optical elements in the dioptric system 11 share an optical axis individually, and the image forming unit LV is shifted in the Y-direction relative to the optical axis A as illustrated in FIG. 2.

According to the first embodiment, the system is formed by using the dioptric system 11, and a reflection optical system such as the folding mirror 12 and the one free-form surface concave mirror 13. The number of mirrors may be increased, but this is not so preferable because the configuration may become complex and upsized, and cost increase may be caused as well.

Heat generation by absorbing heat and light from a power source and a lamp is increased in the illumination optical system LS along with enhancement of higher luminance. Particularly, in the projector using the non-telecentric optical system, a light absorption amount to a lens barrel is largely increased by shortening back focus for downsizing. Therefore, a lens group closest to an image display side has the temperature easily increased, and temperature compensation is needed inside the lens group.

Considering above, in the first example in the first embodiment, change of a focal length and expansion of a mechanical holder due to heat are balanced by using glass material satisfying conditional expressions (1) and (2) (for example, S-FPM3 having nd: 1.53775, vd: 74.7031, and DnT: −4.4 of OHARA INC.,) for each of a positive lens closest to the image display element side, a positive lens and a negative lens across the stop. Further, in addition to the above, an aspheric surface lens is adopted for the positive lens closest to the image display element side, so that temperature change at image surface curvature can be more highly adjusted.

Moreover, by appropriately disposing a cooling mechanism, temperature change can be suppressed for the lens group having the aspheric surface lens and moved at the time of focusing, and temperature change at the image surface curvature can be suppressed.

The light having passed the dioptric system 11 forms, as a space image, an intermediate image on a side closer to the image forming unit LV than a reflection mirror. The intermediate image is conjugate to the image information formed on the image forming unit LV. The intermediate image is not necessarily imaged as a planar image, and formed as a curved image in the first embodiment and other embodiments. The intermediate image is magnified and projected by the free-form surface concave mirror 13 disposed closest to a magnification side, and screened on the screen SC. The intermediate image includes image surface curvature and distortion, but the curvature and distortion can be corrected by using the free-form surface concave mirror 13. Therefore, a lens system has a reduced burden to perform aberration correction, thereby increasing freedom of design and having an advantage in downsizing, for example. Here, the free-form surface referred is an anamorphic surface in which X-direction curvature corresponding to an X-direction position in an optional Y-direction position is not constant, and Y-direction curvature corresponding to a Y-direction position in an optional X-direction position is not constant.

Preferably, a dust-proof glass 14 is disposed between the free-form surface concave mirror 13 and the screen SC. According to the present first embodiment, a flat plate glass is used as the dust-proof glass 14, but the glass may also have curvature, or may be an optical element having a magnification such as a lens. Further, the duct-proof glass is disposed tilted to the axis A instead of being vertical, but the angle is optional and may be vertical to the axis A.

First Example

Next, the first example of the present invention will be described in detail with reference to FIG. 3.

The reference signs in the first example and a later-described second example are defined as follows.

f: focal length in entire system
NA: numerical aperture
ω: half field angle (deg)
R: curvature radius (paraxial curvature radius on the aspheric surface)
D: surface distance
Nd: refractive index
vd: Abbe number
K: conic constant of aspheric surface
Ai: i-th aspheric surface coefficient
Cj: free-form surface coefficient The shape of the aspheric surface is expressed by a following known expression (5) by setting X as an amount of the aspheric surface in an optical axis direction, defining an inverse of paraxial curvature radius (paraxial curvature) as C, a height from the optical axis as H, and a conic constant as K, and using the above-mentioned aspheric surface coefficient of each degree.

[Expression 5]

$$X = \frac{C \cdot H^2}{1 + \sqrt{\{1 - (1+K) \cdot C^2 \cdot H^2\}}} + \sum_{i=1} Ai \cdot H^i \quad (5)$$

The shape is specified by providing the paraxial curvature radius, the conic constant, and the aspheric surface coefficient.

Further, the shape of the free-form surface is specified by a following known expression (6) by setting X as an amount of the free-form surface in the optical axis direction, defining an inverse number of paraxial curvature radius (paraxial curvature) as C, a height from the optical axis as H, and a conic constant as K, and using the above-mentioned free-form surface coefficient.

[Expression 6]

$$X = \frac{C \cdot H^2}{1 + \sqrt{\{1 - (1+K) \cdot C^2 \cdot H^2\}}} + \sum_{j=1} Cj \cdot x^m y^n \quad (6)$$

However, there is a following condition.

$$j = \frac{(m+n)^2 + m + 3n}{2} + 1$$

The shape of the free-form surface is specified by providing the paraxial curvature radius, the conic constant, and the free-form surface coefficient.

As illustrated in FIG. 1, an axis in a normal direction of the image forming unit and parallel to the axis A that is the axis shared by axisymmetric lenses is defined as the Z-axis. Among the axes within the surface including the beam emitted from the center of the image display element and passing the center of the stop, an axis vertical to the axis A is defined as the Y-axis. An axis vertical to the axis A and the Y-axis is defined as the X-axis. In FIG. 1, the clockwise rotary direction is defined as +α direction.

FIG. 3 illustrates a lens configuration of the dioptric system and a focusing state according to the first example of the first embodiment of the present invention. In this dioptric system, a first lens group G1 having positive refractive power, a second lens group G2 having positive refractive power, a third lens group G3 having negative refractive power, and a fourth lens group G4 having positive refractive power are arranged in order from an image forming unit side to a magnification side. In performing focusing in response to change of a projection distance, the positive second lens group G2 and the negative third lens group G3 are moved to the image forming unit side, and the positive fourth lens group G4 is moved to the magnification side, at the time of focusing from the long distance side (80 inches) to the short distance side (48 inches).

The first lens group G1 includes, in order from the image forming unit LV side, a first lens L1 formed of a double-sided aspheric biconvex lens in which a convex surface having larger curvature than the magnification side is oriented to the image forming unit side, a second lens L2 formed of a positive meniscus lens in which a convex surface is oriented to the magnification side, a third lens L3 formed of a negative meniscus lens in which a convex surface is oriented to the image forming unit side, a cemented lens including a fourth lens L4 formed of a negative meniscus lens in which a convex surface is oriented to the image forming unit side and a fifth lens L5 formed of a positive meniscus lens in which a convex surface is oriented to the image forming unit side, an aperture stop S, a sixth lens L6 formed of a negative meniscus lens in which a convex surface is oriented to the magnification side, a seventh lens L7 formed of a double-sided aspheric biconvex lens in which a convex surface having larger curvature than the image forming unit side is oriented to the magnification side, an eighth lens L8 formed of a negative meniscus lens in which a convex surface is oriented to the image forming unit side, a cemented lens including a ninth lens L9 formed of a biconvex lens in which a convex surface having larger curvature than the image forming unit side is oriented to the magnification side and a tenth lens L10 formed of a biconcave lens in which a concave surface having larger curvature than the magnification side is oriented to the image forming unit side, and an eleventh lens L11 formed of a biconvex lens in which a convex surface having larger curvature than the image forming unit side is oriented to the magnification side.

The second lens group G2 includes one twelfth lens L12 formed of a positive meniscus lens in which a convex surface is oriented to the image forming unit side. The third lens group G3 includes a thirteenth lens L13 formed of a biconcave lens in which a concave surface having curvature larger than the image forming unit is oriented to the magnification side, a fourteenth lens L14 formed of a plano-concave lens having a flat surface at the magnification side, and a fifteenth lens L15 formed of a double-sided aspheric negative meniscus lens in which a convex surface is oriented to the image forming unit side. The fourth lens group G4 includes a sixteenth lens L16 formed of a double-sided aspheric positive meniscus lens in which a convex surface is oriented to the magnification side.

The dioptric system is formed of the above lens groups, and a folding mirror 12 (surface 34) and a free-form surface concave mirror 13 (surface 35) are disposed at the magnification side thereof.

Note that the first lens L1 and the fifth lens L5 are referred to as positive lens P1, and the sixth lens L6 is referred to as negative lens N1.

Hereinafter, lens data is listed in TABLE 1. In the TABLE 1, a surface number attached with * is the aspheric surface, and a surface number attached with ** is the free-form surface.

TABLE 1

| NUMERICAL APERTURE: 0.200 | | | | | | |
|---|---|---|---|---|---|---|
| | R | D | Nd | vd | GLASS MATERIAL | |
| 1 | ∞ | 1.00 | | | | |
| 2 | ∞ | 1.00 | 1.51633 | 64.1420 | S-BSL7 | OHARA |
| 3 | ∞ | 28.00 | | | | |
| 4* | 14.540 | 4.20 | 1.53775 | 74.7031 | S-FPM3 | OHARA |
| 5 | −66.951 | 1.50 | | | | |
| 6 | −27.955 | 2.25 | 1.58913 | 61.1526 | L-BAL35 | OHARA |
| 7 | −24.919 | 0.30 | | | | |
| 8 | 61.206 | 1.00 | 1.76200 | 40.1002 | S-LAM55 | OHARA |
| 9 | 20.058 | 0.30 | | | | |
| 10 | 15.427 | 0.80 | 1.90366 | 31.3150 | TAFD25 | HOYA |
| 11 | 9.750 | 2.66 | 1.53775 | 74.7031 | S-FPM3 | OHARA |
| 12 | 20.974 | 1.36 | | | | |
| STOP | ∞ | 2.45 | | | | |
| 13 | −21.118 | 0.60 | 1.53775 | 74.7031 | S-FPM3 | OHARA |
| 14 | −39.217 | 2.64 | | | | |
| 15* | 25.408 | 4.68 | 1.58913 | 61.1526 | L-BAL35 | OHARA |
| 16* | −20.601 | 0.30 | | | | |
| 17 | 40.902 | 0.80 | 1.62280 | 57.0527 | S-BSM10 | OHARA |
| 18 | 21.739 | 2.09 | | | | |
| 19 | 202.603 | 6.92 | 1.85478 | 24.7990 | S-NBH56 | OHARA |
| 20 | −13.233 | 1.00 | 1.91650 | 31.6041 | S-LAH88 | OHARA |
| 21 | 31.574 | 14.44 | | | | |
| 22 | 57.162 | 10.71 | 1.49700 | 81.5459 | S-FPL51 | OHARA |
| 23 | −48.198 | VARIABLE DA | | | | |
| 24 | 41.474 | 7.01 | 1.80100 | 34.9674 | S-LAM66 | OHARA |
| 25 | 238.171 | VARIABLE DB | | | | |
| 26 | −169.741 | 1.20 | 1.85478 | 24.7990 | S-NBH56 | OHARA |
| 27 | 161.202 | 8.88 | | | | |
| 28 | −35.153 | 1.80 | 1.83481 | 42.7253 | S-LAH55V | OHARA |
| 29 | ∞ | 0.30 | | | | |
| 30* | 60.438 | 3.00 | 1.53046 | 55.8000 | RESIN | |
| 31* | 31.695 | VARIABLE DC | | | | |
| 32* | −29.909 | 5.30 | 1.53046 | 55.8000 | RESIN | |
| 33* | −27.268 | VARIABLE DD | | | | |
| 34 | ∞ | −83.91 | REFLECTION SURFACE | | | |
| 35** | ∞ | VARIABLE DE | REFLECTION SURFACE | | | |

That is, in TABLE 1, optical surfaces of a fourth surface, a fifth surface, a fifteenth surface, a sixteenth surface, a thirtieth surface, a thirty-first surface, a thirty-second surface, and a thirty-third surface attached with "*" are the aspheric surfaces, and parameters of the respective aspheric surfaces in the expression (5) are as shown in next TABLE 2.

Note that "En" is "exponent of 10", that is, "×10ⁿ" in the aspheric surface coefficient. For example, "E-05" represents "×$10^{-5}$".

TABLE 2

| | ASPHERIC SURFACE COEFFICIENTS | | | |
|---|---|---|---|---|
| | K | A4 | A6 | A8 |
| 4TH SURFACE | 0.1783 | −2.9102E−05 | −1.1652E−08 | |
| 5TH SURFACE | −64.9202 | 1.9295E−05 | 1.8481E−07 | |
| 15TH SURFACE | 1.2261 | −2.1678E−05 | −5.2896E−08 | |
| 16TH SURFACE | −1.3435 | 9.7955E−06 | −3.9413E−08 | |
| 30TH SURFACE | 0.9126 | −2.8961E−05 | 2.2669E−08 | 1.1944E−10 |
| 31TH SURFACE | −4.2646 | −4.3867E−05 | 8.2194E−08 | −1.1309E−10 |
| 32TH SURFACE | −0.7468 | −1.8382E−05 | 7.4940E−10 | −4.3494E−12 |
| 33TH SURFACE | −1.0966 | −1.5990E−05 | −1.1268E−08 | 4.7986E−11 |
| | A10 | A12 | A14 | A16 |
| 4TH SURFACE | | | | |
| 5TH SURFACE | | | | |
| 15TH SURFACE | | | | |
| 16TH SURFACE | | | | |
| 30TH SURFACE | −4.9118E−13 | 8.3740E−16 | −7.14034E−19 | 2.47551E−22 |
| 31TH SURFACE | 8.9692E−14 | −3.3502E−17 | | |
| 32TH SURFACE | 1.4576E−13 | −2.0156E−16 | 8.25756E−20 | |
| 33TH SURFACE | −1.5373E−13 | 4.1252E−16 | −4.44079E−19 | 1.65614E−22 |

DA, DB, DC, DD, and DE in TABLE 1 represent variable distances.

Among the distances, the variable distance DA is a distance between the first lens group G1 and the second lens group G2, namely, the variable distance between a surface 23 and a surface 24. The variable distance DB is a distance between the second lens group G2 and the third group G3, namely, the variable distance between a surface 25 and a surface 26. The variable distance DC is a distance between the third lens group G3 and a fourth lens group G4, namely, the variable distance between a surface 31 and a surface 32. The variable distance DD is a distance between the fourth lens group G4 and the folding mirror 12, and DE is the variable distance between the free-form surface concave mirror 13 and the screen surface SC.

Thus, in the projection optical system, the second lens group G2 and the third lens group G3 are moved to the image forming unit side, and the fourth lens group G4 is moved to the magnification side, in FIG. 3 at the time of focusing from the long distance side to the short distance side to perform focusing in response to the change of the projection distance. Thus, by changing a magnifying ratio, focus adjustment is performed in accordance with the projection sizes of the 48 inches, 60 inches, and 80 inches of a diagonal size of the projection image.

The surface distances DA, DB, DC, DD, and DE in which the distances between the lens groups are varied at the time of focus adjustment are indicated as "variable DA", "variable DB", "variable DC", "variable DD", and "variable DE" in TABLE 1, and as illustrated in next TABLE 3, the surface distances DA to DE are varied with respect to the diagonal sizes 80, 60, and 48 inches of the projection image.

TABLE 3

| | VARIABLE DISTANCE FOCUSING | | |
|---|---|---|---|
| SCREEN SIZE | SHORT DISTANCE 48 INCHES | STANDARD 60 INCHES | LONG DISTANCE 80 INCHES |
| VARIABLE DA | 2.00 | 2.86 | 3.52 |
| VARIABLE DB | 5.12 | 4.93 | 4.77 |
| VARIABLE DC | 24.49 | 19.55 | 15.16 |
| VARIABLE DD | 48.97 | 53.23 | 57.12 |
| VARIABLE DE | 244.24 | 297.44 | 385.38 |

Further, the shape of the free-form surface is specified by the above-described expression (6), providing an inverse number of paraxial curvature radius (paraxial curvature) C, a height from the optical axis H, a conic constant K, and free-form surface coefficients listed in next TABLE 4 while defining X as an amount of the free-form surface in the optical axis direction.

TABLE 4

| FREE-FORM SURFACE COEFFICIENTS | |
|---|---|
| | 35TH SURFACE |
| K | 0 |
| C4 | 1.0821E−02 |
| C6 | −1.1254E−03 |
| C8 | 1.1482E−04 |
| C10 | −2.3053E−04 |
| C11 | −9.6864E−07 |
| C13 | 7.8797E−06 |
| C15 | −5.2503E−07 |
| C17 | −4.5413E−08 |
| C19 | 1.7411E−07 |
| C21 | 3.7066E−08 |
| C22 | 1.6826E−10 |
| C26 | 9.8546E−10 |
| C28 | 4.3972E−10 |
| C30 | 1.9934E−12 |
| C32 | −5.8024E−11 |
| C34 | −1.2594E−11 |
| C36 | −2.2947E−14 |
| C37 | −1.9874E−14 |
| C39 | 1.2852E−13 |
| C41 | −5.5519E−13 |
| C43 | −1.1902E−13 |
| C45 | −1.8461E−14 |
| C47 | 2.7985E−16 |
| C49 | 3.2797E−15 |
| C51 | −1.2440E−15 |
| C53 | 7.3482E−16 |
| C55 | 3.2915E−17 |
| C56 | 1.7806E−18 |
| C58 | 6.1984E−18 |
| C60 | 2.3345E−17 |
| C62 | 7.7410E−18 |
| C64 | 8.6880E−18 |
| C66 | 9.8187E−19 |

Note that the projection distance and TR take values listed in next TABLE 5 in accordance with the short distance side, standard, and long distance side. Here, TR is expressed as:

[a distance to the screen from an intersection between the free-form surface concave mirror 13 and the axis $A$]/[a lateral width of the screen]

TABLE 5

PROJECTION DISTANCE AND TR

|  | SHORT DISTANCE 48 INCHES | STANDARD 60 INCHES | LONG DISTANCE 80 INCHES |
|---|---|---|---|
| PROJECTION DISTANCE | 246.92 | 300.10 | 388.02 |
| TR | 0.232 | 0.226 | 0.219 |

Hereinafter, specific values of the DMD used as the image forming unit LV of the first example and others are shown.
DMD size
Dot size: 7.56 μm
Length in lateral direction: 14.5152 mm
Length in vertical direction: 8.1648 mm
Optical axis to center of device: 5.31 mm
BF/Y: 3.45
Positional coordinates of the folding mirror 12 and free-form surface concave mirror 13 from an apex in a focused state in which the projection image of the lens positioned closest to a reflection surface side is maximized are shown in next TABLE 6. As for rotation, an angle made by a surface normal and the optical axis is indicated.

TABLE 6

|  | Y-AXIS | Z-AXIS | α |
|---|---|---|---|
| 34TH SURFACE | 0.00 | 57.12 | −45.00 |
| 35TH SURFACE | 83.91 | 79.15 | −102.71 |

Figure 4:
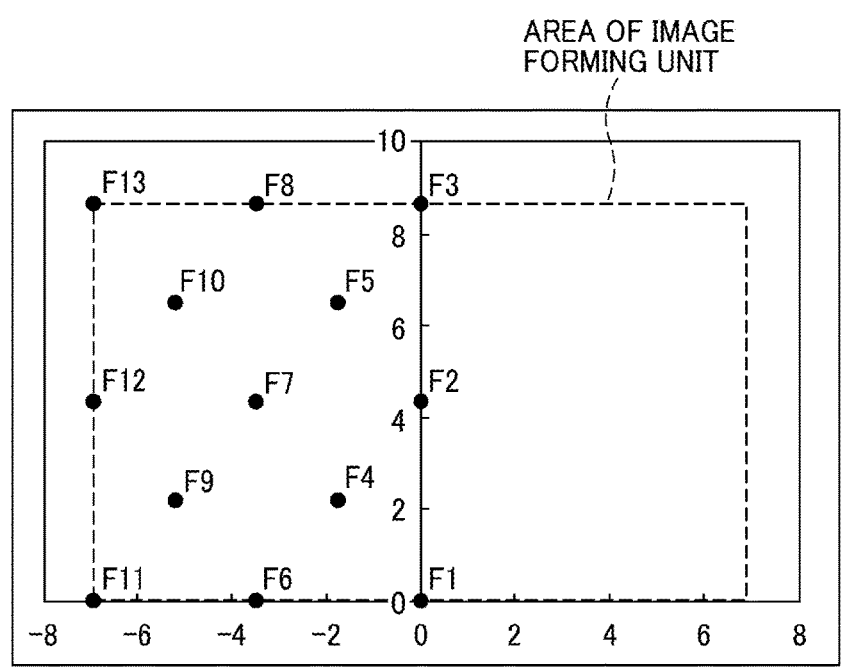
FIG. 4 is an explanatory diagram illustrating field angle numbers (evaluation points) in an image display area virtually displayed on an image display element by setting, as an origin point, a lens optical axis of a dioptric system out of the projection optical system according to the first example of the first embodiment of the present invention.
Figure 5:
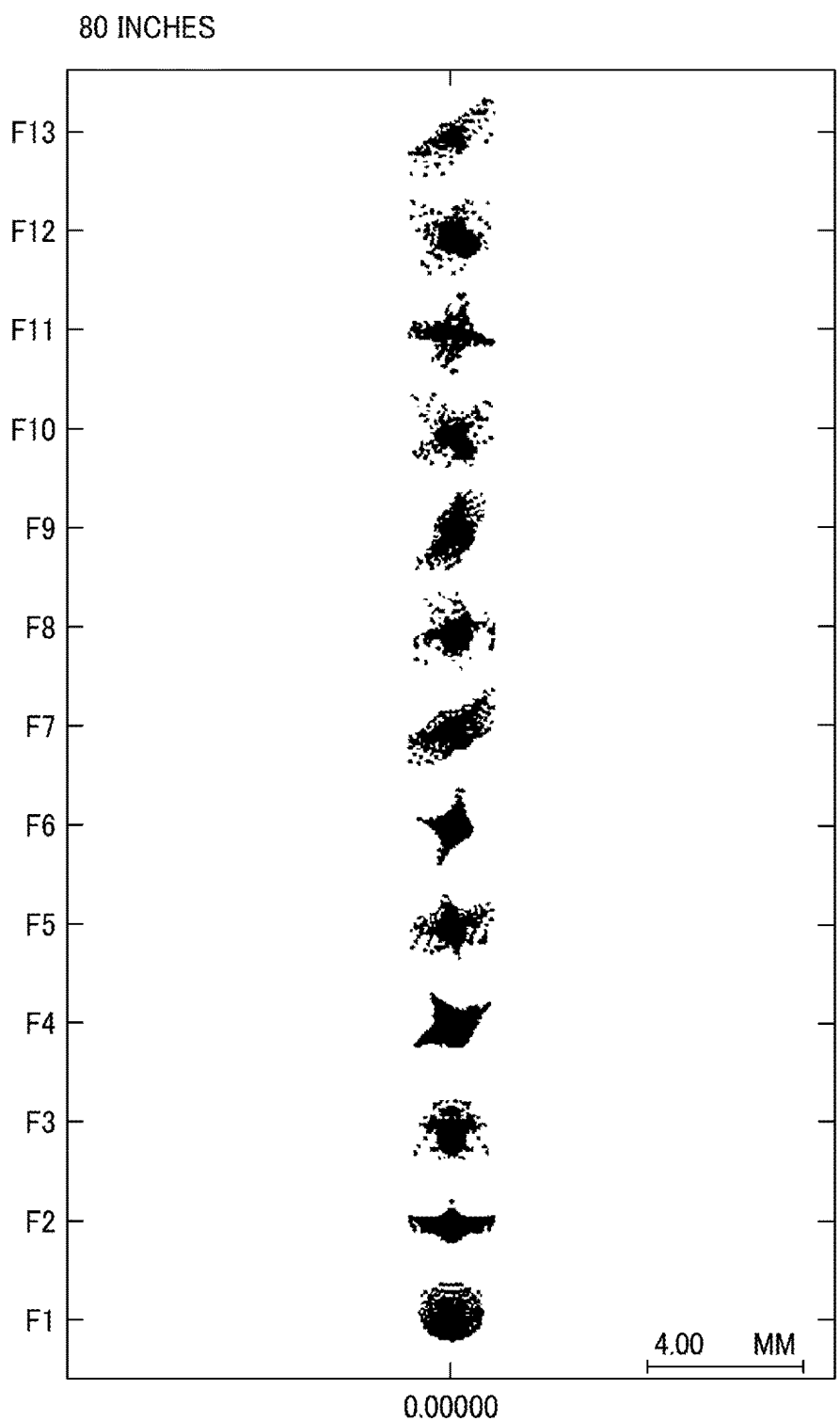
FIG. 5 is a diagram illustrating a spot diagram on a screen (in the case of 80 inches) for light emitted from respective evaluation points illustrated in FIG. 4.
Figure 6:
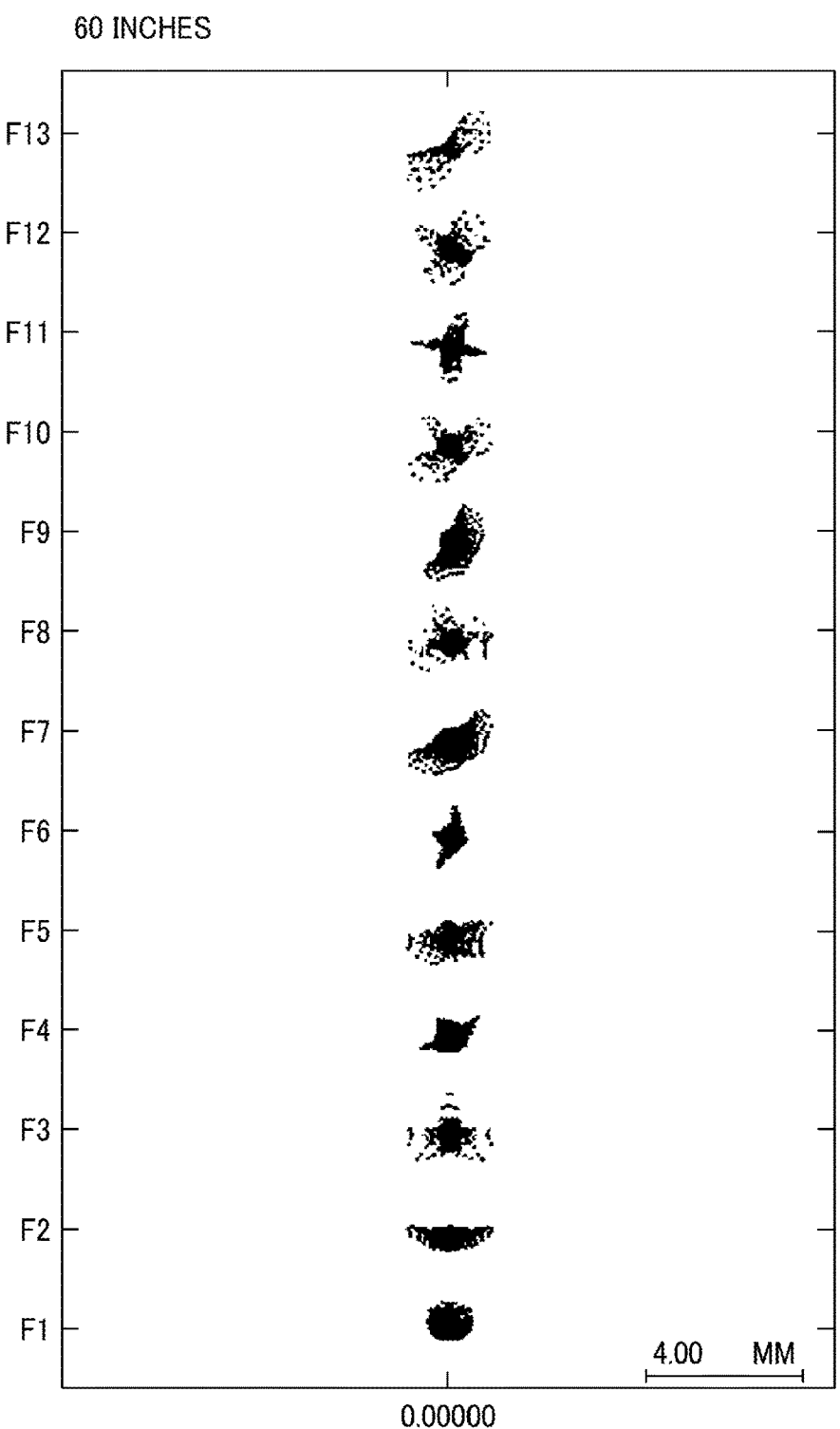
FIG. 6 is a diagram illustrating the spot diagram on the screen (in the case of 60 inches) for the light emitted from the respective evaluation points illustrated in FIG. 4.
Figure 7:
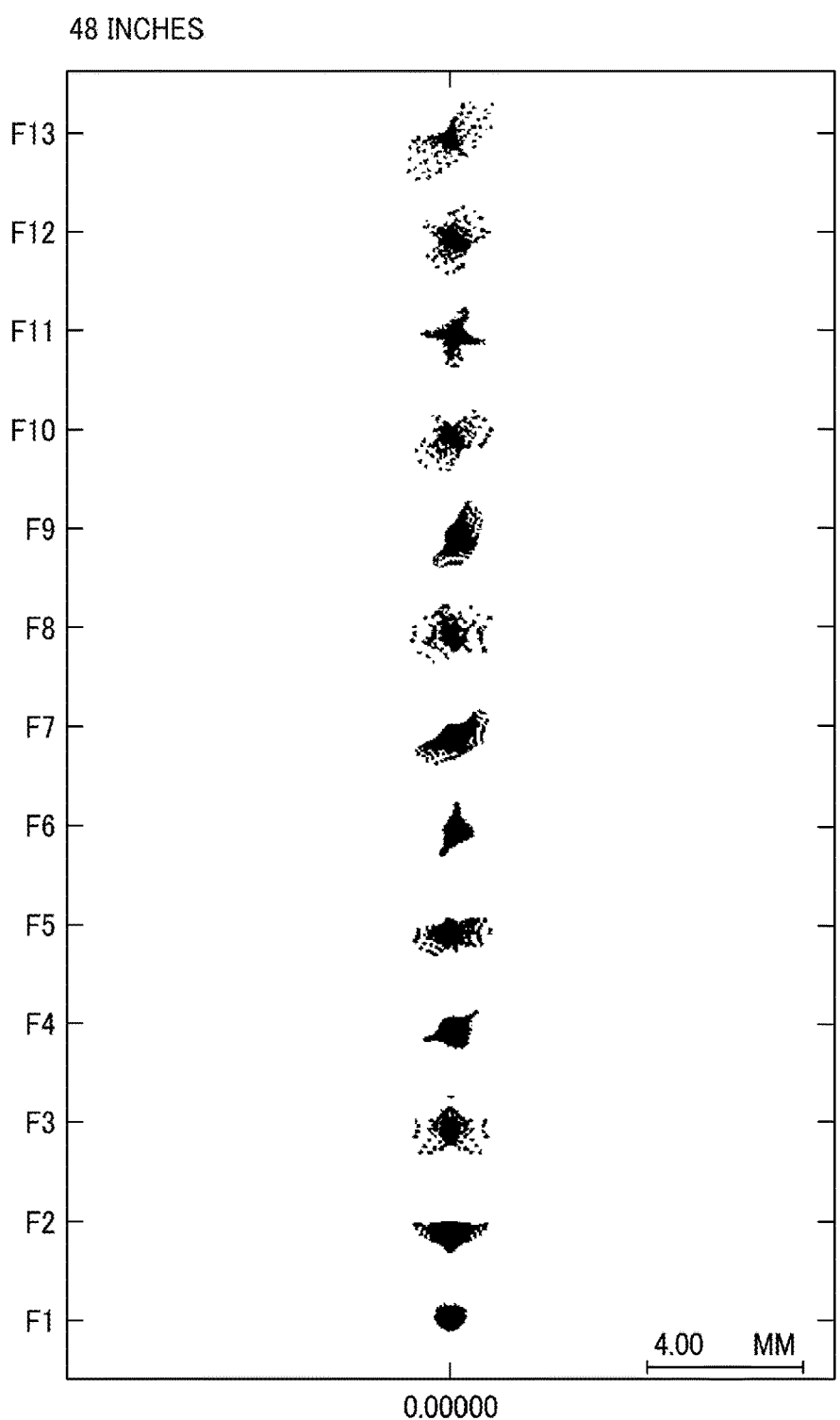
FIG. 7 is a diagram illustrating the spot diagrams on the screen (in the case of 48 inches) for the light emitted from the respective evaluation points illustrated in FIG. 4.

Spot diagrams corresponding to respective field angles illustrated in FIG. 4 are illustrated in FIGS. 5 to 7. The respective spot diagrams represent imaging characteristics (mm) on the screen with respect to wavelengths 625 nm (red), 550 nm (green), and 425 nm (blue). It is clear that good imaging is performed.

The focal lengths in the entire system and the first lens group in the case of a room temperature (20 degrees) and the case where the temperature is increased by 20 more degrees are shown in next TABLE 7.

TABLE 7

|  | 20 DEGREES | 40 DEGREES |
|---|---|---|
| ENTIRE SYSTEM | 20.63 | 20.63 |
| FIRST LENS GROUP | 72.43 | 72.44 |

This shows that change of the focal lengths at the time of temperature change is suppressed.

Note that values corresponding to the conditional expressions (1) to (4) are as shown below and satisfy the respective conditional expressions (1) to (4) in the case of the first example:

$dnT = -4.4$　　　　Conditional expression (1):

$vd = 74.7031$　　　Conditional expression (2):

$TR = 0.219$ to $0.232$　　Conditional expression (3):

$BF/Y = 3.45$　　　Conditional expression (4)

Second Example

Next, a projection device according to a second example of the first embodiment will be described with reference to FIG. 8.

As illustrated in FIG. 8, an axis in a normal direction of an image forming unit and parallel to an axis A that is an axis shared by axisymmetric lenses is defined as Z-axis. Among axes within a surface including a beam emitted from a center of an image display element and passing a center of a stop S, an axis vertical to the axis A is defined as Y-axis. An axis vertical to the axis A and the Y-axis is defined as X-axis. In FIG. 8, the clockwise rotary direction is defined as +α direction.

FIG. 9 illustrates a lens configuration of a dioptric system and a focusing state according to a second example of the first embodiment of the present invention. In this dioptric system, a first lens group G1 having positive refractive power, a second lens group G2 having positive refractive power, a third lens group G3 having negative refractive power, and a fourth lens group G4 having positive refractive power are arranged in order from an image forming unit side to a magnification side. As illustrated in FIG. 8, a free-form surface concave mirror 13 is included in a position closest to the magnification side, and in performing focusing in response to change of a projection distance, the positive second lens group G2 and the negative third lens group G3 are moved to the image forming unit side, and the positive fourth lens group G4 is moved to the magnification side, at the time of focusing from a long distance side (100 inches) to a short distance side (60 inches).

The first lens group G1 includes, in order from an image forming unit LV side, a first lens L1 formed of a double-sided aspheric biconvex lens in which a convex surface having larger curvature than the magnification side is oriented to the image forming unit side, a second lens L2 formed of a negative meniscus lens in which a convex surface is oriented to the image forming unit side, a cemented lens including a third lens L3 formed of a negative meniscus lens in which a convex surface is oriented to the image forming unit side and a fourth lens L4 formed of a positive meniscus lens in which a convex surface is oriented to the image forming unit side, an aperture stop S, a fifth lens L5 formed of a negative meniscus lens in which a convex surface is oriented to the magnification side, a sixth lens L6 formed of a biconvex lens in which a convex surface having larger curvature than the image forming unit side is oriented to the magnification side, a seventh lens L7 formed of a double-sided aspheric surface negative meniscus lens in which a convex surface is oriented to the image forming unit side, a cemented lens including an eighth lens L8 formed of a biconvex lens in which a convex surface having larger curvature than an image forming surface side is oriented to the magnification side and a ninth lens L9 formed of a biconcave lens in which a concave surface having larger curvature than the magnification side is oriented to the image forming unit side, and a tenth lens L10 formed of a biconvex lens in which a convex surface having larger curvature than the image forming unit side is oriented to the magnification side. The second lens group G2 includes one eleventh lens L11 formed of a positive meniscus lens in which a convex surface is oriented to the image forming unit side. The third lens group G3 includes a twelfth lens L12 formed of a negative meniscus lens in which a convex surface is oriented to the image forming unit side, a thirteenth lens L13 formed of a biconcave lens in which a concave surface having larger curvature than the magnification side than the image forming unit side, and a fourteenth lens L14 formed of a double-sided aspheric surface negative meniscus lens in which a convex surface is oriented to the image forming unit side. The fourth lens group G4 includes one fifteenth lens L15 formed of a double-sided aspheric surface positive meniscus lens in which a convex surface is oriented to the magnification side.

A dioptric system is formed of the above lens groups, and a folding mirror 12 (surface 32) and a free-form surface concave mirror 13 (surface 33) are disposed at the magnification side thereof.

Note that the third lens L3 is referred to as positive lens P1, and the fifth lens L5 is referred to as negative lens N1.

Hereinafter, lens data is listed in TABLE 8. In the TABLE 8, a surface number attached with * is the aspheric surface, and a surface number attached with ** is the free-form surface.

surface, and a thirty-first surface attached with "*" are the aspheric surfaces, and parameters of the respective aspheric surfaces in the expression (5) are as shown in next TABLE 9.

Note that "En" is "exponent of 10", that is, "×10ⁿ" in the aspheric surface coefficient. For example, "E-05" represents "$\times 10^{-5}$".

TABLE 8

| | R | D | Nd | vd | GLASS | MATERIAL |
|---|---|---|---|---|---|---|
| | | | NUMERICAL APERTURE: 0.200 | | | |
| 1 | ∞ | 1.00 | | | | |
| 2 | ∞ | 1.00 | 1.51633 | 64.1420 | S-BSL7 | OHARA |
| 3 | ∞ | 28.00 | | | | |
| 4* | 15.425 | 6.00 | 1.49700 | 81.5459 | S-FPL51 | OHARA |
| 5* | −77.187 | 1.79 | | | | |
| 6 | 52.890 | 0.70 | 1.85478 | 24.7990 | S-NBH56 | OHARA |
| 7 | 29.580 | 1.14 | | | | |
| 8 | 15.516 | 0.80 | 1.90366 | 31.3150 | TAFD25 | HOYA |
| 9 | 9.940 | 2.60 | 1.53775 | 74.7031 | S-FPM3 | OHARA |
| 10 | 20.056 | 1.44 | | | | |
| STOP | ∞ | 2.55 | | | | |
| 11 | −19.611 | 0.70 | 1.53775 | 74.7031 | S-FPM3 | OHARA |
| 12 | −42.699 | 2.01 | | | | |
| 13 | 26.678 | 4.58 | 1.58913 | 61.1526 | L-BAL35 | OHARA |
| 14 | −19.882 | 0.30 | | | | |
| 15* | 41.592 | 0.80 | 1.81600 | 46.6206 | S-LAH59 | OHARA |
| 16* | 21.739 | 1.48 | | | | |
| 17 | 58.130 | 6.06 | 1.85478 | 24.7990 | S-NBH56 | OHARA |
| 18 | −12.870 | 1.00 | 1.91650 | 31.6041 | S-LAH88 | OHARA |
| 19 | 27.860 | 17.10 | | | | |
| 20 | 75.931 | 9.74 | 1.59522 | 67.7357 | S-FPM2 | OHARA |
| 21 | −48.799 | VARIABLE DA | | | | |
| 22 | 37.217 | 6.17 | 1.75700 | 47.8232 | S-LAM54 | OHARA |
| 23 | 90.427 | VARIABLE DB | | | | |
| 24 | 666.346 | 2.00 | 1.91650 | 31.6041 | S-LAH88 | OHARA |
| 25 | 75.497 | 9.76 | | | | |
| 26 | −38.360 | 2.20 | 1.83481 | 42.7253 | S-LAH55V | OHARA |
| 27 | 964.042 | 0.30 | | | | |
| 28* | 47.073 | 3.00 | 1.53046 | 55.8000 | RESIN | |
| 29* | 27.388 | VARIABLE DC | | | | |
| 30* | −34.791 | 5.30 | 1.53046 | 55.8000 | RESIN | |
| 31* | −30.585 | VARIABLE DD | | | | |
| 32 | ∞ | −82.93 | REFLECTION SURFACE | | | |
| 33** | ∞ | VARIABLE DE | REFLECTION SURFACE | | | |

That is, in TABLE 8, optical surfaces of a fourth surface, a fifth surface, a fifteenth surface, a sixteenth surface, a twenty-eighth surface, a twenty-ninth surface, a thirtieth

TABLE 9

| | K | A4 | A6 | A8 |
|---|---|---|---|---|
| | ASPHERIC SURFACE COEFFICIENTS | | | |
| 4TH SURFACE | 0.1378 | −2.0241E−05 | | |
| 5TH SURFACE | −78.3049 | 2.1652E−05 | 1.4060E−07 | |
| 15TH SURFACE | 1.7996 | −2.3606E−05 | −6.0352E−08 | |
| 16TH SURFACE | −1.0833 | 1.2898E−05 | −4.7269E−08 | |
| 28TH SURFACE | −4.2758 | −2.2742E−05 | −2.7249E−08 | 3.2226E−10 |
| 29TH SURFACE | −1.6081 | −5.5024E−05 | 8.3205E−08 | −7.5460E−11 |
| 30TH SURFACE | −0.2509 | −3.4657E−05 | 4.9250E−08 | −1.3282E−10 |
| 31TH SURFACE | −0.7157 | −2.6314E−05 | 1.8397E−08 | −2.4843E−11 |
| | A10 | A12 | A14 | A16 |
| 4TH SURFACE | | | | |
| 5TH SURFACE | | | | |
| 15TH SURFACE | | | | |
| 16TH SURFACE | | | | |

TABLE 9-continued

| ASPHERIC SURFACE COEFFICIENTS | | | | |
|---|---|---|---|---|
| 28TH SURFACE | −9.0197E−13 | 1.2636E−15 | −9.26832E−19 | 2.87074E−22 |
| 29TH SURFACE | 2.3101E−14 | | | |
| 30TH SURFACE | 3.8358E−13 | −4.1608E−16 | 1.5424E−19 | |
| 31TH SURFACE | −6.1850E−14 | 4.0889E−16 | −5.11951E−19 | 1.97594E−22 |

DA, DB, DC, DD, and DE in TABLE 8 represent variable distances.

Among the distances, the variable distance DA is a distance between the first lens group G1 and the second lens group G2, namely, the variable distance between a surface 21 and a surface 22. The variable distance DB is a distance between the second lens group G2 and the third group G3, namely, the variable distance between a surface 23 and a surface 24. The variable distance DC is a distance between the third lens group G3 and a fourth lens group G4, namely, the variable distance between a surface 29 and a surface 30.

The variable distance DD is a distance between the fourth lens group G4 and the folding mirror 12, and DE is the variable distance between the free-form surface concave mirror 13 and a screen surface SC.

Thus, in a projection optical system, the second lens group G2 and the third lens group G3 are moved to the image forming unit side, and the fourth lens group G4 is moved to the magnification side in FIG. 9 at the time of focusing from the long distance side to the short distance side to perform focusing in response to the change of the projection distance. Thus, by changing a magnifying ratio, focus adjustment is performed in accordance with the projection sizes of the 60 inches, 80 inches, and 100 inches of a diagonal size of a projection image.

The surface distances DA, DB, DC, DD, and DE in which the distances between the lens groups are varied at the time of focus adjustment are indicated as "variable DA", "variable DB", "variable DC", "variable DD", and "variable DE" in TABLE 10, and as illustrated in next TABLE 10, the surface distances DA to DE are varied with respect to the diagonal sizes 60, 80, and 100 inches of the projection image.

TABLE 10

| VARIABLE DISTANCE FOCUSING | | | |
|---|---|---|---|
| SCREEN SIZE | SHORT DISTANCE 60 INCHES | STANDARD 80 INCHES | LONG DISTANCE 100 INCHES |
| VARIABLE DA | 2.00 | 3.03 | 3.54 |
| VARIABLE DB | 4.81 | 4.48 | 4.31 |
| VARIABLE DC | 23.02 | 18.46 | 16.08 |
| VARIABLE DD | 49.70 | 53.56 | 55.59 |
| VARIABLE DE | 297.04 | 385.42 | 473.41 |

Further, the shape of the free-form surface is specified by the above-described expression (6), providing an inverse number of paraxial curvature radius (paraxial curvature) C, a height from an optical axis H, a conic constant K, and free-form surface coefficients listed in next TABLE 11 while defining X as an amount of the free-form surface in the optical axis direction.

TABLE 11

| FREE-FORM SURFACE COEFFICIENTS | |
|---|---|
| | 33TH SURFACE |
| K | 0 |
| C4 | 1.0582E−02 |
| C6 | −8.2531E−04 |
| C8 | 9.9460E−05 |
| C10 | −2.2150E−04 |
| C11 | −7.4734E−07 |
| C13 | 7.7163E−06 |
| C15 | −3.5768E−07 |
| C17 | −2.8343E−08 |
| C19 | 1.8056E−07 |
| C21 | 3.8225E−08 |
| C22 | 1.1049E−10 |
| C26 | 1.0935E−09 |
| C28 | 4.2954E−10 |
| C30 | −2.2417E−12 |
| C32 | −5.5901E−11 |
| C34 | −1.3183E−11 |
| C36 | −1.7253E−13 |
| C37 | −1.6625E−14 |
| C39 | 3.3160E−15 |
| C41 | −5.9419E−13 |
| C43 | −1.2863E−13 |
| C45 | −1.7223E−14 |
| C47 | 3.3385E−16 |
| C49 | 1.8374E−15 |
| C51 | −1.5395E−15 |
| C53 | 8.8023E−16 |
| C55 | 6.2272E−17 |
| C56 | 1.5129E−18 |
| C58 | 7.2133E−18 |
| C60 | 1.7912E−17 |
| C64 | 1.0211E−17 |
| C66 | 1.1251E−18 |

Note that the projection distance and TR take values listed in next TABLE 12 in accordance with the short distance side, standard, and long distance side. Here, TR is expressed as:

[a distance to the screen from an intersection between the free-form surface concave mirror 13 and the axis A]/[a lateral width of the screen]

TABLE 12

| PROJECTION DISTANCE AND TR | | | |
|---|---|---|---|
| | SHORT DISTANCE 60 INCHES | STANDARD 80 INCHES | LONG DISTANCE 100 INCHES |
| PROJECTION DISTANCE | 299.67 | 388.02 | 476.00 |
| TR | 0.226 | 0.219 | 0.215 |

Hereinafter, specific values of a DMD used as an image forming unit LV of the second example and others are shown.

DMD size
Dot size: 7.56 μm

Length in lateral direction: 14.5152 mm
Length in vertical direction: 8.1648 mm
Optical axis to center of device: 5.30 mm
BF/Y: 3.45

Positional coordinates of the folding mirror 12 and free-form surface concave mirror 13 from an apex in a focused state in which the projection image of the lens positioned closest to a reflection surface side is maximized are shown in next TABLE 13. As for rotation, an angle made by a surface normal and the optical axis is indicated.

TABLE 13

|  | Y-AXIS | Z-AXIS | α |
|---|---|---|---|
| 32ND SURFACE | 0.00 | 55.59 | −45.00 |
| 33TH SURFACE | 82.93 | 77.48 | −102.80 |

Figure 10:
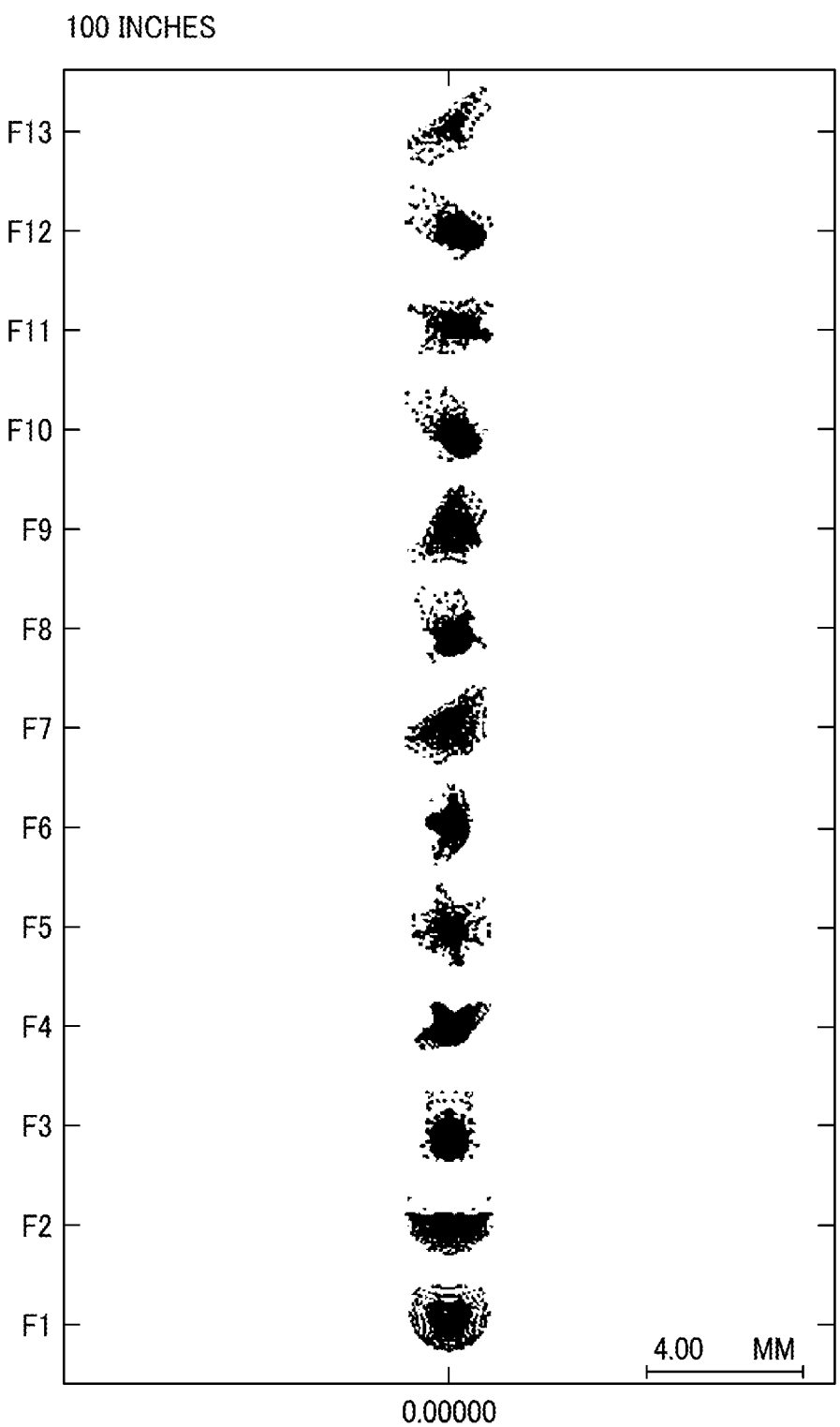
FIG. 10 is a diagram illustrating a spot diagram on a 100-inch screen for respective evaluation points (respective field angles) illustrated in FIG. 4 in the projection device according to the second example of the first embodiment.
Figure 11:
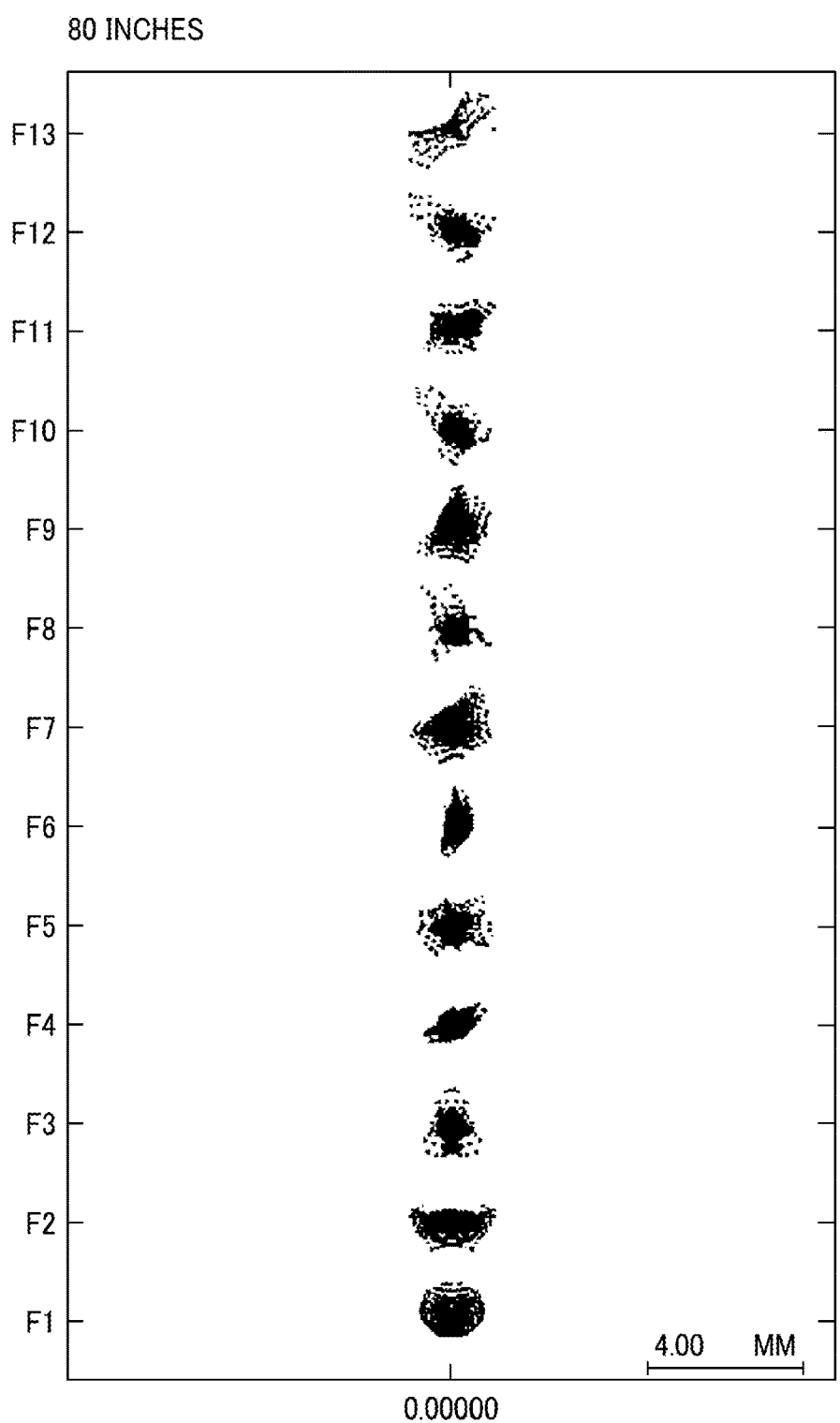
FIG. 11 is a diagram illustrating the spot diagram on a 80-inch screen for the respective evaluation points (respective field angles) illustrated in FIG. 4 in the projection device according to the second example of the first embodiment.
Figure 12:
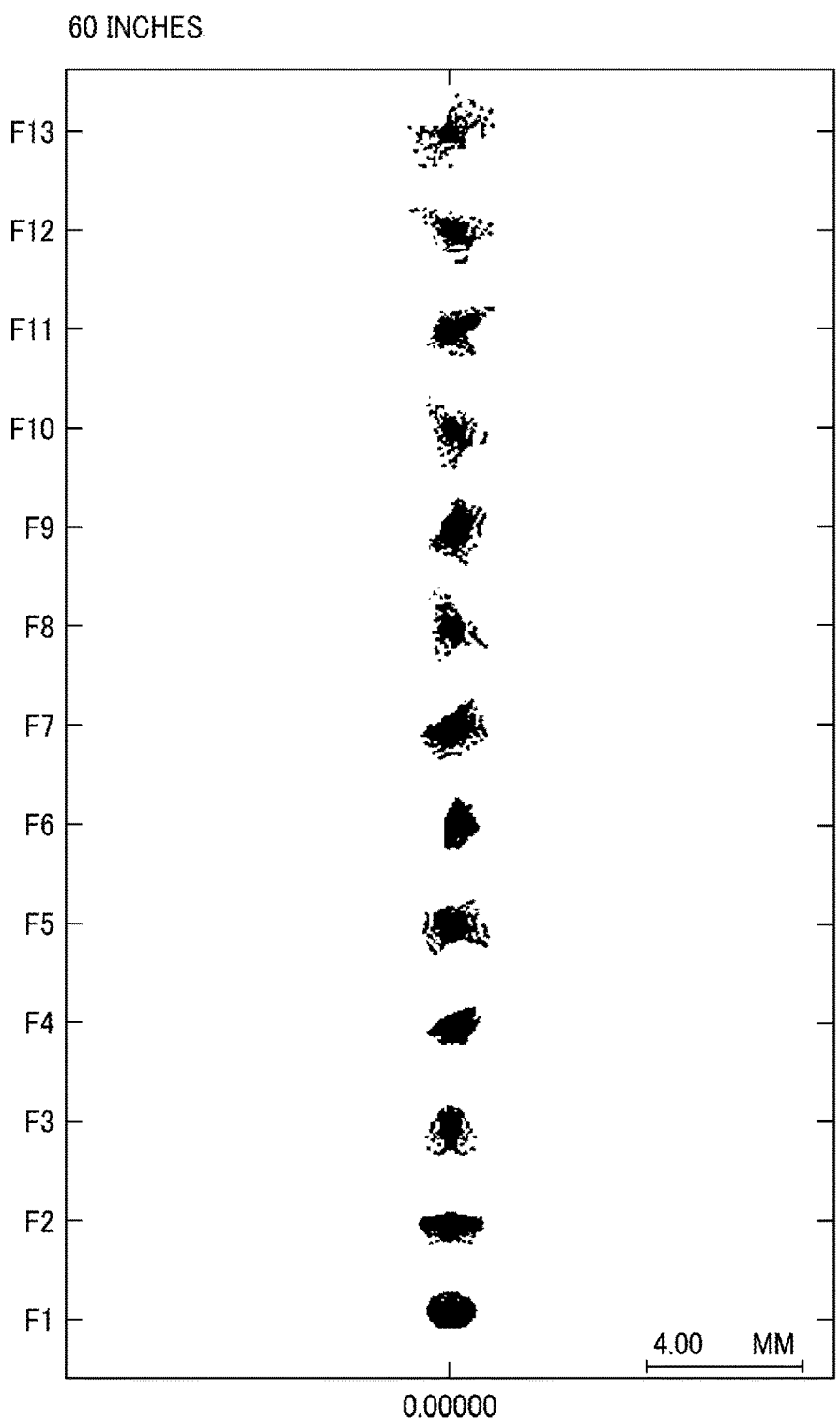
FIG. 12 is a diagram illustrating the spot diagram on a 60-inch screen for the respective evaluation points (respective field angles) illustrated in FIG. 4 in the projection device according to the second example of the first embodiment.

Spot diagrams corresponding to respective field angles illustrated in FIG. 4 are illustrated in FIGS. 10 to 12. The respective spot diagrams represent imaging characteristics (mm) on the screen with respect to wavelengths 625 nm (red), 550 nm (green), and 425 nm (blue). It is clear that good imaging is performed.

That is, in the projection device according to the second example, the spot diagrams on the screen corresponding to the respective field angles (evaluation points) illustrated in FIG. 4 are illustrated in FIG. 10 in the case of 100 inches, in FIG. 11 in the case of 80 inches, and in FIG. 12 in the case of 60 inches, respectively.

As can be seen in FIGS. 10 to 12, it is clear that good imaging is performed.

Focal lengths in the entire system and the first lens group in the case of a room temperature (20 degrees) and the case of 40 degrees where the temperature is increased by 20 more degrees are shown in next TABLE 14.

TABLE 14

|  | 20 DEGREES | 40 DEGREES |
|---|---|---|
| ENTIRE SYSTEM | 20.19 | 20.20 |
| FIRST LENS GROUP | 41.97 | 41.99 |

This shows that change of the focal lengths at the time of temperature change is suppressed.

Note that values corresponding to the conditional expressions (1) to (4) are as shown below and satisfy the respective conditional expressions (1) to (4) in the case of the second example:

$dnT = -4.4$   Conditional expression (1):

$vd = 74.7031$   Conditional expression (2):

$TR = 0.215$ to $0.226$   Conditional expression (3):

$BF/Y = 3.45$   Conditional expression (4):

According to the projection device specified by the specific exemplary values, the image projection device having an ultra-short projection distance, formed in a compact size, and having high performance and excellent temperature characteristics can be achieved by designating the appropriate glass material for each of the positive lens and the negative lens inside the fixed lens group. While the preferable embodiments of the present invention have been described in the above first and second examples of the first embodiment, the present invention is not limited to the content thereof.

Especially, the specific shapes and values of the respective components exemplified in the first and second examples of the first embodiment are merely examples to implement the present invention, and it should not be understood that a technical scope of the present invention is limited by these examples.

Referring now to FIGS. 13 to 32, a projection device and a projection system including the projection device will be described according to a second embodiment of the present invention.

Before describing specific examples, concept of the second embodiment of the present invention will be described.

The present invention is a projection device to magnify and project, on a screen, an image displayed at an image display element. The projection device includes a dioptric system and a reflection optical system having a reflection optical element including at least one magnification. The dioptric system includes at least one cemented lens, and the cemented lens includes at least one in each of a positive lens P1 and a negative lens N1 satisfying following conditional expressions (7), (8), (9), and (10):

$4 < dnTP$   (7)

$0.61 < \theta gFP$   (8)

$3 < dnTN$   (9)

$0.59 < \theta gFN$   (10)

where
a temperature coefficient of a relative refractive index in an e line within a range of 40 to 60 degrees of the positive lens P1 is dnTP,
a partial dispersion ratio in a g line and an F line of the positive lens P1 is θgFP,
a temperature coefficient of a relative refractive index in the e line within a range of 40 to 60 degrees of the negative N1 is dnTN,
a partial dispersion ratio of the negative lens N1 is θgFN,
and a partial dispersion ratio is θgf, the partial dispersion ratio θgf being expressed by an expression: $\theta gf = (Ng - NF)/(NF - NC)$, where
a refractive index relative to the g line is Ng,
a refractive index relative to the F line is NF, and
a refractive index relative to a C line is NC.

When glass material of the positive lens P1 and the negative lens N1 satisfies the conditional expressions (7) and (9), not only change of a focal length caused by temperature increase can be corrected by the two lenses but also particularly change of imaging surface curvature can be highly corrected. As a result, good resolution can be obtained in every detail in the ultra-short throw projector despite occurrence of temperature increase.

Further, temperature compensation can be performed by satisfying the conditional expressions (7) and (9), but this is not sufficient for aberration correction, especially, chromatic aberration correction. Both optical performance and temperature characteristics can be achieved well only after the conditional expressions (8) and (10) are satisfied at the same time. More preferably, following conditional expressions (7') and (9') are satisfied as well:

$4.8 < dnTP$   (7')

$3.5 < dnTN$   (9').

More preferably, the cemented lens is disposed more on a magnification side than an aperture stop. By thus disposing the cemented lens, aberration correction can be effectively performed. Further, the aperture stop herein indicates a place where thickness of a luminous flux passing the dioptric system from an entire area of the image display element (entire luminous flux) becomes thinnest.

More preferably, the cemented lens is included in a lens group including the aperture stop. The lens group including the aperture stop is the lens group where the temperature tends to increase because the light is concentrated, and a projection optical system having good temperature characteristics can be achieved by disposing the cemented lens in this lens group.

More preferably, the cemented lens is included in a lens group on a side closest to the image display element. The projection optical system having the good temperature characteristics can be achieved by disposing the cemented lens in the lens group closest to the image display element.

More preferably, the cemented lens is included in a lens group which is not moved at the time of focusing. The reason is that the good temperature characteristics can be achieved in respective image sizes.

More specifically, when an axis shared by a plurality of axisymmetric lenses of the dioptric system is defined as an optical axis A, at least one resin lens satisfying following conditional expressions (11) and (12) is included in a lens group which is moved at the time of focusing:

$$|P40d(h)-P20d(h)|\times FP<0.02 \quad (11)$$

$$|h|<0.85\times D \quad (12)$$

where a height from the optical axis A is h, a distance between the optical axis A and a point where a distance from the optical axis A becomes largest out of intersections between a reduction-side lens surface and a beam is D, a paraxial focal length in a line d of the resin lens is FP, a magnification when a temperature at the height h from the optical axis A is 40 degrees is P40d(h), and a magnification when the temperature at the height h from the optical axis A is 20 degrees is P20d(h).

An imaging surface particularly in a periphery of a screen can be highly corrected by using the resin lens including an aspheric surface or a free-form surface for a group that is moved at the time of focus. However, in the case of intending to improve an effect of imaging surface correction, the imaging surface is largely moved by change of the magnification at the time of temperature increase. The conditional expression (11) represents a magnification difference at the certain lens height h between the case of having the room temperature and the case where the temperature is increased by 20 more degrees from the room temperature. The conditional expression (12) represents a range of the height h. By controlling the magnification difference in the conditional expression (11) to be an upper limit or less in a lens diameter range of the conditional expression (12), thereby achieving to minimize tilt of the imaging surface at the time of temperature increase. Also, the imaging surface in the periphery of the screen can be highly corrected even at the time of temperature increase by further satisfying the conditional expressions (7), (8), (9), (10), (11), and (12) at the same time.

More preferably, the resin lens is included in a lens group that is moved at the time of focusing. With this arrangement, image surface curvature caused by temperature change can be effectively prevented.

More preferably, the reflection optical element is a concave mirror and includes a free-form surface. The image surface curvature can be effectively corrected by using the free-form surface.

More preferably, the conditional expression (4) is satisfied when an axis shared by the plurality of axisymmetric lenses of the dioptric system is set as an optical axis:

$$BF/Y<4.0 \quad (4)$$

where

BF denotes a distance from an intersection between a surface including the image display element and the optical axis to a vertex of a display element side surface of a lens closest to the display element, and a maximum value of a distance between the optical axis and an end portion of an image forming unit is Y.

The projection optical system can be downsized by satisfying the conditional expression (4). Further, more preferably, a following conditional expression (4') is satisfied as well:

$$BF/Y<3.5 \quad (4').$$

More preferably, the projection optical system is a non-telecentric optical system. Adoption of the non-telecentric optical system is advantageous in downsizing.

More preferably, the conditional expression (3) is satisfied as well:

$$TR<0.30 \quad (3)$$

where a distance to a screen from an intersection between the concave mirror and the optical axis A/lateral width of a screen is TR.

The projection device having an extremely short projection distance can be achieved by satisfying the conditional expression (3). More preferably, a conditional expression (3') is satisfied as well:

$$TR<0.27 \quad (3').$$

As described above, with the above-described configuration, the projection optical system can have the extremely short projection distance and higher luminance, and a projection image display device formed in a compact size and having high performance and excellent temperature characteristics can be provided.

Second Embodiment

First Example

Next, a configuration of a projection optical system of a projection device according to the above-described embodiment of the present invention will be described in detail.

Figure 13:
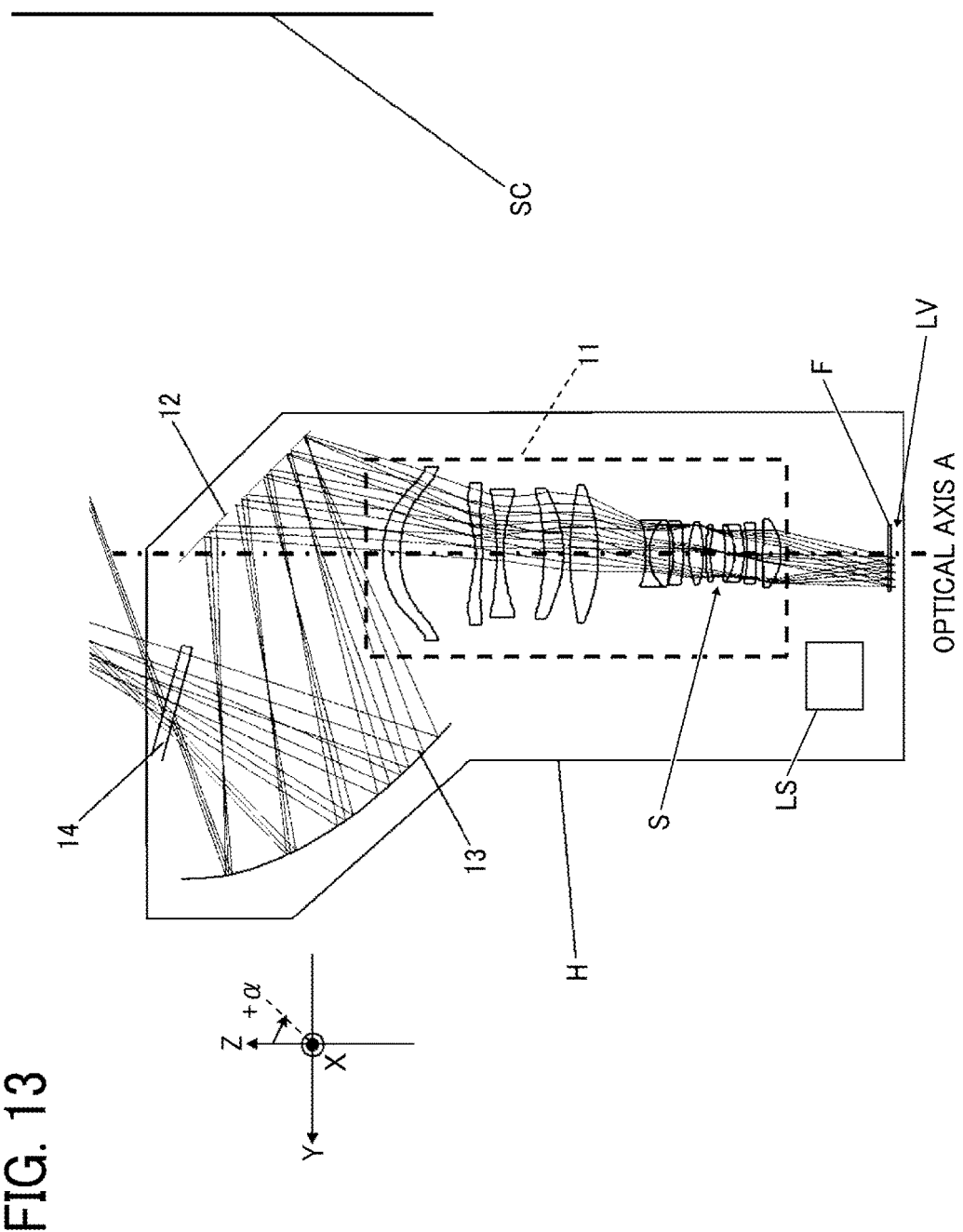
FIG. 13 is a cross-sectional view illustrating a configuration of a projection device together with an optical path according to a first example of a second embodiment of the present invention.

FIG. 13 is a cross-sectional view illustrating the configuration of the projection device together with an optical path according to a first example of the second embodiment of the present invention.

Figure 14:
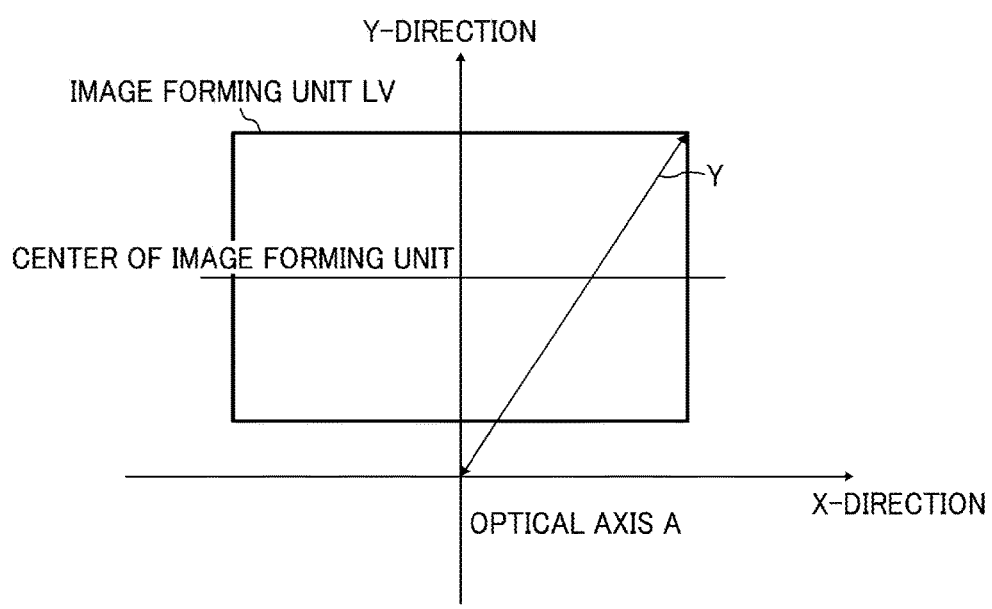
FIG. 14 is an explanatory diagram illustrating a positional relation between an optical axis and a center of an image forming unit in which an image is formed, when the image forming unit is shifted in Y-direction by a predetermined amount relative to the optical axis.

FIG. 14 is an explanatory diagram illustrating a positional relation between an optical axis and a center of an image forming unit in which an image is formed, when the image forming unit is shifted in Y-direction by a predetermined amount relative to the optical axis.

Figure 15A:
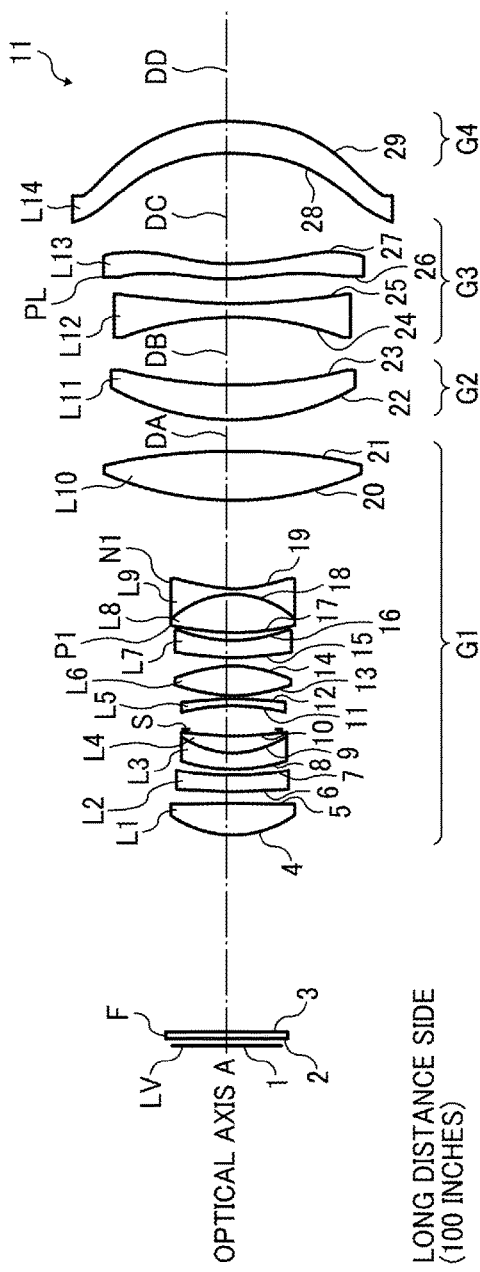
FIG. 15A and FIG. 15B are cross-sectional views illustrating moving positions of a focusing lens for respective projection sizes of a projection optical system used in the projection device according to the first example of the second embodiment of the present invention.
Figure 15B:
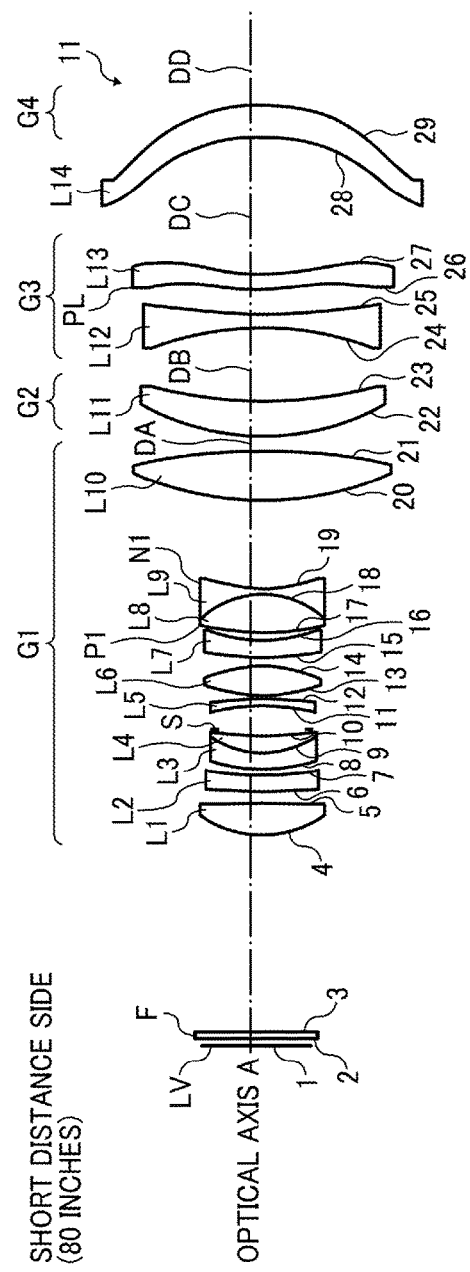

FIG. 15 (FIG. 15A and FIG. 15B) is a cross-sectional view illustrating moving positions of a focusing lens for each projection size of the projection optical system used in the projection device according to the first example of the second embodiment of the present invention, and FIG. 15A illustrates a case where the projection size is a long distance side (100 inches), and FIG. 15B illustrates a case where the projection size is a short distance side (80 inches).

In FIG. 13, a reference sign LV indicates the image forming unit. The image forming unit LV is, more specifically, a light valve such as a "Digital Micro-mirror Device (abbreviated as DMD)", a "transmissive liquid crystal panel", and a "reflective liquid crystal panel", and a portion indicated by the reference sign LV is a "portion where an image to be projected is formed". In the case where the image forming unit LV does not have a function to emit light by itself like the DMD, image information formed at the image forming unit LV is illuminated by illumination light from an illumination optical system LS. For the illumination optical system LS, a system having a function to effectively illuminate the image forming unit LV is preferable.

Further, for example, a rod integrator and a fly-eye integrator can be used in order to uniform illumination. Additionally, for a light source of the illumination, a white light source such as a super-high pressure mercury lamp, a xenon lamp, a halogen lamp, and an LED can be used. Further, a monochromatic light source such as a monochromatic LED and a Laser Diode (LD) can be also used. A known technology is adopted as the illumination optical system. Therefore, providing a specific example is omitted here.

According to the present embodiment, the DMD is assumed as the image forming unit LV. Further, the present embodiment has a precondition that "the image forming unit does not have a function to emit light" by itself, but an image forming unit including "a self-light emitting system having a function to cause a generated image to emit light" can be also used.

A parallel plate F disposed in the vicinity of the image forming unit LV is assumed to be a cover glass (seal glass) of the image forming unit LV. A reference sign H represents an outer surface of the projection device, and a reference sign S represents a stop (aperture stop). Further, a reference sign SC in FIG. 13 represents a screen.

FIG. 13 illustrates an optical path diagram in the case of 80 inches in which a front lens element is most protruded. As illustrated in FIG. 13, an axis shared by a plurality of axisymmetric lenses is defined as an optical axis A, a direction parallel to the optical axis A is defined as Z-axis direction, an axis vertical to the optical axis A within a surface including a beam emitted from a center of the image display element and passing a center of the stop S is defined as a Y-axis, and an axis vertical to the optical axis A and Y-axis is defined as an X-axis. In FIG. 13, a clockwise rotary direction is defined as +a direction.

A luminous flux having intensity two-dimensionally modulated by the image information at the DMD is to be a projected luminous flux as an object light. The projected luminous flux from the image forming unit LV passes a dioptric system 11, a folding mirror 12, and a free-form surface concave mirror 13, and becomes an imaging luminous flux. In other words, an image formed on the DMD (image forming unit LV) is magnified and projected on the screen SC by the projection optical system, and becomes a projection image. Here, a surface on which the image is formed is defined as an image forming surface. Respective optical elements in the dioptric system 11 share an optical axis individually, and the image forming unit LV is shifted in the Y-direction relative to the optical axis A as illustrated in FIG. 14.

According to the first example of the second embodiment, the system is formed by using the dioptric system 11, folding mirror 12, and one free-form surface concave mirror 13. The number of mirrors may be increased, but this is not so preferable because the configuration may become complex and upsized, and cost increase may be caused as well.

Heat generation by absorbing heat and light from a power source and a lamp is increased in the illumination optical system LS along with enhancement of higher luminance. Particularly, in the projector using the non-telecentric optical system, a light absorption amount to a lens barrel is largely increased by shortening back focus for downsizing. Therefore, a lens group closest to an image display side has the temperature easily increased, and temperature compensation is needed inside the lens group.

Considering above, in the first example of the second embodiment, change of a focal length and expansion of a mechanical holder caused by heat are balanced by using glass material satisfying conditional expressions (7), (8), (9), and (10) (for example, S-NBH56 having nd: 1.85478, νd: 24.799, dnTP: 5.1, and θgFP: 0.6122 of OHARA INC., and TAFD25 having nd: 1.90366, νd: 31.315 dnTN: 3.6, θgFN: 0.5947 of HOYA CORPORATION) for each of a positive lens P1 and a negative lens N1 of a cemented lens disposed closer to the magnification side than the stop S. Further, in addition to the above, an aspheric surface lens is adopted for a positive lens closest to an image display element side, thereby achieving to highly adjust temperature change at the image surface curvature.

Moreover, by appropriately disposing a cooling mechanism, temperature change can be suppressed for the lens group which has the aspheric surface lens and is moved at the time of focus, and temperature change at the image surface curvature can be suppressed.

The light having passed the dioptric system 11 forms, as a space image, an intermediate image on a side closer to the image forming unit LV than the folding mirror 12. The intermediate image is conjugate to the image information formed on the image forming unit LV. The intermediate image is not necessarily imaged as a planar image, and formed as a curved image in both the first embodiment and other embodiments. The intermediate image is magnified and projected by the free-form surface concave mirror 13 disposed closest to the magnification side, and screened on the screen SC. The intermediate image includes image surface curvature and distortion, but the curvature and distortion can be corrected by using the free-form surface concave mirror 13.

Therefore, a lens system has a reduced burden to perform aberration correction, thereby increasing freedom of design and having an advantage in downsizing, for example. Further, the free-form surface referred herein is an anamorphic surface in which X-direction curvature corresponding to an X-direction position in an optional Y-direction position is not constant, and Y-direction curvature corresponding to a Y-direction position in an optional X-direction position is not constant.

Preferably, a dust-proof glass 14 is disposed between the free-form surface concave mirror 13 and the screen SC. According to the present first embodiment, a flat plate glass is used as the dust-proof glass 14, but the glass may also have curvature, or may be an optical element having a magnification such as a lens. Further, the duct-proof glass is disposed tilted to the optical axis A instead of being vertical, but the tilting angle is optional and may be vertical to the optical axis A.

Next, the first example of the second embodiment of the present invention will be described in detail with reference to FIG. 15.

The reference signs in the first example and a later-described second example are defined as follows.
f: focal length in entire system
NA: numerical aperture
ω: half field angle (deg.)
R: curvature radius (paraxial curvature radius on the aspheric surface)
D: surface distance
Nd: refractive index
vd: Abbe number
K: conic constant of aspheric surface
Ai: $i^{th}$ aspheric surface coefficient
Cj: free-form surface coefficient A shape of the aspheric surface is expressed by a following known expression (13) by setting X as an amount of the aspheric surface in the optical axis direction, defining that:
C: an inverse of paraxial curvature radius (paraxial curvature);
H: a height from optical axis; and
K: a conic constant, and
using the above-mentioned aspheric surface coefficient of each degree.

[Expression 13]

$$X = \frac{C \cdot H^2}{1 + \sqrt{1 - (1+K) \cdot C^2 \cdot H^2}} + \sum_{i=1} Ai \cdot H^i$$

The shape is specified by providing the paraxial curvature radius, conic constant, and aspheric surface coefficient.

Further, a shape of the free-form surface is specified by a following known expression (14) by setting X as an amount of the free-form surface in the optical axis direction, defining that:
C: an inverse number of paraxial curvature radius (paraxial curvature);
H: a height from the optical axis; and
K: a conic constant, and
using the above-mentioned free-form surface coefficient.

[Expression 14]

$$X = \frac{C \cdot H^2}{1 + \sqrt{1 - (1+K) \cdot C^2 \cdot H^2}} + \sum_{j=1} Cj \cdot x^m y^n$$

However, there is a following condition.

$$j = \frac{(m+n)^2 + m + 3n}{2} + 1$$

The shape of the free-form surface is specified by providing the paraxial curvature radius, conic coefficient, and free-form surface coefficient.

As illustrated in FIG. 13, the Z-axis is an axis in a normal direction of the image forming unit and also an axis parallel to the optical axis A which is the axis shared by axisymmetric lenses. Among the axes within the surface including the beam emitted from the center of the image display element and passing the center of the stop S, an axis vertical to the axis A is defined as the Y-axis, and an axis vertical to the optical axis A and the Y-axis is defined as the X-axis. In FIG. 13, the clockwise rotary direction is defined as +α direction.

Further, a curvature radius p at a distance h from the optical axis on the aspheric surface is calculated by a following expression. The expression of the aspheric surface f(h) is differentiated by h, and the curvature radius is acquired by using the following expression.

[Expression]

$$f'h = \frac{df(h)}{dh}, f''h = \frac{d^2 f(h)}{dh^2}, p = \frac{f''h}{\{1 + (f'h)^2\}^{3/2}}$$

In FIG. 15, a lens structure of the dioptric system and a focusing state according to the first example of the second embodiment of the present invention are illustrated. In this dioptric system, a first lens group G1 having positive refractive power, a second lens group G2 having positive refractive power, a third lens group G3 having negative refractive power, and a fourth lens group G4 having positive refractive power are sequentially arranged in a direction from the image forming unit side to the magnification side. In performing focusing in response to change of the projection distance, the positive second lens group G2 and the negative third lens group G3 are moved to the image forming unit side, and the positive fourth lens group G4 is moved to the magnification side at the time of focusing from the long distance side (100 inches) to the short distance side (80 inches).

The first lens group G1 includes, sequentially from the image forming unit LV side:
a first lens L1 formed of a double-sided aspheric biconvex lens in which a convex surface having larger curvature than the magnification side is oriented to the image forming unit side;
a second lens L2 formed of a negative meniscus lens in which a convex surface is oriented to the image forming unit side,
a cemented lens including a third lens L3 formed of a negative meniscus lens in which a convex surface is oriented to the image forming unit side, and a fourth lens L4 formed of a positive meniscus lens in which a convex surface is oriented to the image forming unit;
the stop S;
a fifth lens L5 formed of a negative meniscus lens in which a convex surface is oriented to the magnification side;
a sixth lens L6 formed of a double-sided aspheric biconvex lens in which a convex surface having larger curvature than the image forming unit side is oriented to the magnification side;
a seventh lens L7 formed of a negative meniscus lens in which a convex surface is oriented to the image forming unit side;
a cemented lens including an eighth lens L8 formed of a biconvex lens in which a convex surface having larger curvature than the image forming unit side is oriented to the magnification side, and a ninth lens L9 formed of a biconcave lens in which a concave surface having larger curvature than the magnification side is oriented to the image forming unit side; and
a tenth lens L10 formed of a biconvex lens in which a convex surface having larger curvature than the magnification side is oriented to the image forming unit side.

The second lens group G2 includes an eleventh lens L11 formed of a positive meniscus lens in which a convex surface is oriented to the image forming unit side.

The third lens group G3 includes a twelfth lens L12 formed of a biconcave lens in which a concave surface having curvature larger than the magnification side is oriented to the image forming unit side, and a thirteenth lens L13 formed of a double-sided aspheric negative meniscus lens PL made of resin in which a convex surface is oriented to the image forming unit side.

The fourth lens group G4 includes a fourteenth lens L14 formed of a double-sided aspheric surface positive meniscus lens in which a convex surface is oriented to the magnification side.

The dioptric system is formed of the above lens groups, and the folding mirror 12 (surface 30) which is a flat surface mirror and the free-form surface concave mirror 13 (surface 31) are disposed on the magnification side thereof.

Note that the eighth lens L8 is referred to as the positive lens P1, and the ninth lens L9 is referred to as the negative lens N1.

In the following, lens data is listed in TABLE 15. In the TABLE 15, a surface number attached with * is the aspheric surface, and a surface number attached with ** is the free-form surface.

TABLE 15

NUMERICAL APERTURE: 0.200

|  | R | D | Nd | vd | GLASS MATERIAL |  | EFFECTIVE DIAMETER D |
|---|---|---|---|---|---|---|---|
| 1 | ∞ | 1.00 |  |  |  |  |  |
| 2 | ∞ | 1.00 | 1.51633 | 64.142 | S-BXL7 | OHARA | 8.25 |
| 3 | ∞ | 29.00 |  |  |  |  | 8 |
| 4* | 16.079 | 4.80 | 1.49700 | 81.5459 | S-FPL51 | OHARA | 7.5 |
| 5* | −89.788 | 1.67 |  |  |  |  | 7.1 |
| 6 | 206.572 | 2.30 | 1.74000 | 28.2960 | S-TIH3 | OHARA | 7.5 |
| 7 | 32.959 | 1.09 |  |  |  |  | 7.1 |
| 8 | 26.761 | 2.42 | 1.90366 | 31.3150 | TAFD25 | HOYA | 7.1 |
| 9 | 13.739 | 2.69 | 1.53775 | 74.7031 | S-FPM3 | OHARA | 6.5 |
| 10 | 61.626 | 0.83 |  |  |  |  | 6.4 |
| STOP | ∞ | 3.37 |  |  |  |  | 6.4 |
| 11 | −28.002 | 1.00 | 1.53775 | 74.7031 | S-FPM3 | OHARA | 6.8 |
| 12 | −60.555 | 0.60 |  |  |  |  | 7.0 |
| 13* | 24.520 | 4.11 | 1.58913 | 61.1526 | L-BAL35 | OHARA | 7.4 |
| 14* | −21.460 | 1.55 |  |  |  |  | 7.2 |
| 15 | 66.842 | 2.47 | 1.80400 | 46.5834 | S-LAH65V | OHARA | 8.0 |
| 16 | 21.739 | 1.07 |  |  |  |  | 7.9 |
| 17 | 42.163 | 5.64 | 1.85478 | 24.7990 | S-NBH56 | OHARA | 8.0 |
| 18 | −13.240 | 0.90 | 1.90366 | 31.3150 | TAFD36 | HOYA | 8.2 |
| 19 | 27.595 | 12.88 |  |  |  |  | 6.7 |
| 20 | 46.438 | 7.52 | 1.60300 | 65.4436 | S-PHM53 | OHARA | 17.6 |
| 21 | −84.414 | VARIABLE DA |  |  |  |  | 18.0 |
| 22 | 36.209 | 5.20 | 1.75700 | 47.8232 | S-LAM54 | OHARA | 19.3 |
| 23 | 64.941 | VARIABLE DB |  |  |  |  | 18.8 |
| 24 | −45.996 | 2.00 | 1.74950 | 35.3325 | S-NBH51 | OHARA | 18.4 |
| 25 | 86.417 | 3.77 |  |  |  |  | 19.3 |
| 26* | 45.199 | 2.00 | 1.53046 | 55.8000 | RESIN |  | 19.8 |
| 27* | 24.072 | VARIABLE DC |  |  |  |  | 21.0 |
| 28* | −39.515 | 4.80 | 1.53046 | 55.8000 | RESIN |  | 23.9 |
| 29* | −33.469 | VARIABLE DD |  |  |  |  | 24.9 |
| 30 | ∞ | −86.27 | REFLECTION SURFACE |  |  |  |  |
| 31** | ∞ | VARIABLE DE | REFLECTION SURFACE |  |  |  |  |

More specifically, in TABLE 15, a fourth surface, a fifth surface, a thirteenth surface, a fourteenth surface, a twenty-sixth surface, a twenty-seventh surface, a twenty-eighth surface, and a twenty-ninth surface attached with "*" have respective optical surfaces which are aspheric surfaces, and parameters of the respective aspheric surfaces in the expression (13) are as shown in next TABLE 16.

Note that "En" is "exponent of 10", that is, "×10ⁿ" in the aspheric surface coefficient. For example, "E−05" represents "$\times 10^{-5}$".

TABLE 16

ASPHERIC SURFACE COEFFICIENTS

|  | K | A4 | A6 | A8 | A10 | A12 | A14 | A16 |
|---|---|---|---|---|---|---|---|---|
| 4TH SURFACE | 0.5377 | −2.3967E−05 | −2.9939E−08 |  |  |  |  |  |
| 5TH SURFACE | −129.0056 | 2.3918E−05 | 1.7125E−07 | 3.5858E−10 |  |  |  |  |

TABLE 16-continued

ASPHERIC SURFACE COEFFICIENTS

| | K | A4 | A6 | A8 | A10 | A12 | A14 | A16 |
|---|---|---|---|---|---|---|---|---|
| 13TH SURFACE | −0.0703 | −1.1700E−05 | | | | | | |
| 14TH SURFACE | −0.7746 | 1.8915E−05 | 6.7969E−09 | | | | | |
| 26TH SURFACE | −12.7046 | −3.8470E−05 | −1.4633E−08 | 5.0093E−10 | −1.5116E−12 | 1.2508E−15 | 1.33153E−18 | −1.90159E−21 |
| 27TH SURFACE | −1.8124 | −7.6226E−05 | 1.5444E−07 | −1.5176E−10 | −9.0626E−14 | 2.4797E−16 | −5.24635E−20 | |
| 28TH SURFACE | −0.6508 | −4.6949E−05 | 1.0727E−07 | −4.6534E−10 | 1.7785E−12 | −2.7318E−15 | 1.44741E−18 | |
| 29TH SURFACE | −1.4422 | −3.5579E−05 | 3.0092E−08 | 3.4901E−11 | −6.3482E−13 | 2.7655E−15 | −4.20592E−18 | 2.14222E−21 |

DA, DB, DC, DD, and DE in TABLE 15 represent variable distances.

Among the distances, the variable distance DA is a distance between the first lens group G1 and the second lens group G2, namely, the variable distance between surface 21 and a surface 22. The variable distance DB is a distance between the second lens group G2 and the third group G3, namely, the variable distance between a surface 23 and a surface 24. The variable distance DC is a distance between the third lens group G3 and a fourth lens group G4, namely, the variable distance between a surface 27 and a surface 28.

The variable distance DD is a distance between the fourth lens group G4 and the folding mirror 12, and DE is the variable distance between the free-form surface concave mirror 13 and the screen SC.

Thus, in the projection optical system, the second lens group G2 and the third lens group G3 are moved to the image forming unit side and the fourth lens group G4 is moved to the magnification side in FIG. 15 at the time of focusing from the long distance side to the short distance side to perform focusing in response to the change of the projection distance. Thus, by changing a magnifying ratio, focus adjustment is performed in a range from 80 inches to 100 inches in a diagonal size of the projection image in accordance with a projection size.

At the time of focus adjustment, surface distances DA, DB, DC, DD, DE in which the distances between the lens groups are varied are indicated as "variable DA", "variable DB", "variable DC", "variable DD", and "variable DE" in TABLE 15, and as illustrated in next TABLE 17, the surface distances DA to DE are varied with respect to the diagonal sizes 100, 80, 60 inches of the projection image.

TABLE 17

VARIABLE DISTANCE FOCUSING

| SCREEN SIZE | SHORT DISTANCE 60 INCHES | STANDARD 80 INCHES | LONG DISTANCE 100 INCHES |
|---|---|---|---|
| VARIABLE DA | 2.00 | 3.63 | 4.52 |
| VARIABLE DB | 10.80 | 10.22 | 9.90 |
| VARIABLE DC | 20.27 | 17.79 | 16.33 |
| VARIABLE DD | 53.01 | 54.44 | 55.33 |
| VARIABLE DE | 344.24 | 445.94 | 547.55 |

Further, the shape of the free-form surface is specified by the above-described expression (14), providing an inverse number of paraxial curvature radius (paraxial curvature) C, a height from optical axis H, a conic constant K, and free-form surface coefficients listed in next TABLE 18 while defining X as an amount of the free-form surface in the optical axis direction.

TABLE 18

FREE-FORM SURFACE COEFFICIENTS

| | 31TH SURFACE |
|---|---|
| K | 0 |
| C4 | 9.6570E−03 |
| C6 | 2.9613E−03 |
| C8 | 8.1331E−05 |
| C10 | −1.0990E−04 |
| C11 | −6.4957E−07 |
| C13 | 6.3007E−06 |
| C15 | 9.5851E−07 |
| C17 | −3.4964E−08 |
| C19 | 1.4710E−07 |
| C21 | 4.2619E−08 |
| C22 | 8.7305E−11 |
| C26 | 1.0071E−09 |
| C28 | 3.9365E−10 |
| C30 | 6.5275E−13 |
| C32 | −5.3383E−11 |
| C34 | −8.8261E−12 |
| C36 | −1.5344E−13 |
| C37 | −8.8747E−15 |
| C39 | 7.0181E−14 |
| C41 | −6.1523E−13 |
| C43 | −1.1310E−13 |
| C45 | −8.4549E−15 |
| C47 | 1.6404E−16 |
| C49 | 1.9388E−15 |
| C51 | −2.7866E−15 |
| C53 | 3.8760E−16 |
| C55 | 1.5794E−16 |
| C56 | 7.4048E−19 |
| C58 | 3.3980E−18 |
| C60 | 1.4570E−17 |
| C64 | 6.7592E−18 |
| C66 | 1.4736E−18 |

Note that the projection distance and TR take values listed in next TABLE 19 in accordance with the short distance, standard, and long distance. Here note that TR is expressed as:

[distance to screen from intersection between free-
   form surface concave mirror 13 and optical axis
   $A$]/[lateral width of screen]

TABLE 19

PROJECTION DISTANCE AND TR

|  | SHORT DISTANCE 60 INCHES | STANDARD 80 INCHES | LONG DISTANCE 100 INCHES |
|---|---|---|---|
| PROJECTION DISTANCE | 347.24 | 448.94 | 550.55 |
| TR | 0.261 | 0.253 | 0.249 |

In the following, specific values of the DMD used as the image forming unit LV and others according to the first example of the second embodiment are shown.
DMD size
Dot size: 7.56 μm
Length in lateral direction: 14.5152 mm
Length in vertical direction: 8.1648 mm
Optical axis to center of device: 5.30 mm
BF/Y: 3.45

Positional coordinates of the folding mirror 12 and free-form surface concave mirror 13 from an apex in a focused state are shown in next TABLE 20. In the focused state, the projection image of the lens positioned closest to a reflection surface side is maximized. Meanwhile, as for rotation, an angle formed between a surface normal and the optical axis is indicated.

TABLE 20

|  | Y-AXIS | Z-AXIS | α |
|---|---|---|---|
| 30TH SURFACE | 0.00 | 55.59 | −45.00 |
| 31ST SURFACE | 82.93 | 77.48 | −102.80 |

Figure 17:
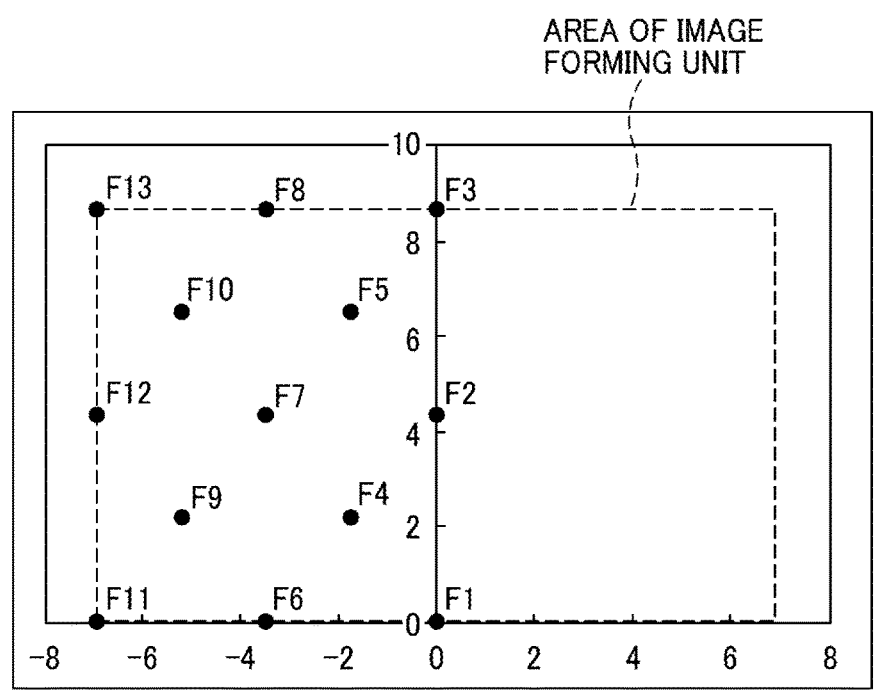
FIG. 17 is an explanatory diagram illustrating field angle numbers (evaluation points) in an image display area virtually displayed on an image display element by setting, as an origin point, a lens optical axis of a dioptric system out of the projection optical system according to the first example of the second embodiment of the present invention.
Figure 18:
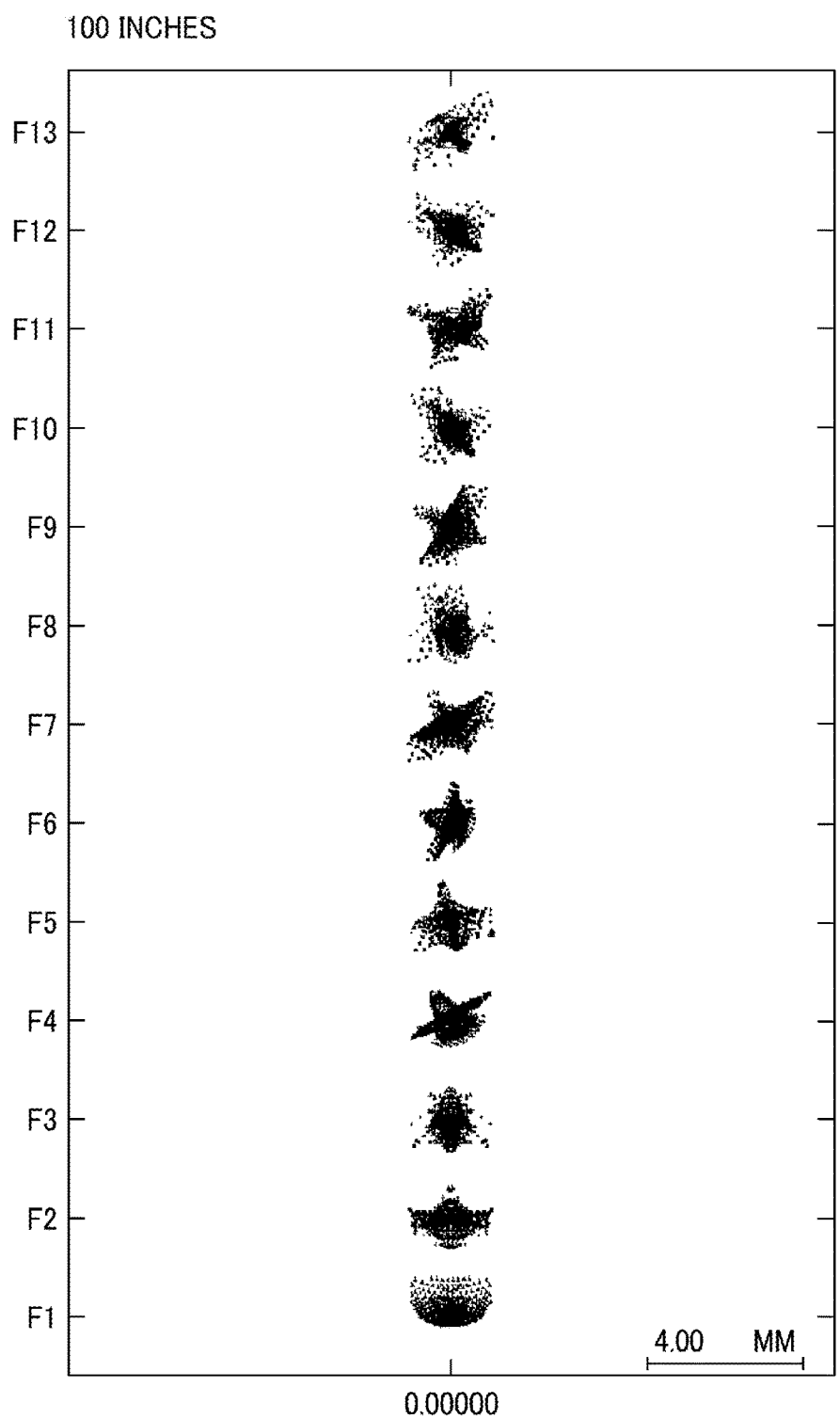
FIG. 18 is a diagram illustrating a spot diagram on a screen (in the case of 100 inches) for light emitted from respective evaluation points illustrated in FIG. 17.
Figure 19:
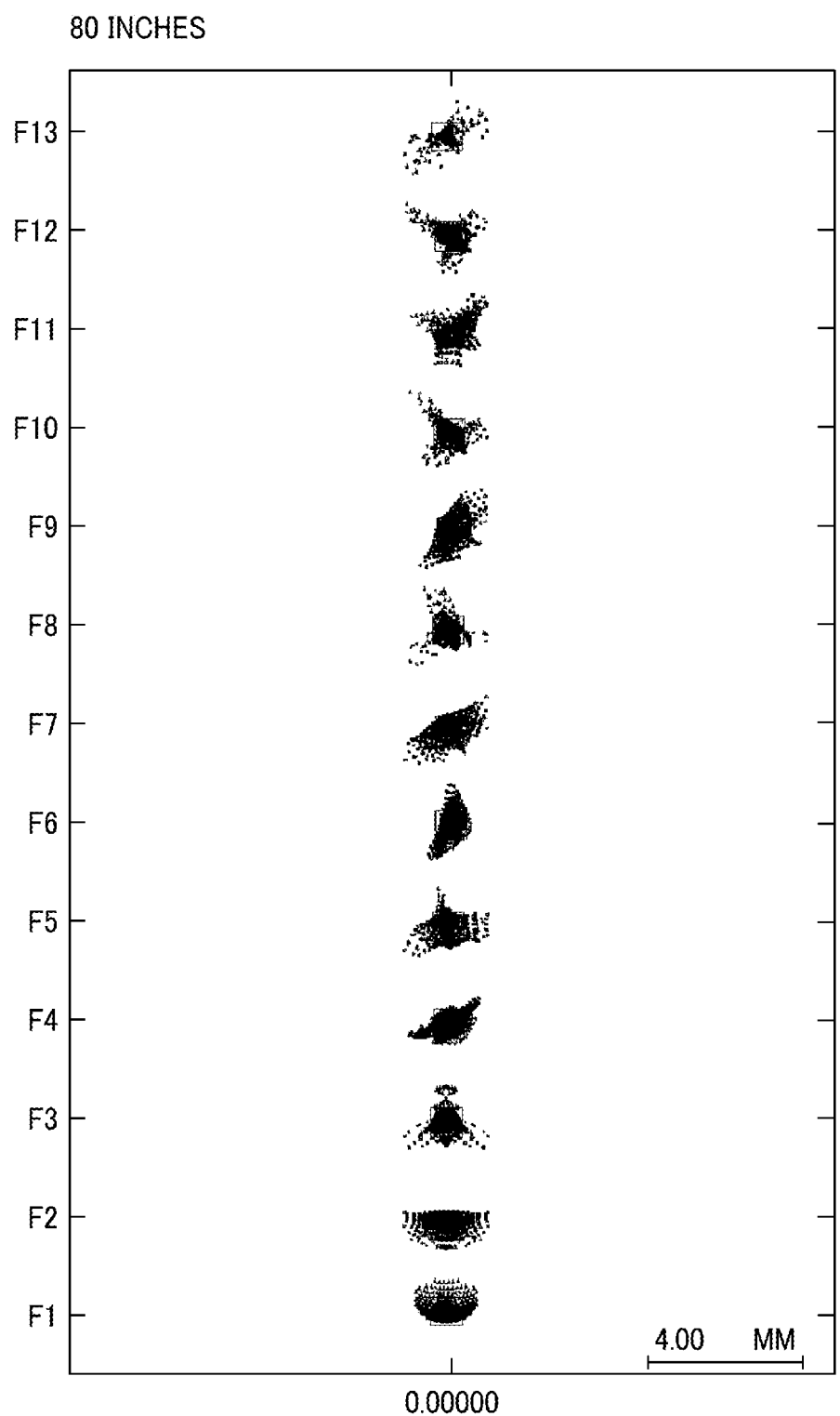
FIG. 19 is a diagram illustrating the spot diagram on the screen (in the case of 80 inches) for the light emitted from the respective evaluation points illustrated in FIG. 17.
Figure 20:
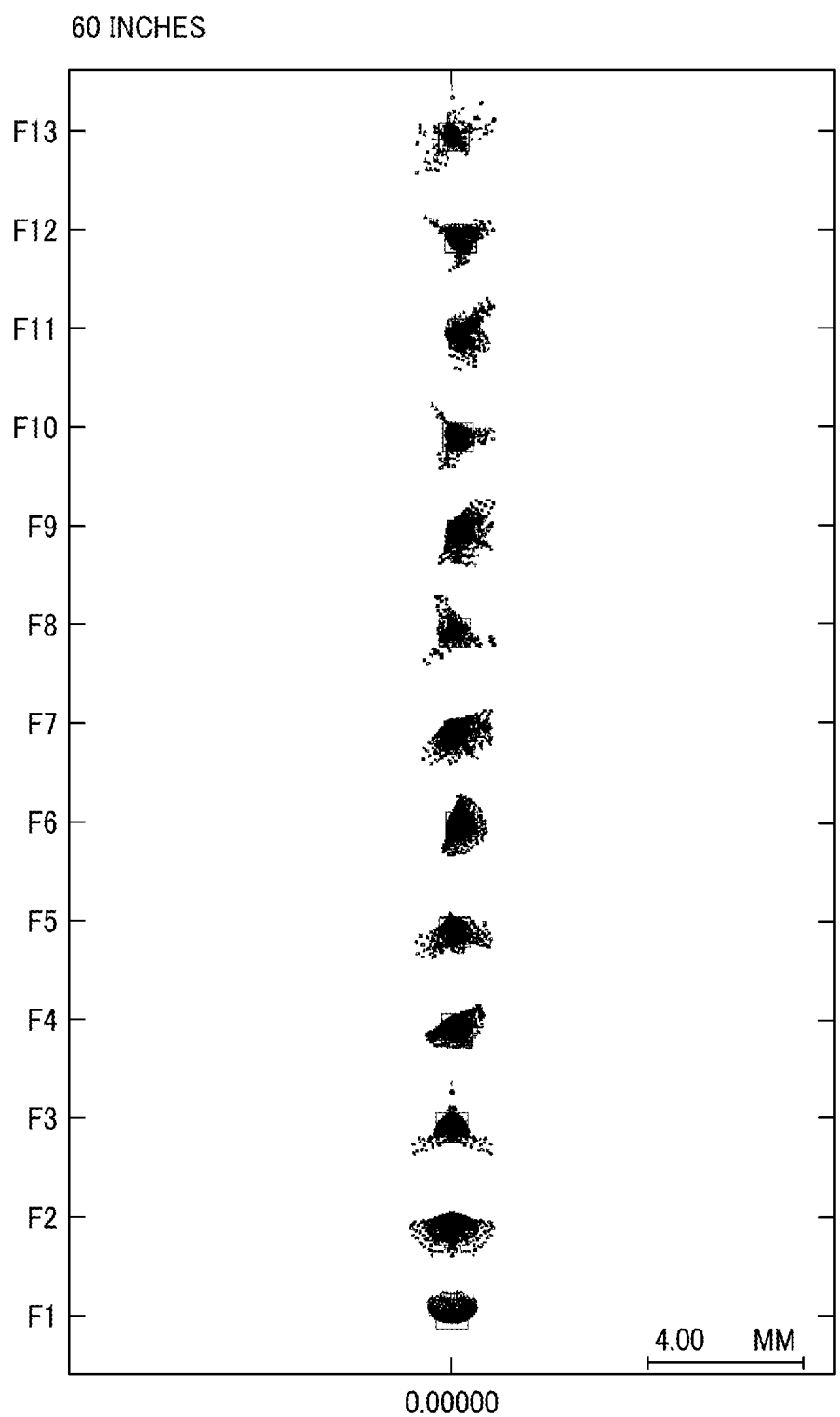
FIG. 20 is a diagram illustrating the spot diagrams on the screen (in the case of 60 inches) for the light emitted from the respective evaluation points illustrated in FIG. 17.

Spot diagrams corresponding to respective field angles illustrated in FIG. 17 are illustrated in FIG. 18 (in the case of 100 inches), FIG. 19 (in the case of 80 inches), and FIG. 20 (in the case of 60 inches). The respective spot diagrams represent imaging characteristics (mm) on the screen with respect to wavelengths 625 nm (red), 550 nm (green), and 425 nm (blue). It is clear that good imaging is performed.

The paraxial focal lengths in the entire system and the first lens group are shown in next TABLE 21 in the case of 100 inches when the temperature is a room temperature (20 degrees) and when the temperature is increased by 20 more degrees.

TABLE 21

|  | 20 DEGREES | 40 DEGREES |
|---|---|---|
| ENTIRE SYSTEM | 20.86 | 20.87 |
| FIRST LENS GROUP | 35.48 | 35.49 |

This shows that change of the focal length is suppressed at the time of temperature change.

Figure 21:
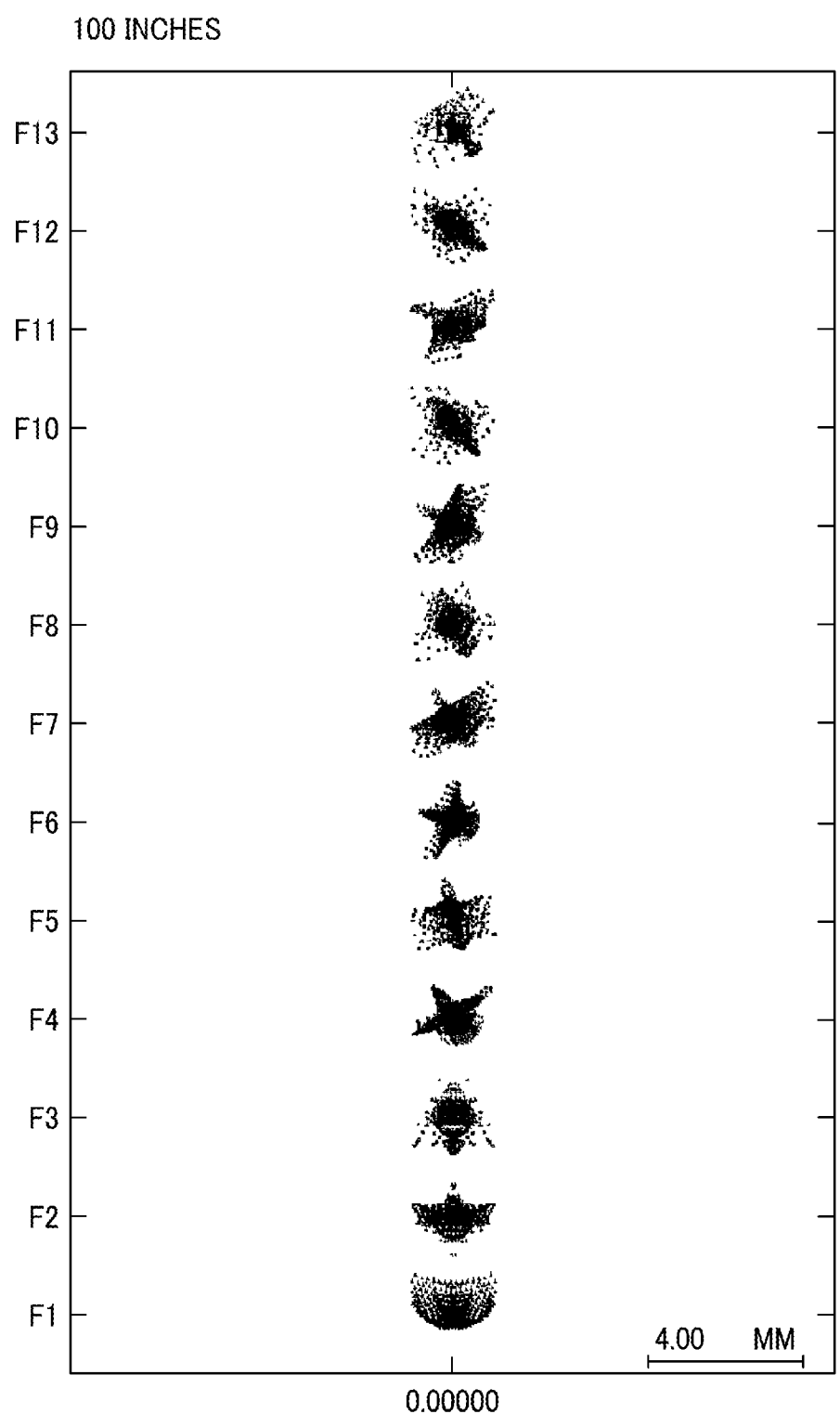
FIG. 21 is a diagram illustrating the spot diagram on the screen (in the case of 100 inches) for the light emitted from the respective evaluation points illustrated in FIG. 17 when the temperature is increased by 20 more degrees from the room temperature (20 degrees)
Figure 22:
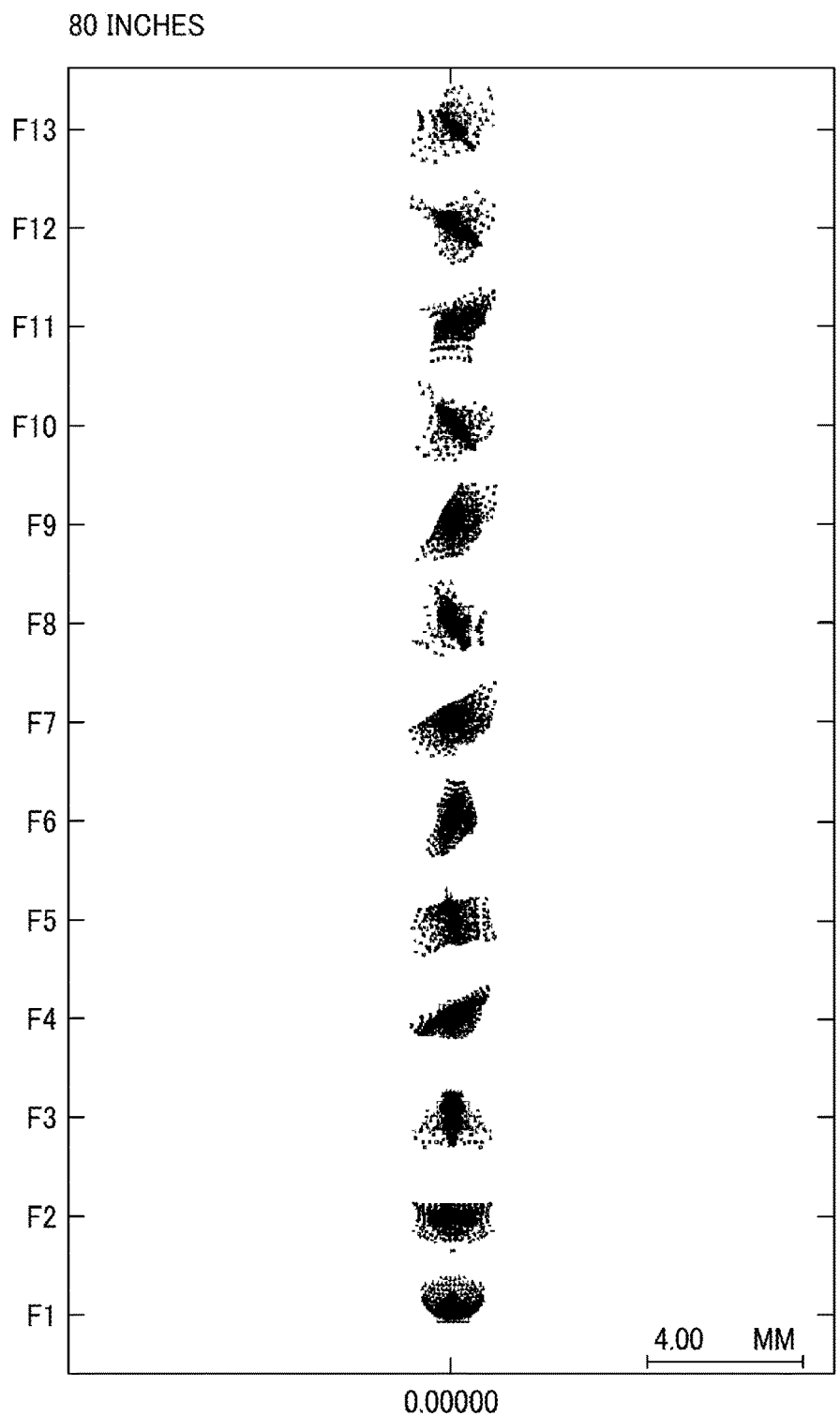
FIG. 22 is a diagram illustrating the spot diagram on the screen (in the case of 80 inches) for the light emitted from the respective evaluation points illustrated in FIG. 17 when the temperature is increased by 20 more degrees from the room temperature (20 degrees)
Figure 23:
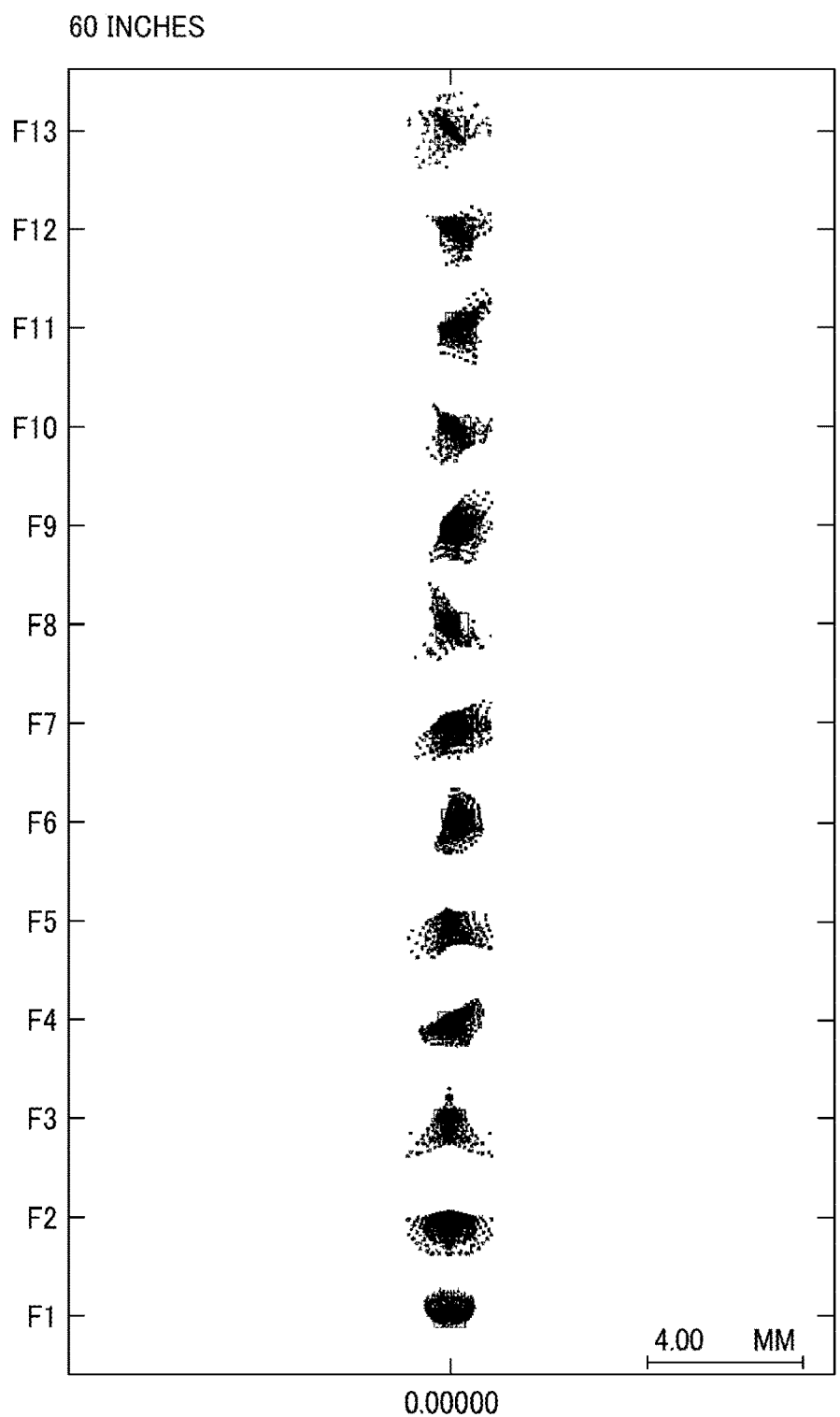
FIG. 23 is a diagram illustrating the spot diagram on the screen (in the case of 60 inches) for the light emitted from the respective evaluation points illustrated in FIG. 17 when the temperature is increased by 20 more degrees from the room temperature (20 degrees)

Further, FIGS. 21 to 23 illustrate spot diagrams in the respective image sizes (100 inches, 80 inches, 60 inches) when the temperature is increased by 20 more degrees from the room temperature (20 degrees).

FIGS. 21 to 23 also show good imaging performance even at the time of temperature increase.

Note that the values corresponding to the conditional expressions (3), (4), and (7) to (12) are as shown below and satisfy the respective conditional expressions (3), (4), and (7) to (12) in the case of the present example:

$dnTP=5.1$ Conditional expression (7):

$\theta gFP=0.6122$ Conditional expression (8):

$dnTN=3.6$ Conditional expression (9):

$\theta gFN=0.5947$ Conditional expression (10):

$|P40d(h)-P20d(h)| \times FP=0.02$ or less Conditional expression (11):

$0.85 \times D=16.745$ Conditional expression (12):

$TR=0.261$ (in the case of short distance 60 inches)

Figure 16:
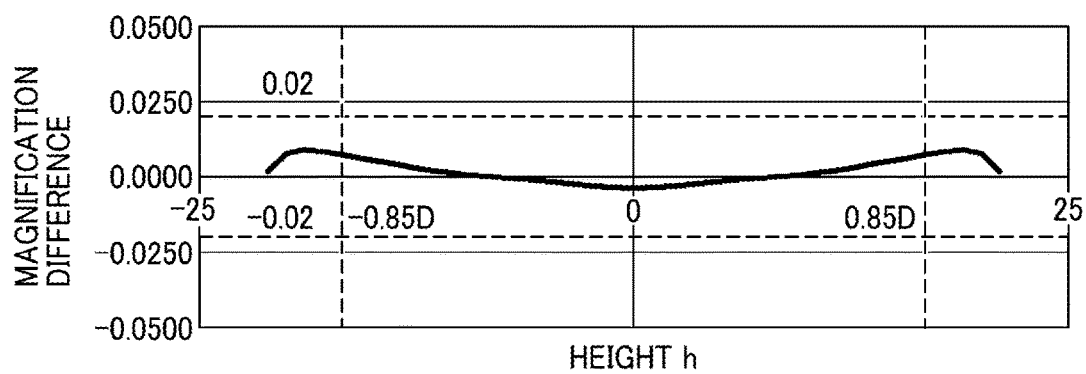
FIG. 16 is a characteristics diagram illustrating a relation between a height from an optical axis of a double-sided aspheric negative meniscus lens included in a third lens group in the first example of the second embodiment and a magnification difference under environment of a room temperature 40 degrees.

$:TR=0.254$ (in the case of standard distance 80 inches):

$TR=0.249$ (in the case of long distance 100 inches) Conditional expression (3):

$BF/Y=3.45$. (Conditional expression 4):

Further, as illustrated in FIG. 16, the conditional expression (12) is satisfied within a range of conditional expression (11).

Second Example

Figure 24:
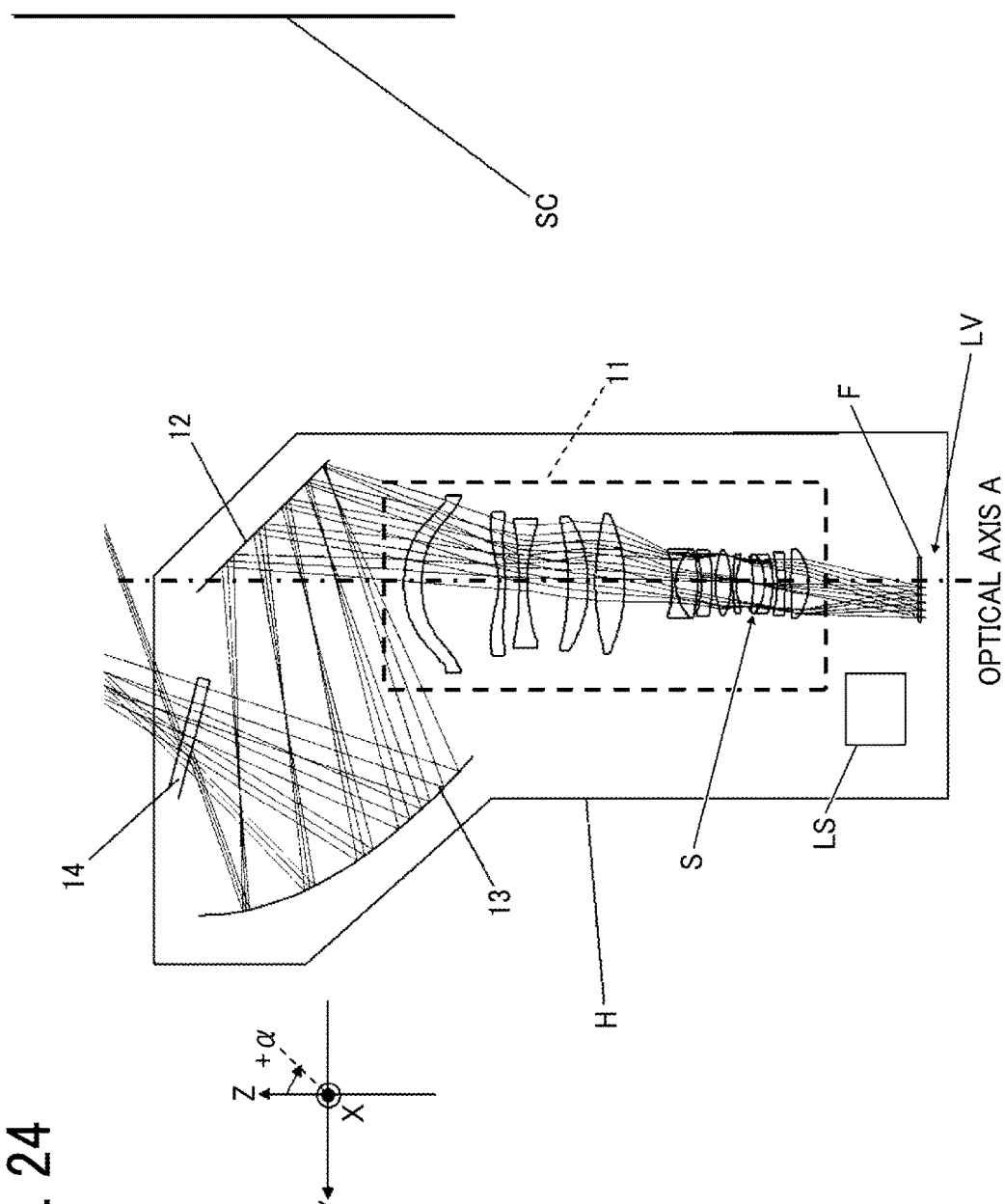
FIG. 24 is a cross-sectional view illustrating a configuration of a projection device together with an optical path according to a second example of a second embodiment of the present invention.

FIG. 24 is a cross-sectional view illustrating a configuration of a projection device together with an optical path according to a second example of the second embodiment of the present invention.

Figure 25A:
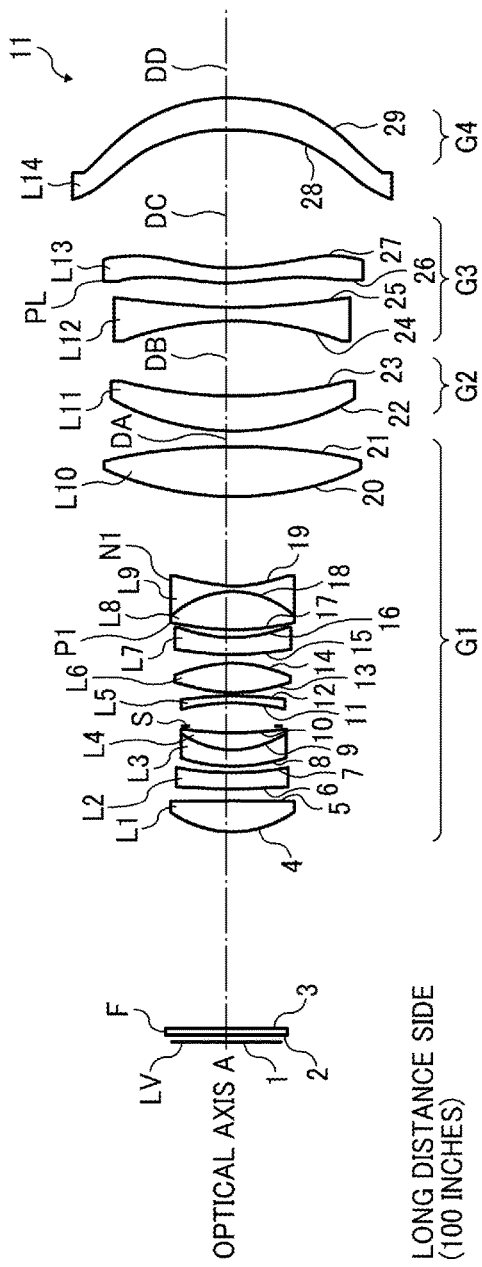
FIGS. 25A and 25B are cross-sectional views illustrating moving positions of a focusing lens for respective projection sizes of a projection optical system used in the projection device according to the second example of the second embodiment of the present invention.
Figure 25B:
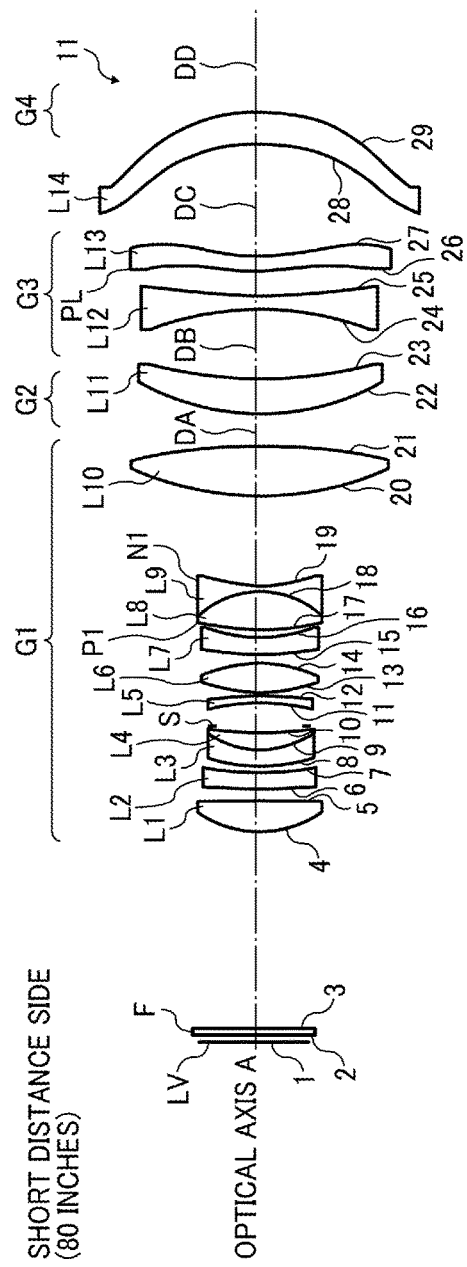

FIG. 25 (FIGS. 25A and 25B) is a cross-sectional view illustrating moving positions of a focusing lens for each projection size of the projection optical system used in the projection device according to the second example of the second embodiment of the present invention, and FIG. 25A illustrates a case where the projection size is a long distance side (100 inches), and FIG. 25B illustrates a case where the projection size is a short distance side (80 inches).

In FIG. 24, a reference sign LV indicates an image forming unit. The image forming unit LV is, more specifically, a light valve such as a "Digital Micro-mirror Device (abbreviated as DMD)", a "transmissive liquid crystal panel", and a "reflective liquid crystal panel", and a portion indicated by the reference sign LV is a "portion where an image to be projected is formed". In the case where the image forming unit LV does not have a function to emit light by itself like the DMD, image information formed at the image forming unit LV is illuminated by illumination light from an illumination optical system LS. For the illumination optical system LS, a system having a function to effectively illuminate the image forming unit LV is preferable. Further, for example, a rod integrator and a fly-eye integrator can be used in order to uniform illumination. Additionally, for a light source of the illumination, a white light source such as a super-high pressure mercury lamp, a xenon lamp, a halogen lamp, and an LED can be used. Further, a monochromatic light source such as a monochromatic LED and a Laser Diode (LD) can be also used. A known technology is adopted as the illumination optical system. Therefore, providing a specific example is omitted here.

According to the present embodiment, a DMD is assumed as the image forming unit LV. Further, the present embodiment has a precondition that "the image forming unit does not have a function to emit light" by itself, but an image forming unit including "a self-light emitting system having a function to cause a generated image to emit light" can be also used.

A parallel plate F disposed in the vicinity of the image forming unit LV is assumed to be a cover glass (seal glass) of the image forming unit LV. A reference sign H represents an external portion of the projection device, and a reference sign S represents a stop (aperture stop). Further, a reference sign SC in FIG. 24 represents a screen.

FIG. 24 illustrates an optical path diagram in the case of 80 inches in which a front lens element is most protruded. As illustrated in FIG. 24, an axis shared by a plurality of axisymmetric lenses is defined as an optical axis A, a direction parallel to the optical axis A is defined as Z-axis direction, an axis vertical to the optical axis A within a surface including a beam emitted from a center of the image display element and passing a center of the stop S is defined as a Y-axis, and an axis vertical to the optical axis A and Y-axis is defined as an X-axis. In FIG. 24, a clockwise rotary direction is defined as +α direction.

A luminous flux having intensity two-dimensionally modulated by the image information at the DMD is to be a projected luminous flux as an object light. The projected luminous flux from the image forming unit LV passes a dioptric system 11, a folding mirror 12, and a free-form surface concave mirror 13, and becomes an imaging luminous flux. In other words, an image formed on the DMD (image forming unit LV) is magnified and projected on the screen SC by the projection optical system, and becomes a projection image.

Here, a surface on which the image is formed is defined as an image forming surface. Respective optical elements in the dioptric system 11 share an optical axis individually, and the image forming unit LV is shifted in the Y-direction relative to the optical axis A as illustrated in FIG. 14.

According to the second embodiment, the system is formed by using the dioptric system 11, folding mirror 12, and free-form surface concave mirror 13. The number of mirrors may be increased, but this is not so preferable because the configuration may become complex and upsized, and cost increase may be caused as well.

Heat generation by absorbing heat and light from a power source and a lamp is increased in the illumination optical system LS along with enhancement of higher luminance. Particularly, in a projector using a non-telecentric optical system, a light absorption amount to a lens barrel is largely increased by shortening a back focal length for downsizing. Therefore, a lens group closest to an image display side has temperature easily increased, and temperature compensation is needed inside the lens group.

Considering above, in the second example of the second embodiment, change of a focal length and expansion of a mechanical holder caused by heat is balanced by using glass material satisfying conditional expressions (7), (8), (9), and (10) (for example, S-NBH56 having nd: 1.85478, vd: 24.799, dnTP: 5.1, and θgFP: 0.6122 of OHARA INC., and TAFD25 having nd: 1.90366, vd: 31.315 dnTN: 3.6, θgFN: 0.5947 of HOYA CORPORATION) for each of a positive lens P1 and a negative lens N1 of a cemented lens disposed closer to the magnification side than the stop S. Further, in addition to the above, an aspheric surface lens is adopted as a positive lens closest to an image display element side, thereby achieving to highly adjust temperature change at image surface curvature.

Moreover, by appropriately disposing a cooling mechanism, temperature change can be suppressed for the lens group which has the aspheric surface lens and is moved at the time of focus, and temperature change at the image surface curvature can be suppressed.

The light having passed the dioptric system 11 forms, as a space image, an intermediate image on a side closer to the image forming unit LV than the folding mirror 12. The intermediate image is conjugate to the image information formed on the image forming unit LV. The intermediate image is not necessarily imaged as a planar image, and formed as a curved image in both the second embodiment and other embodiments. The intermediate image is magnified and projected by the free-form surface concave mirror 13 disposed closest to the magnification side, and screened on the screen SC. The intermediate image includes image surface curvature and distortion, but the curvature and distortion can be corrected by using the free-form surface concave mirror 13.

Therefore, a lens system has a reduced burden to perform aberration correction, thereby increasing freedom of design and having an advantage in downsizing, for example. Further, the free-form surface referred herein is an anamorphic surface in which X-direction curvature corresponding to an X-direction position in an optional Y-direction position is not constant, and Y-direction curvature corresponding to a Y-direction position in an optional X-direction position is not constant.

Preferably, a dust-proof glass 14 is disposed between the free-form surface concave mirror 13 and the screen SC. According to the second embodiment, a flat plate glass is used for the dust-proof glass 14, but the glass may also have curvature, or may be an optical element having a magnification such as a lens. Further, the duct-proof glass is disposed tilted to the optical axis A instead of being vertical, but the tilting angle is optional and may be vertical to the optical axis A.

FIG. 24 illustrates a lens structure of the dioptric system and a focusing state according to the second example of the second embodiment of the present invention. In this dioptric system, a first lens group G1 having positive refractive power, a second lens group G2 having positive refractive power, a third lens group G3 having negative refractive power, and a fourth lens group G4 having positive refractive power are sequentially arranged in a direction from the image forming unit side to the magnification side. In performing focusing in response to change of the projection distance, the positive second lens group G2 and the negative third lens group G3 are moved to the image forming unit side, and the positive fourth lens group G4 is moved to the magnification side at the time of focusing from the long distance side (100 inches) to the short distance side (80 inches).

The first lens group G1 includes, sequentially from the image forming unit LV side to the magnification side:

a first lens L1 formed of a double-sided aspheric biconvex lens in which a convex surface having larger curvature than the magnification side is oriented to the image forming unit side;

a second lens L2 formed of a negative meniscus lens in which a convex surface is oriented to the image forming unit side;

a cemented lens including a third lens L3 formed of a negative meniscus lens in which a convex surface is oriented to the image forming unit side, and a fourth lens L4 formed of a positive meniscus lens in which a convex surface is oriented to the image forming unit;

the stop S;

a fifth lens L5 formed of a negative meniscus lens in which a convex surface is oriented to the magnification side;

a sixth lens L6 formed of a double-sided aspheric biconvex lens in which a convex surface having larger curvature than the image forming unit side is oriented to the magnification side;

a seventh lens L7 formed of a negative meniscus lens in which a convex surface is oriented to the image forming unit side, a cemented lens including an eighth lens L8 formed of a biconvex lens in which a convex surface having larger curvature than the image forming unit side is oriented to the magnification side, and a ninth lens L9 formed of a biconcave lens in which a concave surface having larger curvature than the magnification side is oriented to the image forming unit side; and a tenth lens L10 formed of a biconvex lens in which a convex surface having larger curvature than the magnification side is oriented to the image forming unit side.

The second lens group G2 includes an eleventh lens L11 formed of a positive meniscus lens in which a convex surface is oriented to the image forming unit side.

The third lens group G3 includes a twelfth lens L12 formed of a biconcave lens in which a concave surface having curvature larger than the magnification side is oriented to the image forming unit side, and a thirteenth lens L13 formed of a double-sided aspheric negative meniscus lens PL made of resin in which a convex surface is oriented to the image forming unit side.

The fourth lens group G4 includes a fourteenth lens L14 formed of a double-sided aspheric surface positive meniscus lens in which a convex surface is oriented to the magnification side.

The dioptric system is formed of the above lens groups, and the folding mirror 12 (surface 30) which is a flat surface mirror and the free-form surface concave mirror 13 (surface 31) are disposed on the magnification side thereof.

Note that the eighth lens L8 is referred to as the positive lens P1, and the ninth lens L9 is referred to as the negative lens N1.

In the following, lens data is listed in TABLE 22. In the TABLE 22, a surface number attached with * is the aspheric surface, and a surface number attached with ** is the free-form surface.

TABLE 22

| | | | NUMERICAL APERTURE: 0.200 | | | |
|---|---|---|---|---|---|---|
| | R | D | Nd | vd | GLASS MATERIAL | EFFECTIVE DIAMETER D |
| 1 | ∞ | 1.00 | | | | |
| 2 | ∞ | 1.00 | 1.51633 | 64.1420 | S-BSL7 | OHARA |
| 3 | ∞ | 29.00 | | | | |
| 4* | 16.048 | 4.80 | 1.49700 | 81.5459 | S-FPL51 | OHARA | 8.25 |
| 5* | −85.536 | 1.38 | | | | | 7.95 |
| 6 | 111.624 | 2.27 | 1.74000 | 28.2960 | S-TIH3 | OHARA | 7.6 |
| 7 | 30.383 | 1.18 | | | | | 7.2 |
| 8 | 27.207 | 2.25 | 1.90366 | 31.3150 | TAFD25 | HOYA | 7.1 |
| 9 | 13.755 | 3.12 | 1.53775 | 74.7031 | S-FPM3 | OHARA | 6.6 |
| 10 | 63.887 | 0.82 | | | | | 6.3 |
| STOP | ∞ | 3.42 | | | | | 6.4 |
| 11 | −26.275 | 1.00 | 1.53775 | 74.7031 | S-FPM3 | OHARA | 6.8 |
| 12 | −56.602 | 0.60 | | | | | 7.1 |
| 13* | 24.766 | 4.21 | 1.58913 | 61.1526 | L-BAL35 | OHARA | 7.6 |
| 14* | −21.197 | 0.97 | | | | | 7.9 |
| 15 | 67.443 | 2.66 | 1.80400 | 46.5834 | S-LAH65V | OHARA | 8.0 |
| 16 | 21.739 | 1.10 | | | | | 8.0 |
| 17 | 43.073 | 5.60 | 1.85478 | 24.7990 | S-NBH56 | OHARA | 8.1 |
| 18 | −13.494 | 0.90 | 1.90366 | 31.3150 | TAFD25 | HOYA | 8.2 |
| 19 | 27.364 | 12.92 | | | | | 8.7 |
| 20 | 47.244 | 7.60 | 1.60300 | 65.4436 | S-PHM53 | OHARA | 17.7 |
| 21 | −79.679 | VARIABLE DA | | | | | 18.0 |
| 22 | 35.971 | 5.20 | 1.75700 | 47.8232 | S-LAM54 | OHARA | 19.4 |
| 23 | 64.935 | VARIABLE DB | | | | | 18.9 |
| 24 | −46.113 | 2.00 | 1.74950 | 35.3325 | S-NBH51 | OHARA | 18.4 |
| 25 | 85.115 | 3.69 | | | | | 19.3 |
| 26* | 44.375 | 2.00 | 1.53046 | 55.8000 | RESIN | | 19.8 |
| 27* | 23.826 | VARIABLE DC | | | | | 21.0 |
| 28* | −38.342 | 4.80 | 1.53046 | 55.8000 | RESIN | | 23.8 |
| 29* | −32.958 | VARIABLE DD | | | | | 24.8 |
| 30 | ∞ | −86.21 | REFLECTION SURFACE | | | | |
| 31** | ∞ | VARIABLE DE | REFLECTION SURFACE | | | | |

More specifically, in TABLE 22, a fourth surface, a fifth surface, a thirteenth surface, a fourteenth surface, a twenty-sixth surface, a twenty-seventh surface, a twenty-eighth surface, and a twenty-ninth surface attached with "*" have respective optical surfaces which are aspheric surfaces, and parameters of the respective aspheric surfaces in the expression (13) are as shown in next TABLE 23.

Note that "En" is "exponent of 10", that is, "×10ⁿ" in the aspheric surface coefficient. For example, "E-05" represents "×10⁻⁵".

TABLE 23

| | K | A4 | A6 | A8 | A10 | A12 | A14 | A16 |
|---|---|---|---|---|---|---|---|---|
| ASPHERIC SURFACE COEFFICIENTS | | | | | | | | |
| 4TH SURFACE | 0.5845 | −2.6875E−05 | −4.6685E−08 | | | | | |
| 5TH SURFACE | −102.0263 | 2.4705E−05 | 1.3539E−07 | 6.5230E−10 | | | | |
| 13TH SURFACE | −0.2242 | −9.2289E−06 | | | | | | |
| 14TH SURFACE | −0.8331 | 1.9190E−05 | 5.8305E−09 | | | | | |
| 26TH SURFACE | −12.1375 | −3.7845E−05 | −1.9499E−08 | 5.5908E−10 | −1.8734E−12 | 2.3480E−15 | −2.27821E−19 | −1.0808E−21 |
| 27TH SURFACE | −1.7935 | −7.5892E−05 | 1.5352E−07 | −1.4244E−10 | −1.4842E−13 | 3.8953E−16 | −1.70315E−19 | |
| 28TH SURFACE | −0.6513 | −4.8232E−05 | 1.1572E−07 | −5.0227E−10 | 1.8861E−12 | −2.8899E−15 | 1.53542E−18 | |
| 29TH SURFACE | −1.4060 | −3.6199E−05 | 3.1817E−08 | 3.8156E−11 | −6.7693E−13 | 2.9033E−15 | −4.39848E−18 | 2.24094E−21 |

DA, DB, DC, DD, and DE in TABLE 22 represent variable distances.

Among the distances, the variable distance DA is a distance between the first lens group G1 and the second lens group G2, namely, the variable distance between surface 21 and a surface 22. The variable distance DB is a distance between the second lens group G2 and the third group G3, namely, the variable distance between a surface 23 and a surface 24. The variable distance DC is a distance between the third lens group G3 and a fourth lens group G4, namely, the variable distance between a surface 27 and a surface 28.

The variable distance DD is a distance between the fourth lens group G4 and the folding mirror 12, and DE is the variable distance between the free-form surface concave mirror 13 and the screen SC.

Thus, in the projection optical system, the second lens group G2 and the third lens group G3 are moved to the image forming unit side and the fourth lens group G4 is moved to the magnification side in FIG. 25 at the time of focusing from the long distance side to the short distance side to perform focusing in response to change of the projection distance. Thus, by changing a magnifying ratio, focus adjustment is performed in a range from 80 inches to 100 inches in a diagonal size of the projection image in accordance with a projection size.

At the time of focus adjustment, surface distances DA, DB, DC, DD, DE in which the distances between the lens groups are varied are indicated as "variable DA", "variable DB", "variable DC", "variable DD", and "variable DE" in TABLE 22, and as illustrated in next TABLE 10, the surface distances DA to DE are varied with respect to the diagonal sizes 100, 80, 60 inches of the projection image.

TABLE 24

VARIABLE DISTANCE FOCUSING

| SCREEN SIZE | SHORT DISTANCE 60 INCHES | STANDARD 80 INCHES | LONG DISTANCE 100 INCHES |
|---|---|---|---|
| VARIABLE DA | 2.00 | 3.63 | 4.54 |
| VARIABLE DB | 10.98 | 10.41 | 10.10 |
| VARIABLE DC | 20.43 | 18.06 | 16.64 |
| VARIABLE DD | 52.85 | 54.16 | 54.98 |
| VARIABLE DE | 344.33 | 446.01 | 547.63 |

Further, a shape of the free-form surface is specified by the above-described expression (14), providing an inverse number of paraxial curvature radius (paraxial curvature) C, a height from optical axis H; and a conic constant K, and free-form surface coefficients listed in next TABLE 25, and defining X as an amount of the free-form surface in the optical axis direction.

TABLE 25

FREE-FORM SURFACE COEFFICIENTS

| | 31TH SURFACE |
|---|---|
| K | 0 |
| C4 | 9.6874E−03 |
| C6 | 2.9464E−03 |
| C8 | 8.1314E−05 |
| C10 | −1.1148E−04 |
| C11 | −6.5274E−07 |
| C13 | 6.2819E−06 |
| C15 | 9.3461E−07 |
| C17 | −3.4747E−08 |
| C19 | 1.4733E−07 |
| C21 | 4.2726E−08 |
| C22 | 8.8158E−11 |
| C26 | 1.0110E−09 |
| C28 | 3.9459E−10 |
| C30 | 6.1707E−13 |
| C32 | −5.3383E−11 |
| C34 | −8.8595E−12 |
| C36 | −1.7197E−13 |
| C37 | −9.1360E−15 |
| C39 | 6.9171E−14 |
| C41 | −6.1544E−13 |
| C43 | −1.1323E−13 |
| C45 | −8.4025E−15 |
| C47 | 1.6700E−16 |
| C49 | 1.9423E−15 |
| C51 | −2.7748E−15 |
| C53 | 3.9039E−16 |
| C55 | 1.6027E−16 |
| C56 | 7.7700E−19 |
| C58 | 3.4642E−18 |
| C60 | 1.4661E−17 |
| C64 | 6.7415E−18 |
| C66 | 1.4757E−18 |

Note that a projection distance and TR take values listed in next TABLE 26 in accordance with the short distance, standard, and long distance. Here note that TR is expressed as:

[distance to screen from intersection between free-form surface concave mirror 13 and optical axis A]/[lateral width of screen]

TABLE 26

| PROJECTION DISTANCE AND TR | | | |
|---|---|---|---|
| | SHORT DISTANCE 60 INCHES | STANDARD 80 INCHES | LONG DISTANCE 100 INCHES |
| PROJECTION DISTANCE | 347.33 | 449.01 | 550.63 |
| TR | 0.261 | 0.254 | 0.249 |

In the following, specific values of the DMD used as the image forming unit LV and others according to the second example of the second embodiment are shown.

DMD size
Dot size: 7.56 μm
Length in lateral direction: 14.5152 mm
Length in vertical direction: 8.1648 mm
Optical axis to center of device: 5.30 mm
BF/Y: 3.45

Positional coordinates of the folding mirror 12 and free-form surface concave mirror 13 from an apex in a focused state are shown in next TABLE 27. In the focused state, the projection image of the lenses positioned closest to a reflection surface side is maximized. Meanwhile, as for rotation, an angle formed between a surface normal and the optical axis is indicated.

TABLE 27

| | Y-AXIS | Z-AXIS | α |
|---|---|---|---|
| 30TH SURFACE | 0.00 | 54.98 | −45.00 |
| 31ST SURFACE | 86.21 | 74.51 | −103.40 |

Figure 27:
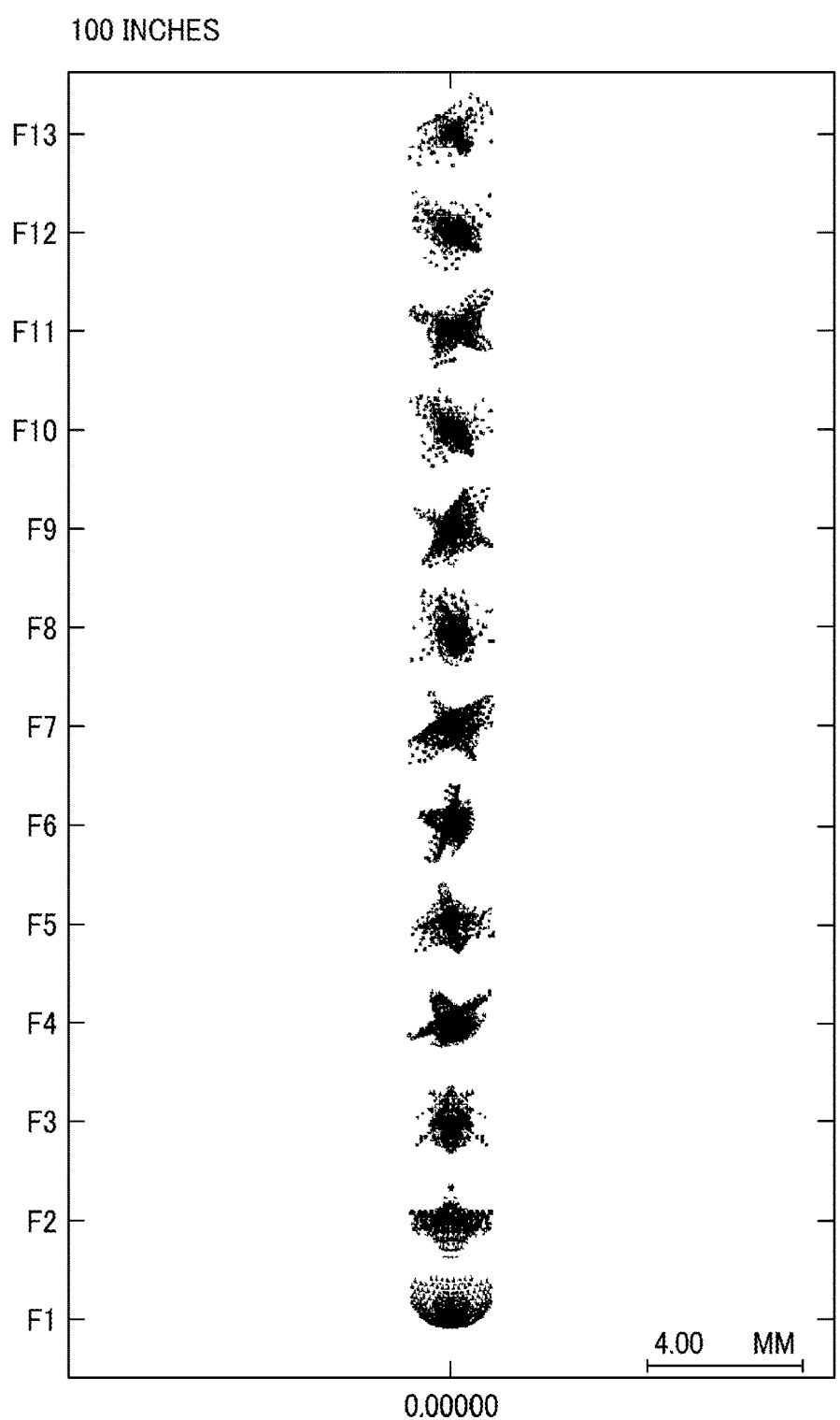
FIG. 27 is a diagram illustrating a spot diagram on a 100-inch screen for respective evaluation points (respective field angles) illustrated in FIG. 17 in the projection device according to the second example of the second embodiment.
Figure 28:
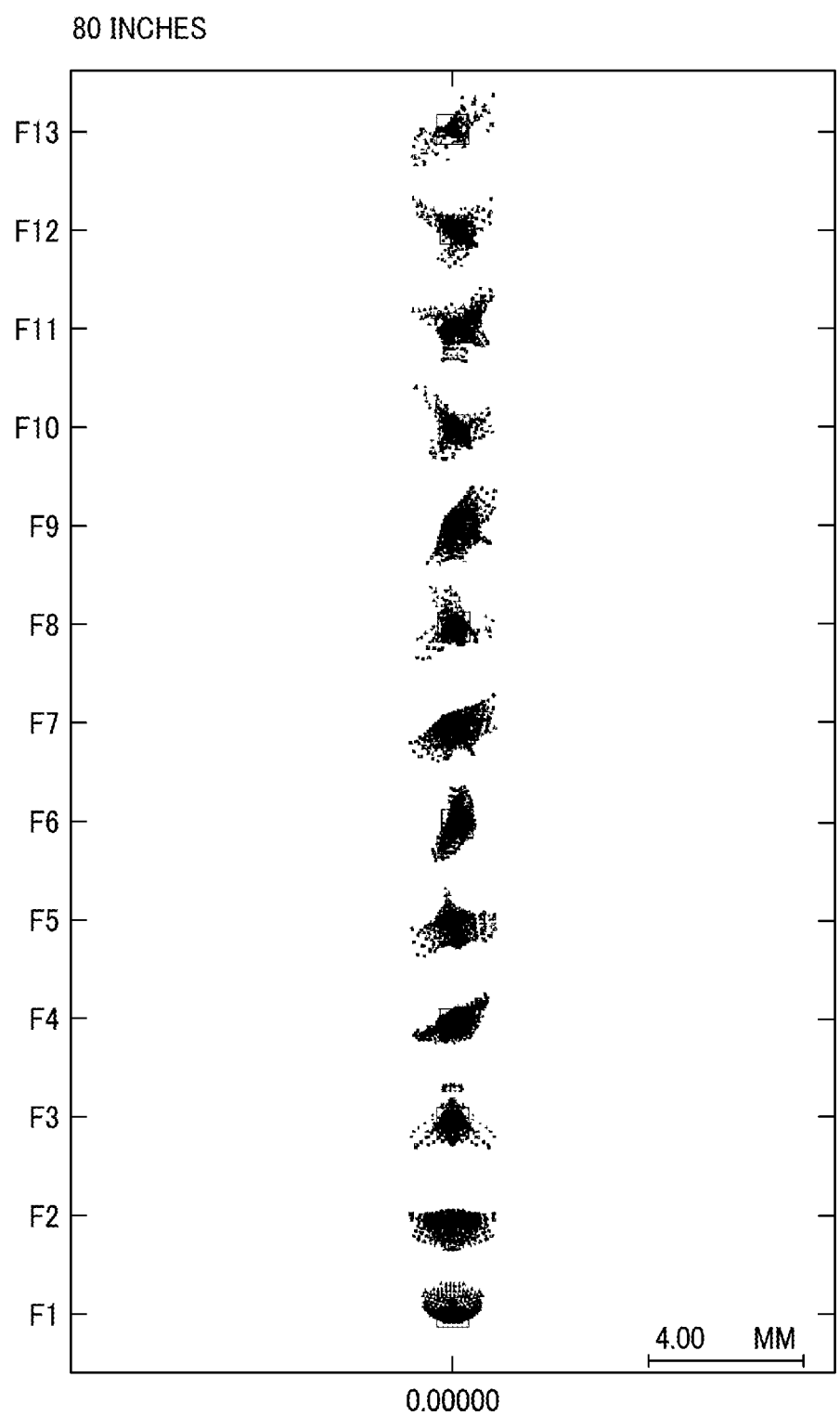
FIG. 28 is a diagram illustrating the spot diagram on a 80-inch screen for the respective evaluation points (respective field angles) illustrated in FIG. 17 in the projection device according to the second example of the second embodiment.
Figure 29:
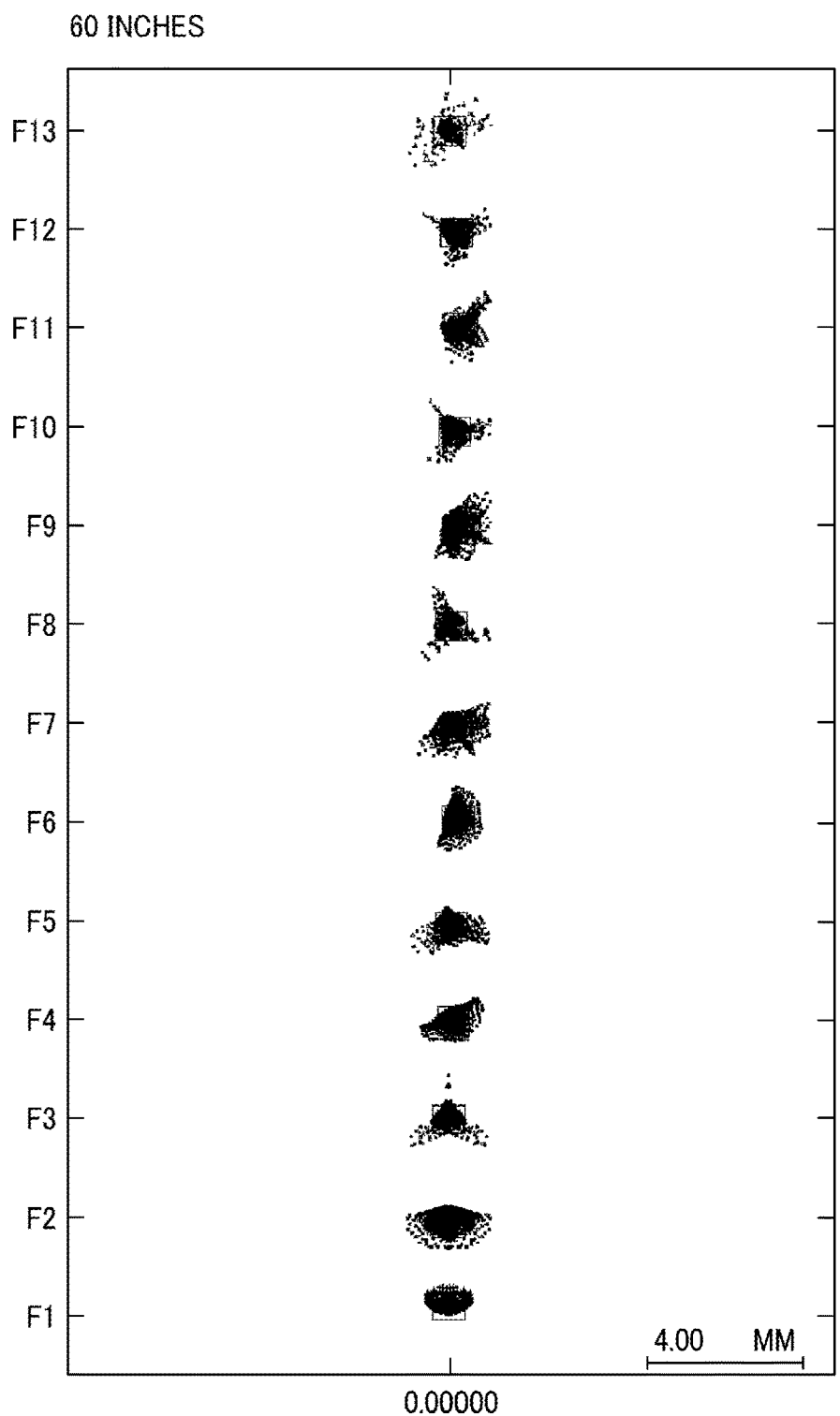
FIG. 29 is a diagram illustrating the spot diagram on a 60-inch screen for the respective evaluation points (respective field angles) illustrated in FIG. 17 in the projection device according to the second example of the second embodiment.

Spot diagrams corresponding to respective field angles illustrated in FIG. 17 are illustrated in FIG. 27 (in the case of 100 inches), FIG. 28 (in the case of 80 inches), and FIG. 29 (in the case of 60 inches). The respective spot diagrams represent imaging characteristics (mm) on the screen with respect to wavelengths 625 nm (red), 550 nm (green), and 425 nm (blue). It is clear that good imaging is performed.

The paraxial focal lengths in the entire system and the first lens group are shown in next TABLE 28 in the case of 100 inches when the temperature is a room temperature (20 degrees) and when the temperature is increased by 20 more degrees.

TABLE 28

| | 20 DEGREES | 40 DEGREES |
|---|---|---|
| ENTIRE SYSTEM | 20.89 | 20.90 |
| FIRST LENS GROUP | 35.70 | 35.72 |

This shows that change of the focal length is suppressed at the time of temperature change.

Figure 30:
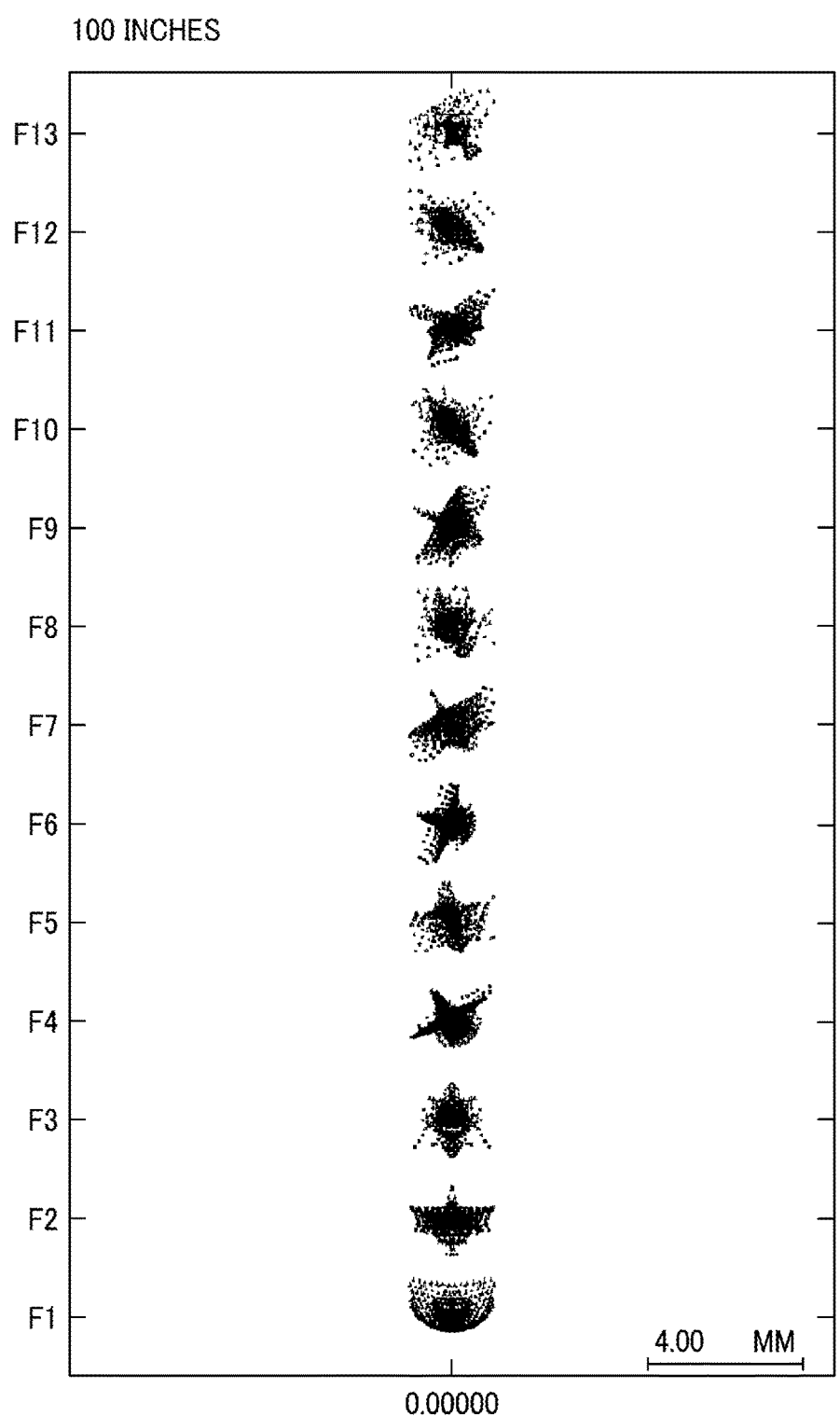
FIG. 30 is a diagram illustrating the spot diagram on the 100-inch screen for the respective evaluation points (respective field angles) illustrated in FIG. 17 in the projection device according to the second example of the second embodiment.
Figure 31:
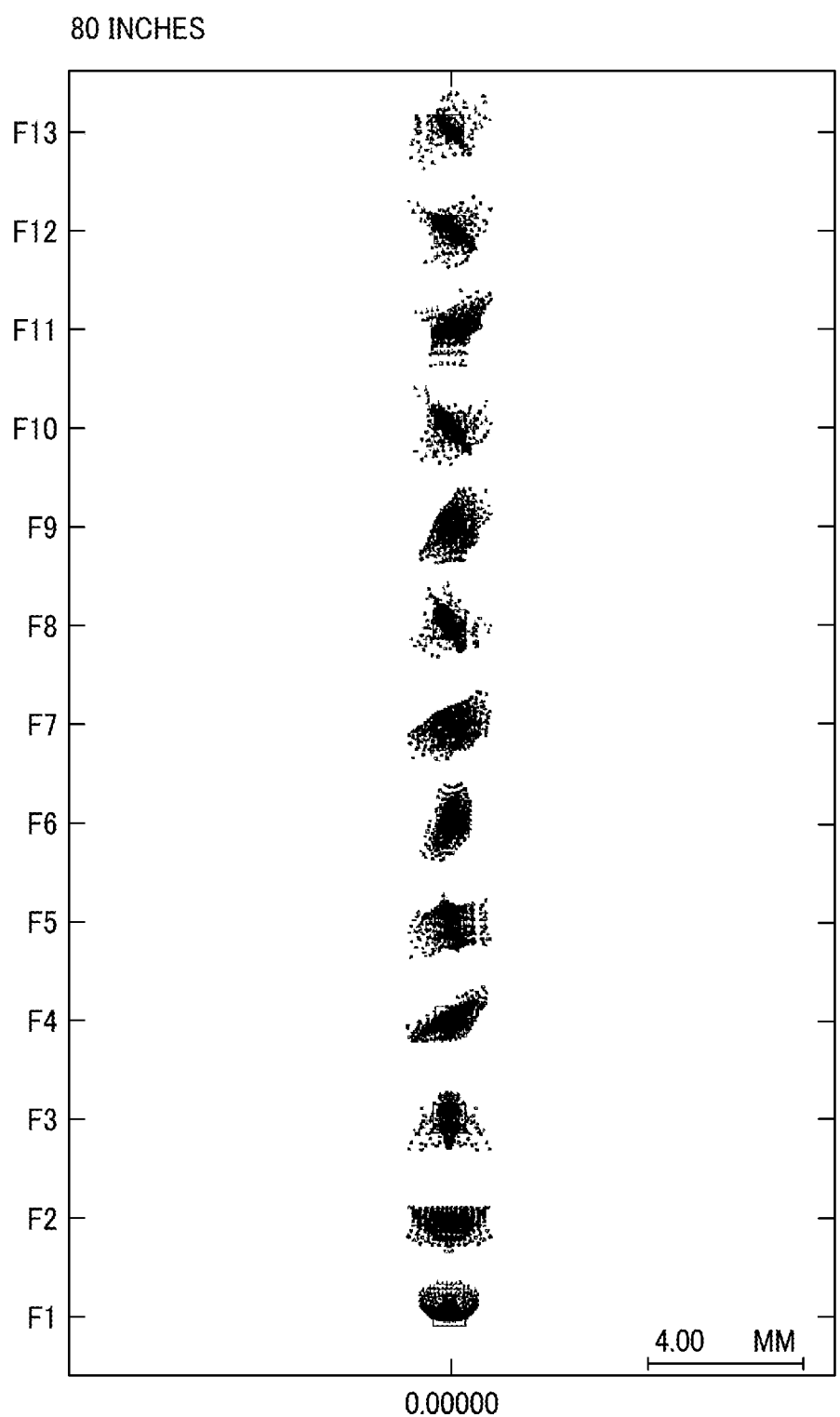
FIG. 31 is a diagram illustrating the spot diagram on the 80-inch screen for the respective evaluation points (respective field angles) illustrated in FIG. 17 in the projection device according to the second example of the second embodiment.
Figure 32:
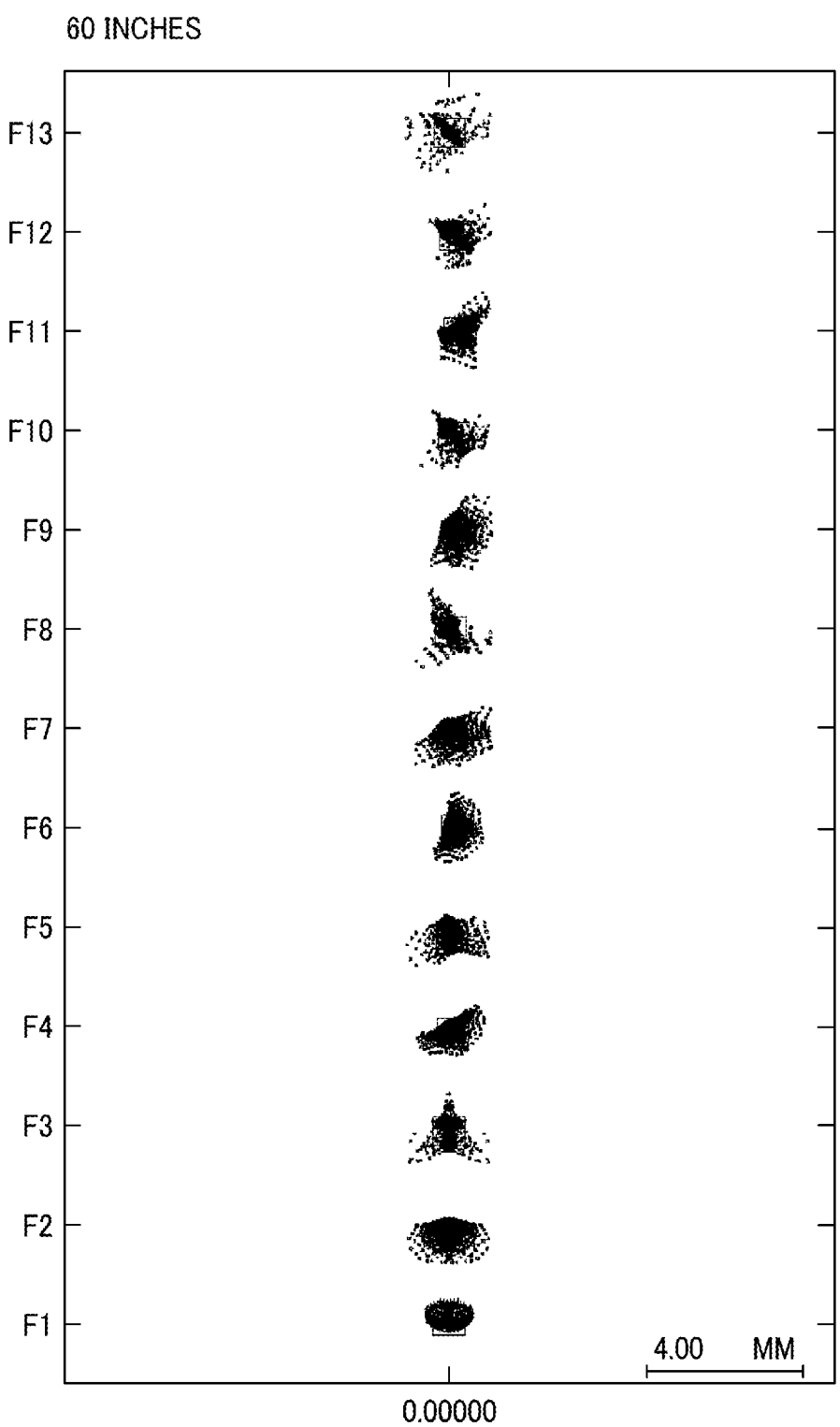
FIG. 32 is a diagram illustrating the spot diagram on the 60-inch screen for the respective evaluation points (respective field angles) illustrated in FIG. 17 in the projection device according to the second example of the second embodiment.

Further, FIGS. 30 to 32 illustrate spot diagrams in the respective image sizes (100 inches, 80 inches, 60 inches) when the temperature is increased by 20 more degrees from the room temperature (20 degrees).

FIGS. 30 to 32 also show good imaging performance even at the time of temperature increase.

Note that the values corresponding to the conditional expressions (3), (4), and (7) to (12) are as shown below and satisfy the respective conditional expressions (3), (4), and (7) to (12) in the case of the second example of the second embodiment:

$dnTP=5.1$  Conditional expression (7):

$\theta gFP=0.6122$  Conditional expression (8):

$dnTN=3.6$  Conditional expression (9):

$\theta gFN=0.5947$  Conditional expression (10):

$|P40d(h)-P20d(h)|\times FP=0.02$ or less  Conditional expression (11):

$0.85\times D=16.745$  Conditional expression (12):

$TR=0.261$ (in the case of short distance 60 inches)

$:TR=0.254$ (in the case of standard distance 80 inches)

Figure 26:
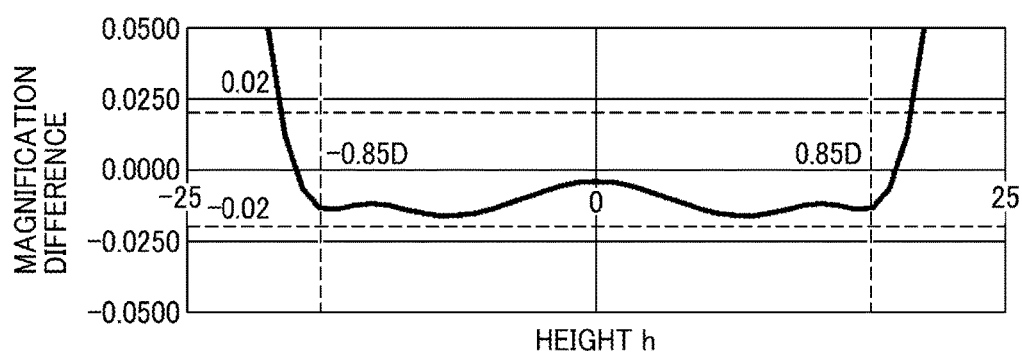
FIG. 26 is a characteristics diagram illustrating a relation between a height from an optical axis of a double-sided aspheric negative meniscus lens included in a third lens group in the second example of the second embodiment and a magnification difference under environment of the room temperature 40 degrees.

$:TR=0.249$ (in the case of long distance 100 inches)  Conditional expression (3):

$BF/Y=3.45$.  (Conditional expression 4):

Further, as illustrated in FIG. 26, the conditional expression (12) is satisfied within a range of conditional expression (11).

According to the projection device specified by the above-described embodiments and the specific exemplary values, the image projection device having an ultra-short projection distance, formed in a compact size, and having high performance and excellent temperature characteristics can be achieved by designating the appropriate glass material for each of the positive lens and the negative lens inside the fixed lens group. While the preferable embodiments of the present invention have been described in the above first and second examples of the second embodiment, the present invention is not limited to the content thereof.

Especially, the specific shapes and values of the respective components exemplified in the first example and the second example of the second embodiment are merely examples to implement the present invention, and it should not be understood that a technical scope of the present invention is not limited by these examples.

Thus, the present invention is not limited to the content described in the present embodiments, and modifications may be suitably made without departing in the scope without departing from the gist thereof.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

The invention claimed is:

1. A projection optical system configured to magnify and project, onto a projection surface, an image formed in an image forming element, the projection optical system comprising:
   a coaxial optical system including an aperture stop and a plurality of lens groups having an optical axis in common; and a concave mirror configured to be fixed in the adjustment of focus, in that order from an image display element side to a magnification side, wherein the plurality of lens groups including a fixed lens group that is fixed during an adjustment of focus and a focus group that is independently movable along a direction of the optical axis during the adjustment of focus, the focus group including:
a first focus group closest to the concave mirror;
a second focus group having negative refractive power; and
a third focus group having positive refractive power, and the second focus group and the third focus group being movable in a direction different from a direction in which the aperture stop and the first focus group move during a change in a projection distance from a long distance side to a short distance side.

2. The projection optical system according to claim 1, wherein the fixed lens group is closest to the image display element side.

3. The projection optical system according to claim 1, wherein the fixed lens group includes at least one positive lens P1 and at least one negative lens N1, the at least one positive lens P1 and the at least one negative lens N1 satisfy conditional expressions (1)-(3):

$$4 < dnTP, \quad (1)$$

$$0.61 < \theta gFP, \quad (2)$$

$$3 < dnTN, \quad (3)$$

dnTP denotes a temperature coefficient of a relative refractive index at a e line in a range of 40 to 60 degrees of the at least one positive lens P1, θgFP denotes a partial dispersion ratio in a g line and an F line of the at least one positive lens P1, dnTN denotes a temperature coefficient of a relative refractive index in the e line in a range of 40 to 60 degrees of the at least one negative lens N1, and θgf denotes a partial dispersion ratio defined by conditional expression (4):

$$\theta gF = (Ng - NF)/(NF - NC), \text{ where} \quad (4)$$

Ng denotes a refractive index relative to the g line,
NF denotes a refractive index relative to the F line, and
NC denotes a refractive index relative to a C line.

4. The projection optical system according to claim 1, wherein conditional expression (5) is satisfied:

$$BF/Y < 4.0, \text{ where} \quad (5)$$

BF denotes a distance from an intersection between a surface including the image display element and the optical axis, to a vertex of an image display element side surface of a lens closest to the image display element, and Y denotes a maximum value of a distance between the optical axis and an end portion of an image forming unit.

5. An image projection device configured to magnify and project, onto the projection surface, the image formed in the image forming element, the image projection device comprising the projection optical system according to claim 1.

6. A projection optical system configured to magnify and project, onto a projection surface, an image formed in an image forming element, the projection optical system comprising:

a coaxial optical system including an aperture stop and a plurality of lens groups having an optical axis in common; and a concave mirror configured to be fixed in the adjustment of focus, in that order from an image display element side to a magnification side, wherein the plurality of lens groups including a focus group that is independently movable along a direction of the optical axis in an adjustment of focus, and the focus group includes:
a first focus group closest to the concave mirror; and
a second focus group having negative refractive power, the second focus group being movable in a direction different from a direction in which the aperture stop and the first focus group move.

7. The projection optical system according to claim 6, wherein the focus group further includes a third focus group having positive refractive power, and the third focus group is movable in the direction different from the direction in which the aperture stop and the first focus group move.

8. The projection optical system according to claim 6, wherein the first focus group moves in a direction away from the aperture stop in a change of a projection distance from a long distance side to a short distance side.

9. The projection optical system according to claim 6, wherein the first focus group has a positive refractive power, and has a convex surface facing the magnification side.

10. The projection optical system according to claim 6, wherein conditional expression (6) is satisfied:

$$BF/Y < 4.0, \text{ where} \quad (6)$$

BF denotes a distance from an intersection between a surface including the image display element and the optical axis to a vertex of an image display element side surface of a lens closest to the image display side, and Y denotes a maximum value of a distance between the optical axis and an end portion of an image forming unit.

11. An image projection device configured to magnify and project, onto the projection surface, the image formed in the image forming element, the image projection device comprising the projection optical system according to claim 6.

* * * * *